United States Patent
Yamamoto et al.

(10) Patent No.: US 7,620,993 B2
(45) Date of Patent: Nov. 17, 2009

(54) COPYRIGHT PROTECTION SYSTEM, KEY GENERATION APPARATUS, RECORDING APPARATUS, REPRODUCTION APPARATUS, READ-OUT APPARATUS, DECRYPTION APPARATUS, RECORDING MEDIUM, RECORDING METHOD AND PROGRAM

(75) Inventors: Naoki Yamamoto, Neyagawa (JP); Hideshi Ishihara, Katano (JP); Makoto Tatebayashi, Takarazuka (JP); Toshihisa Nakano, Neyagawa (JP)

(73) Assignee: Panasonic Corporation, Osaka (JP)

( * ) Notice: Subject to any disclaimer, the term of this patent is extended or adjusted under 35 U.S.C. 154(b) by 444 days.

(21) Appl. No.: 10/563,797

(22) PCT Filed: Jul. 30, 2004

(86) PCT No.: PCT/JP2004/011303

§ 371 (c)(1),
(2), (4) Date: Jan. 9, 2006

(87) PCT Pub. No.: WO2005/013550

PCT Pub. Date: Feb. 10, 2005

(65) Prior Publication Data

US 2006/0282898 A1    Dec. 14, 2006

(30) Foreign Application Priority Data

Aug. 5, 2003    (JP) .............................. 2003-286657

(51) Int. Cl.
*H04N 7/16*    (2006.01)

(52) U.S. Cl. .......................... 726/26; 380/277; 380/278; 380/279

(58) Field of Classification Search .................. 726/26; 380/277–286
See application file for complete search history.

(56) References Cited

U.S. PATENT DOCUMENTS

| 5,721,778 | A |   | 2/1998 | Kubota et al. |
| 6,118,873 | A | * | 9/2000 | Lotspiech et al. ........... 380/277 |
| 6,609,116 | B1 | * | 8/2003 | Lotspiech .................... 705/57 |

(Continued)

FOREIGN PATENT DOCUMENTS

EP    969667 A2 *    1/2000

(Continued)

OTHER PUBLICATIONS

Makoto Tatebayashi et al., entitled "*Content Protection System for Recordable Media (Kiroku Media no Contents Hogo System)*", Information and Communication Engineers Kiso, Kyokai Society Taikai Koen Ronbunshu, Sep. 7, 2000, pp. 367-368.

(Continued)

*Primary Examiner*—Nasser G Moazzami
*Assistant Examiner*—Travis Pogmore
(74) *Attorney, Agent, or Firm*—Wenderoth, Lind & Ponack, L.L.P.

(57)    ABSTRACT

Apparatuses are classified into a plurality of categories, and based on a media key and device key data held by apparatuses belonging to the respective categories, revocation data intended for revoking the device key held by a specific apparatus of the respective categories is generated for the respective categories, and recorded on a recording medium.

26 Claims, 42 Drawing Sheets

U.S. PATENT DOCUMENTS

| | | |
|---|---|---|
| 6,714,649 B1 | 3/2004 | Masuda et al. |
| 2001/0044897 A1* | 11/2001 | Ishiguro et al. ............. 713/171 |
| 2003/0142826 A1* | 7/2003 | Asano ........................ 380/277 |

FOREIGN PATENT DOCUMENTS

| | | |
|---|---|---|
| JP | 2002-281013 | 9/2002 |
| WO | WO02/060116 A2 * | 8/2002 |

OTHER PUBLICATIONS

"*Content Protection for Prerecorded Media Specification*", DVD Book, 4C Entity, LLC., Jan. 31, 2001, pp. ii-x and pp. 1-9.

* cited by examiner

COPYRIGHT PROTECTION SYSTEM, KEY GENERATION APPARATUS, RECORDING APPARATUS, REPRODUCTION APPARATUS, READ-OUT APPARATUS, DECRYPTION APPARATUS, RECORDING MEDIUM, RECORDING METHOD AND PROGRAM

BACKGROUND OF THE INVENTION

1. Technical Field

The present invention relates to a system in which a content, which is a digitalized literary work such as a movie or a musical piece, is recorded onto, and reproduced from, a large-capacity recording medium such as an optical disc, and particularly to a copyright protection system which prevents a content from being used illicitly, without permission from the copyright owner.

2. Background Art

In recent years, businesses which market contents, which are digitalized literary works such as movies and musical pieces, by storing such contents in optical discs, for example, are being carried out increasingly, following the increased capacity of recording media.

As there is a possibility that contents stored in a recording medium will be illicitly copied, some kind of protection becomes necessary.

In general, in order to protect the copyrights of contents, more specifically, to prevent illicit usage such as illicit reproduction and illicit copying of a content, encryption technology is being utilized.

To be more specific, a content is encrypted using a certain encryption key, recorded on a recording medium such as an optical disc, and distributed. At the same time, only a terminal which holds a decryption key corresponding to such encryption key can decrypt, using the decryption key, data which is read out from the recording medium, and carry out the content's reproduction, and so on.

Moreover, as methods for encrypting a content and recording the encrypted content in a recording medium, there exists (a) a method for encrypting the content itself, using an encryption key which corresponds to a decryption key held by a terminal, and recording the encrypted content, and (b) a method in which, in addition to encrypting the content using a certain key and recording the encrypted content, a decryption key corresponding to such key is encrypted using an encryption key corresponding to a decryption key held by the terminal, and the encrypted key is recorded.

At this time, strict management is required so that the decryption key held by the terminal is not revealed to the outside. However, there is a danger that certain keys may be exposed to the outside through a cryptanalysis of the inside of the terminal by an unauthorized person. Once certain keys are exposed to an unauthorized person, it is conceivable that contents can be circulated through the Internet by creating a reproduction apparatus or software for illicitly using contents. In such a case, it is assumed that a copyright owner would want that a key which has been exposed once, would not be able to handle contents to be provided subsequently. Technology for realizing this is referred to as key revocation technology, and a system which realizes key revocation is disclosed in patent reference 1 (Japanese Laid-Open Patent Application 2002-281013 Publication).

On the other hand, as apparatuses which reproduce the encrypted content recorded on the recording medium, there exists (a) a so-called household player in which a function for reading-out the encrypted content from the recording medium, and a function for decrypting the encrypted content that was read out, are integrated, and (b) a reproduction apparatus which reads-out the content from the recording medium using an optical disk drive connected to or built into a personal computer, then decrypts the read-out encrypted content using an application program operating on the host of a personal computer, and reproduces the decrypted content. Non-patent reference 1 (Content Protection for Prerecorded Media DVD Book, 4C Entity, LLC) discloses copyright protection systems corresponding to these two types of reproduction apparatuses.

However, as revocation data, which is common for all types of the subject reproduction apparatuses, is recorded onto the recording medium in such conventional copyright protection systems as those mentioned above, each reproduction apparatus needs to be provided with a memory within the apparatus, for storing, at least temporarily, the entirety of such revocation data read out from the recording media.

Furthermore, generally, in a household player such as a DVD player, changing the process algorithm and key length built into the apparatus is difficult, taking time and effort.

On the other hand, compared to implementation using hardware, when a decryption process and key are implemented as an application program on the personal computer, through software, updating and additions to the internal encryption algorithm and key is easy, but sturdy implementation of the encryption algorithm and key is difficult. However, in the conventional copyright protection system in which the common revocation data is recorded on the recording medium, even when the application program operating on the host of the personal computer is illicitly cryptanalyzed, and the algorithm and a number of keys are exposed, changing the encryption/decryption algorithm and key lengths is virtually impossible. This means that the revocation function will not be able to operate properly, leading to the spread of the illicit use of the content using an illicit device. Furthermore, once the key or algorithm of the application used in a personal computer is exposed, it is possible to have a case where the revocation functions in all devices, including consumer devices, will stop operating properly.

In order to solve the aforementioned problem, the present invention provides a copyright protection system which (a) enables the size of a memory provided inside the reproduction apparatus to be reduced, and (b) enables the revocation function of the entire system to be maintained, even when the application program operating on the host of the personal computer is cryptanalyzed and the algorithm and a number of keys are exposed, by changing the encryption/decryption algorithm and key lengths.

SUMMARY OF THE INVENTION

The present invention is a copyright protection system including: a recording apparatus operable to encrypt a content and to record the encrypted content; a recording medium on which the encrypted content is recorded; and reproduction apparatuses, each of which is operable to read out and decrypt the encrypted content recorded on the recording medium, wherein the reproduction apparatuses are classified into N-categories, N being a natural number greater than one. The recording apparatus is operable (a) to generate, for the respective N-categories and based on a media key and device key data, revocation data intended for revoking a device key, (b) to generate the encrypted content which is the content encrypted based on the media key, and (c) to record at least the N-pieces of revocation data and the encrypted content onto the recording medium. The device key data is held by the reproduction apparatuses of the respective N-categories, and the device key being held by a specific reproduction apparatus of the respective categories, and the reproduction apparatuses are each operable (a) to read out, from the recording medium, revocation data, among the N-pieces of revocation data, which is for the category to which the reproduction apparatus belongs, and the encrypted content, and (b) to decrypt the encrypted content based on the read-out revocation data.

Furthermore, in the copyright protection system of the present invention, each of the N-pieces of revocation data is encrypted media key data which is the media key encrypted using the device key data held by the reproduction apparatuses of a corresponding category. The reproduction apparatuses of the respective categories are each operable (a) to read out, from the recording medium, the corresponding encrypted media key data and the encrypted content, (b) to obtain the media key by decrypting the encrypted media key data using the held device key, and (c) to decrypt the encrypted content based on the obtained media key.

Furthermore, in the copyright protection system of the present invention, the recording apparatus is operable to generate an encryption key based on the media key, and to encrypt the content based on the encryption key, and the reproduction apparatuses of the respective categories are each operable to generate a decryption key based on the obtained media key, and to decrypt the encrypted content based on the generated decryption key.

Furthermore, in the copyright protection system of the present invention, the recording apparatus is operable to encrypt the content using a content key, to generate an encrypted content key by encrypting the content key using the media key, and to record the generated encrypted content key onto the recording medium. The reproduction apparatuses of the respective categories are each operable to read out the encrypted content key from the recording medium, to obtain the content key by decrypting the encrypted content key using the media key, and to decrypt the encrypted content using the obtained content key.

Furthermore, in the copyright protection system of the present invention, each of the N-pieces of revocation data is encrypted media key data which is a media key for a corresponding category, encrypted using the device key data held by the reproduction apparatuses of the corresponding category, the recording apparatus is operable to encrypt the content using a content key, to generate N-pieces of encrypted content keys by encrypting the content key using N-pieces of media keys, and to record, onto the recording medium, at least the N-pieces of encrypted media key data, the N-pieces of encrypted content keys, and the encrypted content. The reproduction apparatuses of the respective categories are each operable (a) to read out, from the recording medium, the encrypted media key data for the corresponding category, the encrypted content key for the corresponding category, and the encrypted content, (b) to obtain the media key for the corresponding category by decrypting the encrypted media key data using the held device key, (c) to obtain the content key by decrypting the encrypted content key for the corresponding category using the obtained media key for the corresponding category, and (d) to decrypt the encrypted content using the obtained content key.

Furthermore, in the copyright protection system of the present invention, the recording apparatuses are made up of: second reproduction apparatuses belonging to a second category, each of which is operable to read out and decrypt the encrypted content recorded on the recording medium; and first reproduction apparatuses, each of which includes: a read-out apparatus of the second category operable to read out and perform a part of a decryption process on the encrypted content recorded on the recording medium; and a decryption apparatus of a first category, connected to the read-out apparatus of the second category, operable to perform a part of the decryption process on the encrypted content, wherein the recording apparatus is operable (a) to generate, based on a media key and on device key data held by the decryption apparatuses of the first category, first revocation data intended for revoking a device key held by a specific decryption apparatus of the first category, (b) to generate, based on a media key and on device key data held by the apparatuses of the second category, second revocation data intended for revoking a device key held by a specific apparatus of the second category, (c) to generate an encrypted content which is the content encrypted based on the media key, and (d) to record at least the first revocation data, the second revocation data, and the encrypted content onto the recording medium, the second reproduction apparatuses are each operable to read out the second revocation data and the encrypted content from the recording medium, and to decrypt the encrypted content based on the second revocation data. In each of the first reproduction apparatuses: the read-out apparatus of the second category is operable (a) to read out, from the recording medium, the first revocation data, the second revocation data, and the encrypted content, and (to) supply intermediate data and the first revocation data to the decryption apparatus of the first category; and the decryption apparatus of the first category is operable to obtain the content by performing the decryption process, based on the first revocation data, on the intermediate data supplied by the read-out apparatus of the second category, the intermediate data being the encrypted data on which the part of the decryption process has been performed based on the second revocation data.

Furthermore, the present invention is a recording apparatus which encrypts a content and records the encrypted content, wherein the recording apparatus is operable (a) to generate, for respective N-categories and based on a media key and device key data, revocation data intended for revoking a device key, (b) to generate an encrypted content which is the content encrypted based on the media key, and (c) to record at least the N-pieces of revocation data and the encrypted content onto a recording medium, the device key data being held by reproduction apparatuses classified into N-categories and belonging to the respective categories, the device key being held by a specific reproduction apparatus of the respective categories, and N being a natural number greater than one.

Furthermore, in the abovementioned recording apparatus of the present invention, each of the N-pieces of revocation data is encrypted media key data which is the media key encrypted using the device key data held by the reproduction apparatuses of a corresponding category.

Furthermore, in the abovementioned recording apparatus, the recording apparatus generates an encryption key based on the media key, and to encrypt the content based on the encryption key.

Furthermore, in the abovementioned recording apparatus, the recording apparatus encrypts the content using a content key, generates an encrypted content key which is the content key encrypted using the media key, and records the generated encrypted key onto the recording medium.

Furthermore, in the abovementioned recording apparatus of the present invention, each of the N-pieces of revocation data is encrypted media key data which is a media key for a corresponding category, encrypted using the device key data held by the reproduction apparatuses of the corresponding category, and the recording apparatus is operable (a) to encrypt the content using a content key, (b) to generate N-pieces of encrypted content keys by encrypting the content key using N-pieces of media keys, and (c) to record, onto the recording medium, at least the N-pieces of encrypted media key data, the N-pieces of encrypted content keys, and the encrypted content.

Furthermore, in the abovementioned recording apparatus, the recording apparatus (a) generates, based on a media key and on device key data held by decryption apparatuses of the first category, first revocation data intended for revoking a device key held by a specific decryption apparatus of the first category, (b) generates, based on a media key and on device key data held by apparatuses of the second category, second revocation data intended for revoking a device key held by a specific apparatus of the second category, and (c) generates an encrypted content which is the content encrypted based on the media key, and to record at least the first revocation data, the second revocation data, and the encrypted content onto the recording medium.

Furthermore, the present invention is a recording medium on which a content is recorded, wherein on the recording medium, at least revocation data and an encrypted content are recorded, the revocation data being generated based on a media key and device is key data and intended for revoking a device key, the device key data being held by reproduction apparatuses classified into N-categories and belonging to the respective categories, the device key being held by a specific reproduction apparatus of the respective categories, the encrypted content being generated by encrypting the content based on the media key, and N being a natural number greater than one.

Furthermore, in the abovementioned recording medium, each of the N-pieces of revocation data is encrypted media key data which is the media key encrypted using the device key data held by the reproduction apparatuses of a corresponding category.

Furthermore, in the abovementioned recording medium, the encrypted content is generated by encrypting the content, based on an encryption key generated based on the media key.

Furthermore, in the abovementioned recording medium, the encrypted content is generated by encrypting the content using a content key, and on the recording medium, an encrypted content key is recorded, the encrypted content key being generated by encrypting the content key using the media key.

Furthermore, in the abovementioned recording medium, each of the N-pieces of revocation data is encrypted media key data which is a media key for a corresponding category, encrypted using the device key data held by the reproduction apparatuses of the corresponding category, the encrypted content is generated by encrypting the content using a content key, and on the recording medium, N-pieces of encrypted content keys generated by encrypting the content key using the N-pieces of media keys are recorded.

Furthermore, on the recording medium, at least first revocation data, second revocation data, and the encrypted content are recorded, the first revocation data being generated based on the media key and on device key data held by decryption apparatuses of is a first category and intended for revoking a device key held by a specific decryption apparatus of the first category, the second revocation data being generated based on the media key and on device key data held by apparatuses of a second category and intended for revoking a device key held by a specific apparatus of the second category, and the encrypted content being the content on which an encryption process has been performed based on the media key.

Furthermore, the present invention is a reproduction apparatus which reproduces an encrypted content recorded on a recording medium, wherein the reproduction apparatuses are classified into N-categories, N being a natural number greater than one, on the recording medium, at least revocation data and an encrypted content are recorded, the revocation data being generated based on a media key and device key data and intended for revoking a device key, the device key data being held by the reproduction apparatuses of the respective N-categories, the device key being held by a specific reproduction apparatus of the respective categories, and the encrypted content being generated by encrypting the content based on the media key, and the reproduction apparatus is operable (a) to read out, from the recording medium, revocation data, among the N-pieces of revocation data, which is for the category to which the reproduction apparatus belongs, and the encrypted content, and (b) to decrypt the encrypted content based on the read-out revocation data.

Furthermore, in the reproduction apparatus of the present invention, each of the N-pieces of revocation data is encrypted media key data which is the media key encrypted using the device key data held by the reproduction apparatuses of a corresponding category, and the reproduction apparatuses are operable (a) to read out, from the recording medium, the corresponding encrypted media key data and the encrypted content, (b) to obtain the media key by decrypting the encrypted media key data using the held device key, and (c) to decrypt the encrypted content based on the obtained media key.

Furthermore, in the reproduction apparatus of the present invention, the encrypted content is generated by encrypting the content, based on an encryption key generated based on the media key, and the reproduction apparatus is operable to generate a decryption key based on the obtained media key, and to decrypt the encrypted content based on the generated decryption key.

Furthermore, in the reproduction apparatus of the present invention, the encrypted content is generated by encrypting the content using a content key, on the recording medium, an encrypted content key generated by encrypting the content key using the media key is recorded, and the reproduction apparatus is operable (a) to read out the encrypted content key from the recording medium, (b) to obtain the content key by decrypting the encrypted content key using the media key, and (c) to decrypt the encrypted content using the obtained content key.

Furthermore, in the reproduction apparatus of the present invention, each of the N-pieces of revocation data is encrypted media key data which is a media key for a corresponding category, encrypted using the device key data held by the reproduction apparatuses of the corresponding category, the encrypted content is generated by encrypting the content using a content key, on the recording medium, N-pieces of encrypted content keys generated by encrypting the content key using the N-pieces of media keys are recorded. The reproduction apparatus is operable (a) to read out, from the recording medium, the encrypted media key data for the corresponding category, the encrypted content key for the corresponding category, and the encrypted content, (b) to obtain the media key for the corresponding category by decrypting the encrypted media key data using the held device key, (c) to obtain the content key by decrypting the encrypted content key using the obtained media key for the corresponding category, and (d) to decrypt the encrypted content using the obtained content key.

Furthermore, in the reproduction apparatus of the present invention, on the recording medium, at least first revocation data, second revocation data, and the encrypted content are recorded, the first revocation data being generated based on the media key and on device key data held by decryption apparatuses of a first category and intended for revoking a device key held by a specific decryption apparatus of the first category, the second revocation data being generated based on the media key and on device key data held by apparatuses of a second category and intended for revoking a device key held by a specific apparatus of the second category. The encrypted content is the content on which an encryption process has been performed based on the media key, and the reproduction apparatus belongs to the second category and is operable to read out, from the recording medium, the second revocation data and the encrypted content, and to decrypt the encrypted content based on the second revocation data.

Furthermore, the present invention is a read-out apparatus included in a reproduction apparatus which reproduces an encrypted content recorded on a recording medium, wherein on the recording medium, at least first revocation data, second revocation data, and the encrypted content are recorded. The first revocation data is generated based on a media key and on device key data held by decryption apparatuses of a first category and intended for revoking a device key held by a specific decryption apparatus of the first category, the second revocation data being generated based on the media key and on device key data held by apparatuses of a second category and intended for revoking a device key held by a specific apparatus of the second category. The encrypted content is the content on which an encryption process has been performed based on the media key, and the read-out apparatus belongs to the second category and is operable (a) to read out, from the recording medium, the first revocation data, the second revocation data, and the encrypted content, (b) to generate intermediate data which is the encrypted data on which a part of a decryption process has been performed, based on the second revocation data, and (c) to output the generated intermediate data and the first revocation data.

Furthermore, the present invention is a decryption apparatus included in a reproduction apparatus which reproduces an encrypted content recorded on a recording medium, wherein on the recording medium, at least first revocation data, second revocation data, and the encrypted content are recorded. The first revocation data is generated based on a media key and on device key data held by decryption apparatuses of a first category and intended for revoking a device key held by a specific decryption apparatus of the first category, the second revocation data being generated based on the media key and on device key data held by apparatuses of a second category and intended for revoking a device key held by a specific apparatus of the second category, and the encrypted content being the content on which an encryption process has been performed based on the media key. The read-out apparatuses of the second category are each operable (a) to read out, from the recording medium, the first revocation data, the second revocation data, and the encrypted content, (b) to generate intermediate data which is the encrypted data on which a part of a decryption process has been performed, based on the second revocation data, and (c) to output the generated intermediate data and the first revocation data, and the decryption apparatus belongs to the first category and is operable to obtain the content by performing a decryption process, based on the first revocation data, on the intermediate data supplied by the read-out apparatus of the second category.

Furthermore, the present invention is a reproduction apparatus which reproduces an encrypted content recorded on a recording medium, the reproduction apparatus including: the read-out apparatus according to claim 25; and the decryption apparatus according to claim 26.

Furthermore, the present invention is a copyright protection system including: a key generation apparatus operable to generate and record revocation data necessary for encrypting and decrypting a content, recording apparatuses, each of which is operable to encrypt a content and to record the encrypted content; a recording medium on which the encrypted content and the revocation data are recorded; and reproduction apparatuses, each of which is operable to read out and decrypt the encrypted content recorded on the recording medium, wherein the recording apparatuses and the reproduction apparatuses are classified into N-categories, N being a natural number greater than one. The key generation apparatus is operable (a) to generate, for the respective N-categories and based on a media key and device key data, revocation data intended for revoking a device key, and (b) to record the N-pieces of revocation data onto the recording medium, the device key data being held by one of the recording apparatuses and the reproduction apparatuses belonging to the respective N-categories, the device key being held by one of a specific recording apparatus and a specific reproduction apparatus of the respective categories, the recording apparatuses are each operable (a) to read out, from the recording medium, revocation data among the N-pieces of revocation data, which is for the category to which the recording apparatus belongs, (b) to generate the encrypted content by encrypting the content based on the read-out revocation data, and (c) to record the generated encrypted content on the recording medium. The reproduction apparatuses are each operable (a) to read out, from the recording medium, revocation data among the N-pieces of revocation data, which is for the category to which the reproduction apparatus belongs, and the encrypted content, and (b) to decrypt the encrypted content based on the read-out revocation data.

Furthermore, the present invention is a key generation apparatus which generates, for respective N-categories and based on a media key and device key data, revocation data intended for revoking a device key, and which records the generated N-pieces of revocation data onto a recording medium, the device key data being held by one of the recording apparatuses and the reproduction apparatuses classified into N-categories and belonging to the respective categories, the device key being held by one of a specific recording apparatus and a specific reproduction apparatus of the respective categories, and N being a natural number greater than one.

Furthermore, the present invention is a recording apparatus which encrypts a content and records the encrypted content, wherein the recording apparatus is operable (a) to read out, from a recording medium on which N-pieces of revocation data are recorded, revocation data for a category to which the recording apparatus belongs, (b) to generate an encrypted content by encrypting the content based on the read-out revocation data, and (c) to record the generated encrypted content onto the recording medium. The revocation data is generated based on a media key and device key data and intended for revoking a device key, the device key data being held by one of recording apparatuses and reproduction apparatuses which are classified into N-categories and belonging to the respective categories, the device key being held by one of a specific recording apparatus and a specific reproduction apparatus of the respective categories, and N being a natural number greater than one.

Furthermore, the present invention is a recording method for use in a recording apparatus which encrypts a content and records the encrypted content. The method including: a step of generating, for respective N-categories and based on a media key and device key data, revocation data intended for revoking a device key, the device key data being held by the reproduction apparatuses classified into the N-categories and belonging to the respective N-categories, the device key being held by a specific reproduction apparatus of the respective categories, and N being a natural number greater than one; an encrypted content generation step of generating the encrypted content by encrypting the content, based on the media key; and a recording step of recording at least the N-pieces of revocation data and the encrypted content onto the recording medium.

Furthermore, the present invention is a reproduction method for use in a reproduction apparatus which reproduces an encrypted content recorded on a recording medium, wherein the reproduction apparatuses are classified into N-categories, N being a natural number greater than one, on the recording medium, at least revocation data and the encrypted content are recorded, the revocation data being generated based on a media key and device key data and intended for revoking a device key, the device key data being held by the reproduction apparatuses of the respective N-categories, the device key being held by a specific reproduction apparatus of the respective categories, and the encrypted content being generated by encrypting the content based on the media key, and the reproduction method includes: a read-out step of reading out, from the recording medium: revocation data among the N-pieces of revocation data, for the category to which the reproduction apparatus belongs; and the encrypted content; and a decryption step of decrypting the encrypted content based on the revocation data read out in the read-out step.

Furthermore, the present invention is a program for use in a recording apparatus which encrypts a content and records the encrypted content, the program including: a step of generating, for respective N-categories and based on a media key and device key data, revocation data intended for revoking a device key, the device key data being held by reproduction apparatuses classified into the N-categories and belonging to the respective N-categories, the device key being held by a specific reproduction apparatus of the respective categories, and N being a natural number greater than one; an encrypted content generation step of generating the encrypted content by encrypting the content, based on the media key; a recording step of recording at least the N-pieces of revocation data and the encrypted content onto the recording medium.

Furthermore, the present invention is a program for use in a reproduction apparatus which reproduces an encrypted content recorded on a recording medium, wherein the recording apparatuses are classified into N-categories, N being a natural number greater than one, on the recording medium, at least revocation data and the encrypted content are recorded, the revocation data being generated based on a media key and device key data and intended for revoking a device key, the device key data being held by the reproduction apparatuses of the respective N-categories, the device key being held by a specific reproduction apparatus of the respective categories, and the encrypted content being generated by encrypting the content based on the media key, and the program includes: a read-out step of reading out, from the recording medium: revocation data among the N-pieces of revocation data, for the category to which the reproduction apparatus belongs; and the encrypted content; and a decryption step of decrypting the encrypted content based on the revocation data read out in the read-out step.

DETAILED DESCRIPTION OF THE INVENTION

Hereinafter, the embodiments of the present invention shall be described with reference to the diagrams.

First Embodiment

The first embodiment of the present invention is an application of the present invention in a system in which a content is distributed using a recording medium such as a playback-only DVD, and reproduced using reproduction apparatuses. Note that in the first embodiment, first and second categories are provided for the reproduction apparatuses, and revocation is carried out using different device keys for each category. As such, the first embodiment is characterized by the fact that the revocation systems used for the same recording medium can be classified according to the category of the reproduction apparatuses, and even in the case where, for example, one of the revocation systems is overcome, it is possible to maintain the revocation system belonging to the other category.

Figure 1:
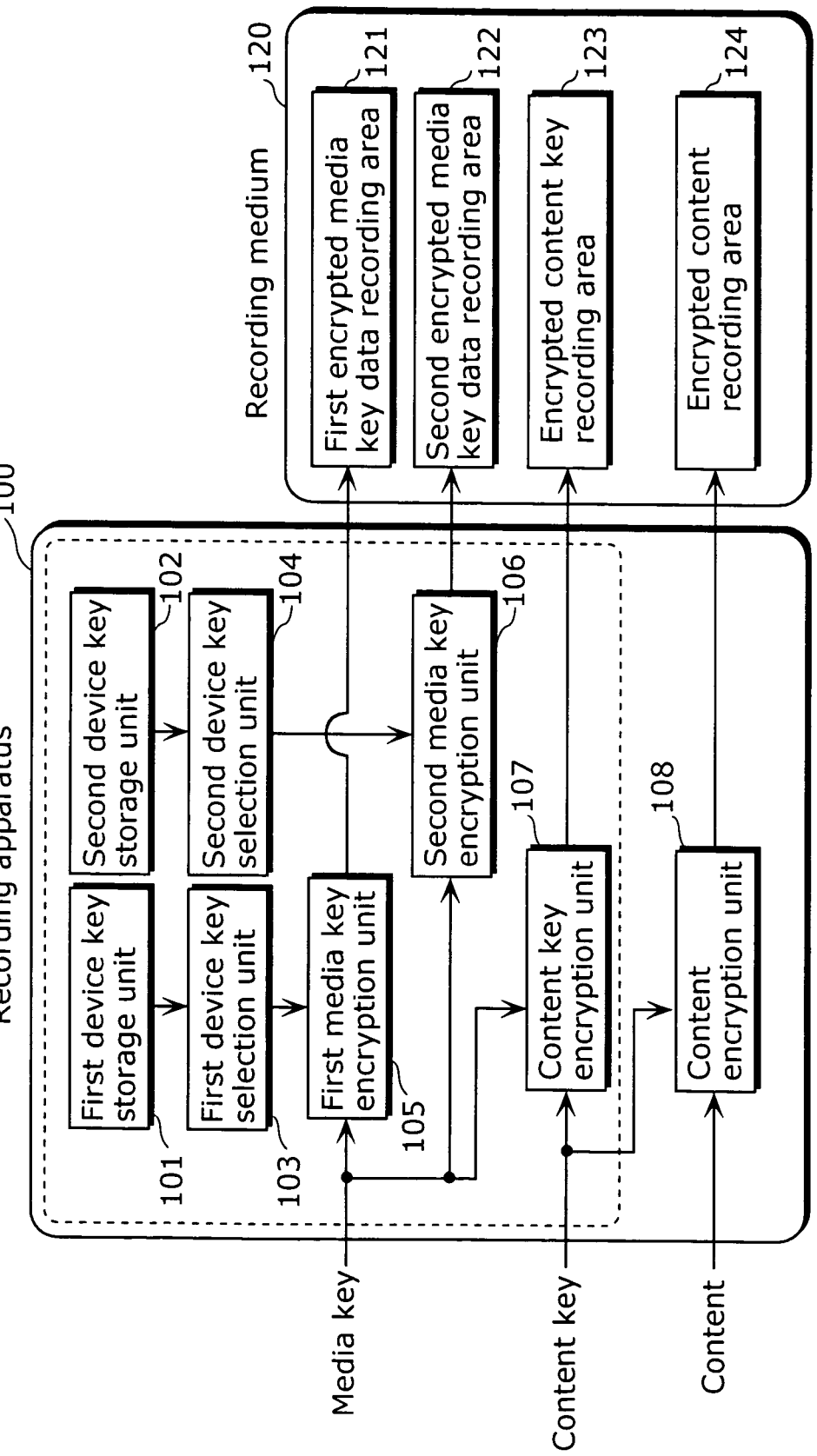
FIG. 1 is a block diagram showing the recording apparatus and the recording medium in the first embodiment of the present invention.
Figure 2:
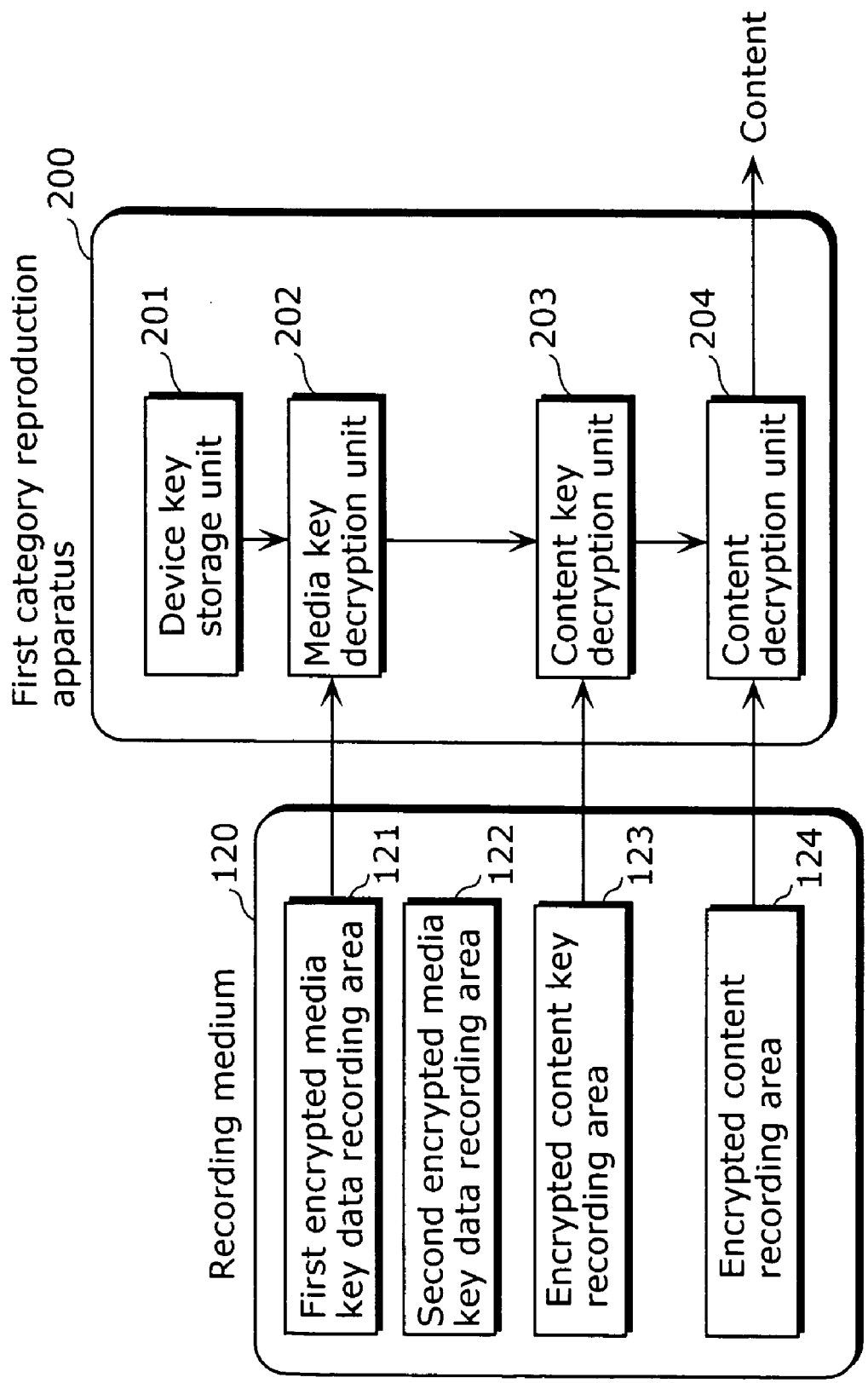
FIG. 2 is a block diagram showing the recording apparatus and the first category reproduction apparatus in the first embodiment of the present invention.
Figure 3:
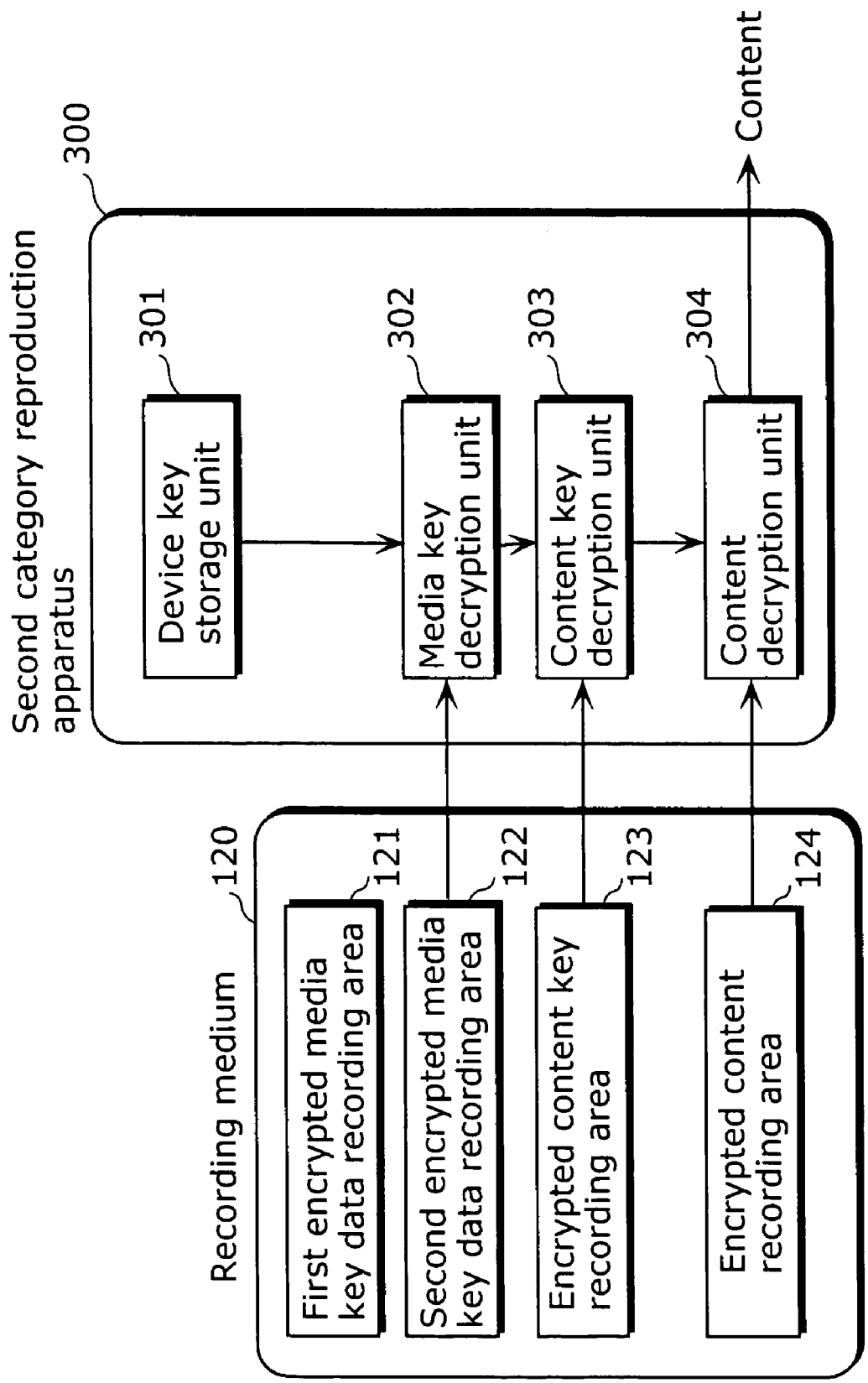
FIG. 3 is a block diagram showing the recording apparatus and the second category reproduction apparatus in the first embodiment of the present invention.
Figure 4:
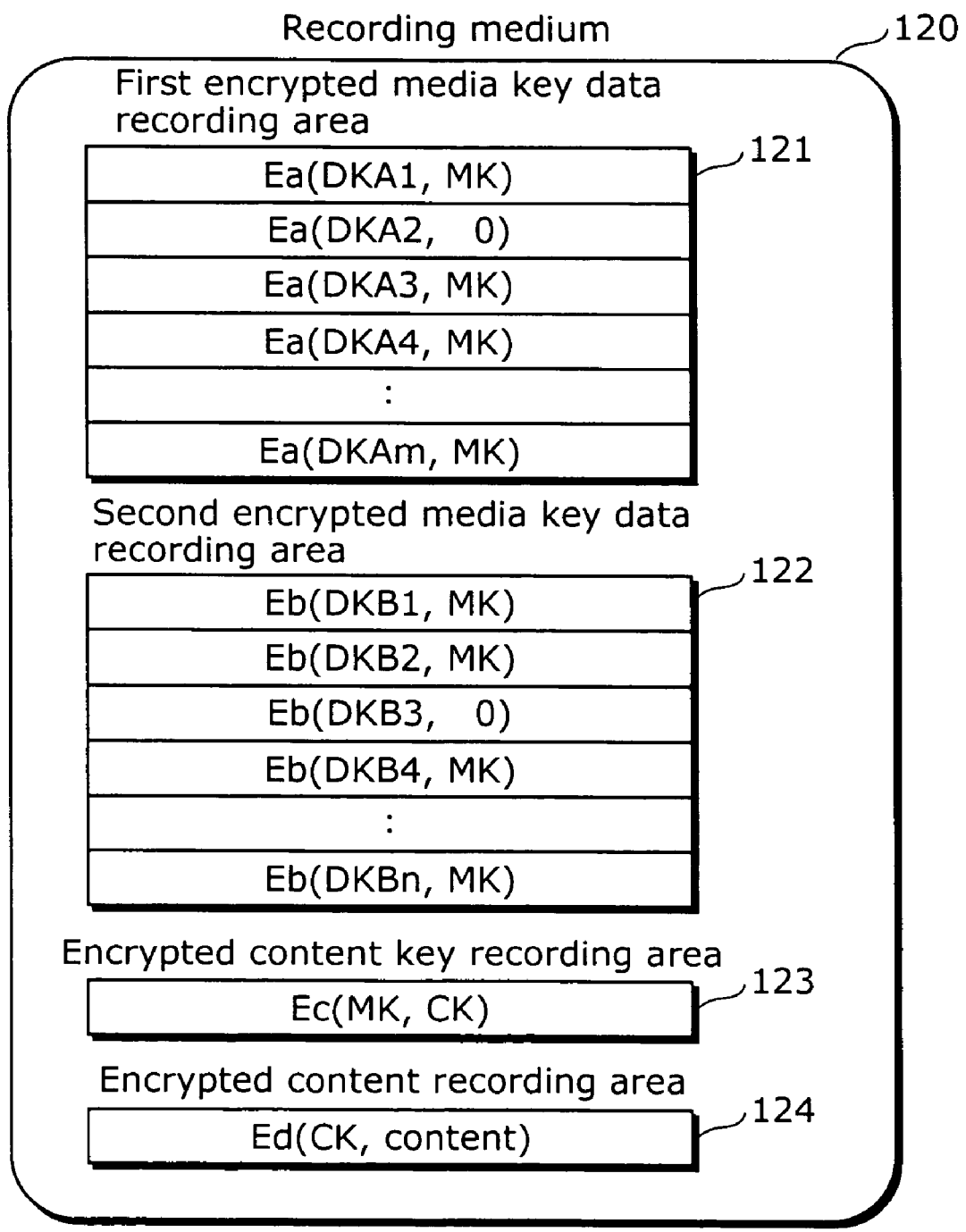
FIG. 4 is a schematic diagram showing a specific example of data to be recorded on the recording medium in the first embodiment of the present invention.

Hereinafter, the first embodiment of the present invention shall be described with reference to the diagrams. FIG. 1 shows a recording apparatus 100 which encrypts a content and records the encrypted content, and a recording medium 120. FIG. 2 shows a first category reproduction apparatus 200 which reads-out and decrypts, the encrypted content from the recording medium 120. FIG. 3 shows a second category reproduction apparatus 300 which reads-out and decrypts, the encrypted content from the recording medium 120. Furthermore, FIG. 4 shows a specific example of various data to be recorded on the recording medium 120.

The recording apparatus 100 is an apparatus which records a content onto each DVD at the time of production for example, and includes the following: a first device key storage unit 101 which stores a device key held confidentially by each reproduction apparatus belonging to the first category; a second device key storage unit 102 which stores a device key held confidentially by each reproduction apparatus belonging to the second category; a first device key selection unit 103 and a second device key selection unit 104, each of which selects a device key to be used for the encryption of a media key; a first media key encryption unit 105 which encrypts a media key inputted from the outside, using the device key selected by the first device key selection unit 103; a second media key encryption unit 106 which encrypts the media key, using the device key selected by the second device key selection unit 104; a content key encryption unit 107 which encrypts, using the media key, a content key inputted from the outside; and a content encryption unit 108 which encrypts a content likewise inputted from the outside.

Note that although it is not shown in FIG. 1, the first media key encryption unit 105 stores information on a reproduction apparatus to be revoked among the reproduction apparatuses in the first category, and the second media key encryption unit 106 stores information on a reproduction apparatus to be revoked among the reproduction apparatuses in the second category. During the generation of the encrypted media key, the encrypted media key is generated in such a way that the correct media key cannot be decrypted by such reproduction apparatuses to be revoked. In addition, different key data is selected for the media key each time a recording medium is manufactured, and different key data is selected for the content key for each content.

The recording medium 120 includes the following: a first encrypted media key data recording area 121 for recording first encrypted media key data generated by the first media key encryption unit 105; a second encrypted media key data recording area 122 for recording second encrypted media key data generated by the second media key encryption unit 106; an encrypted content key recording area 123 for recording the encrypted content key generated by the content key encryption unit 107; and an encrypted content recording area 124 for recording the encrypted content generated by the content encryption unit 108.

The first category reproduction apparatus 200 includes the following: a device key storage unit 201 which confidentially holds a device key; a media key decryption unit 202 which obtains the media key by decrypting, using the device key, the first encrypted media key data which is read out from the recording medium 120; a content key decryption unit 203 which obtains the content key by decrypting, using the obtained media key, the encrypted content key which is read out from the recording medium 120; and a content decryption unit 204 which decrypts, using the obtained content key, the encrypted content which is read out from the recording medium 120. In the present embodiment, a reproduction apparatus which is implemented through software, as in an application program in a personal computer, is assumed as a reproduction apparatus belonging to the first category.

The second category reproduction apparatus 300 includes the following: a device key storage unit 301 which confidentially holds the device key; a media key decryption unit 302 which obtains the media key by decrypting, using the device key, the second encrypted media key data which is read out from the recording medium 120; a content key decryption unit 303 which obtains the content key by decrypting, using the obtained media key, the encrypted content key which is read out from the recording medium 120; and a content decryption unit 304 which decrypts, using the obtained content key, the encrypted content which is read out from the recording medium 120. In the present embodiment, a reproduction apparatus which is implemented through hardware, as in a common household player, is assumed as a reproduction apparatus belonging to the second category.

FIG. 4 shows a specific example of the various data to be recorded on the recording medium 120 in the case where it is assumed that m-units of first category reproduction apparatuses and n-units of second category reproduction apparatuses hold only one unique device key each, and a first category reproduction apparatus 2 and a second category reproduction apparatus 3 are revoked. In FIG. 4, it is assumed that a first category reproduction apparatus "i" (i=1 to m) holds a device key DKAi, a second category reproduction apparatus "j" (j=1 to n) holds a device key DKBj. Furthermore, Ea (X,Y), Eb (X,Y), Ec (X,Y) and Ed (X,Y) represent functions for encrypting data Y using key data X. In addition, the encryption algorithm used can be realized by commonly known technology, and the present embodiment makes use of DES cryptography having a key length of 56 bits.

(The First Encrypted Media Key Data Recording Area 121)

A media key (MK) encrypted using device keys (DKA1 to DKAm) held by the first category reproduction apparatuses is recorded in the first encrypted media key data recording area 121. Here, the first category reproduction apparatus 2 is revoked, and data "0" which has absolutely no relation to the media key (MK), is encrypted and recorded in DKA2. This is the result of having the reproduction apparatus 2 inputted to the first media key encryption unit 105 as the information on the recording apparatus to be revoked within the first category, during the generation of the first encrypted media key, and processed so that the correct media key cannot be obtained by the reproduction apparatus 2.

(The Second Encrypted Media Key Data Recording Area 122)

The media key (MK) encrypted using device keys (DKB1 to DKBn) held by the second category reproduction apparatuses is recorded in the second encrypted media key data recording area 122. Here, the second category reproduction apparatus 3 is revoked, and data "0" which is has absolutely no relation to the media key (MK), is encrypted and recorded in DKB3. This is the result of having the reproduction apparatus 3 inputted to the second media key encryption unit 106 as the information on the recording apparatus to be revoked within the second category, during the generation of the second encrypted media key, and processed so that the correct media key cannot be obtained by the reproduction apparatus 3.

By generating the first and second media key data in this manner, the reproduction apparatuses, apart from the first category reproduction apparatus 2 and the second category recording apparatus 3, are able to decrypt the correct media key (MK), and the first category reproduction apparatus 2 and the second category recording apparatus 3 can be excluded from the system.

(The Encrypted Content Key Recording Area 123)

A content key (CK) which is encrypted using the media key (MK) is recorded in the encrypted content key recording area 123.

(The Encrypted Content Recording Area 124)

A content which is encrypted using the content key (CK) is recorded in the encrypted content recording area 124.

In the above-configured first embodiment of the present invention, in the case where, for example, a number of device keys provided to the first category recording apparatuses and the algorithm for decrypting the first encrypted media key data are illicitly exposed over the Internet, and it is judged that the revocation for the first category reproduction apparatuses has stopped functioning, the revocation system for the first category reproduction apparatuses is updated. Specific examples are described hereinafter.

System Update Specific Example 1

Figure 5:
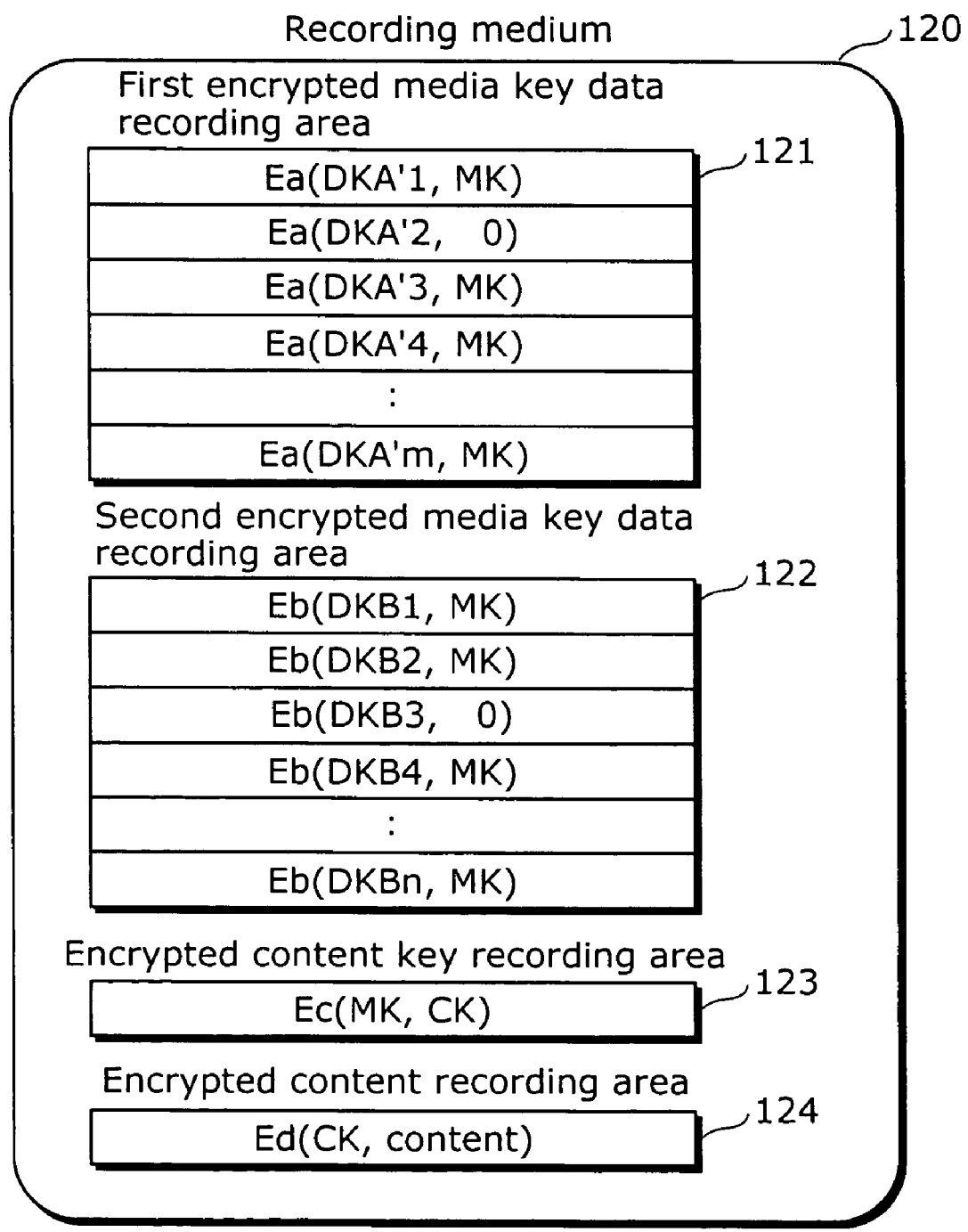
FIG. 5 is a schematic diagram showing specific example 1 of the system update in the first embodiment of the present invention.

FIG. 5 shows a specific example 1 for various data to be recorded on a new recording medium 120 which is created after it is judged that the revocation for the first category reproduction apparatuses has stopped functioning. The difference with FIG. 4 is that the device keys DKA1 to DKAm used in generating the first encrypted media key data are changed to DKA'1 to DKA'm. Here, each device key among the new device keys (DKA'1 to DKA'm) does not match any of the pre-system update device keys (DKA1 to DKAm). As such, it becomes possible to update the revocation system at the time a recording medium 120 is to be manufactured after the revocation function has stopped functioning.

On the other hand, the first category reproduction apparatus 200, which is not revoked, is provided with a new device key which is stored in the device key storage unit 201. For example, a first category reproduction device m holds a newly provided device key (DKA'm) in the device key storage unit 201, in addition to a device key (DKAm) that it has been holding since before. To decrypt the first encrypted media key which is read out from the recording medium, and obtain the media key (MK), the reproduction apparatus m uses the device key DKAm when reproducing the recording medium in FIG. 4, and uses the device key DKA'm when reproducing the post-revocation system update recording medium in FIG. 5. It then uses the obtained media key (MK) to decrypt the encrypted content key and obtain the content key (CK), and then uses the obtained content key (CK) to decrypt the encrypted content and reproduce the content.

Here, as each device key among the new device keys (DKA'1 to DKA'm) does not match any of the pre-system update device keys (DKA1 to DKAm), even when a device key, apart from DKA2, is exposed through an illicit cryptanalysis prior to the system update, the media key (MK) cannot be obtained by using such device key to decrypt the first encrypted media key which is read out from the recording medium in FIG. 5, and the content cannot be reproduced.

Moreover, as the device keys (DKB1 to DKBn) used in the generation of the second encrypted media key data are not changed during the aforementioned system update, no changes have to be made for the reproduction apparatuses belonging to the second category.

System Update Example 2

Figure 6:
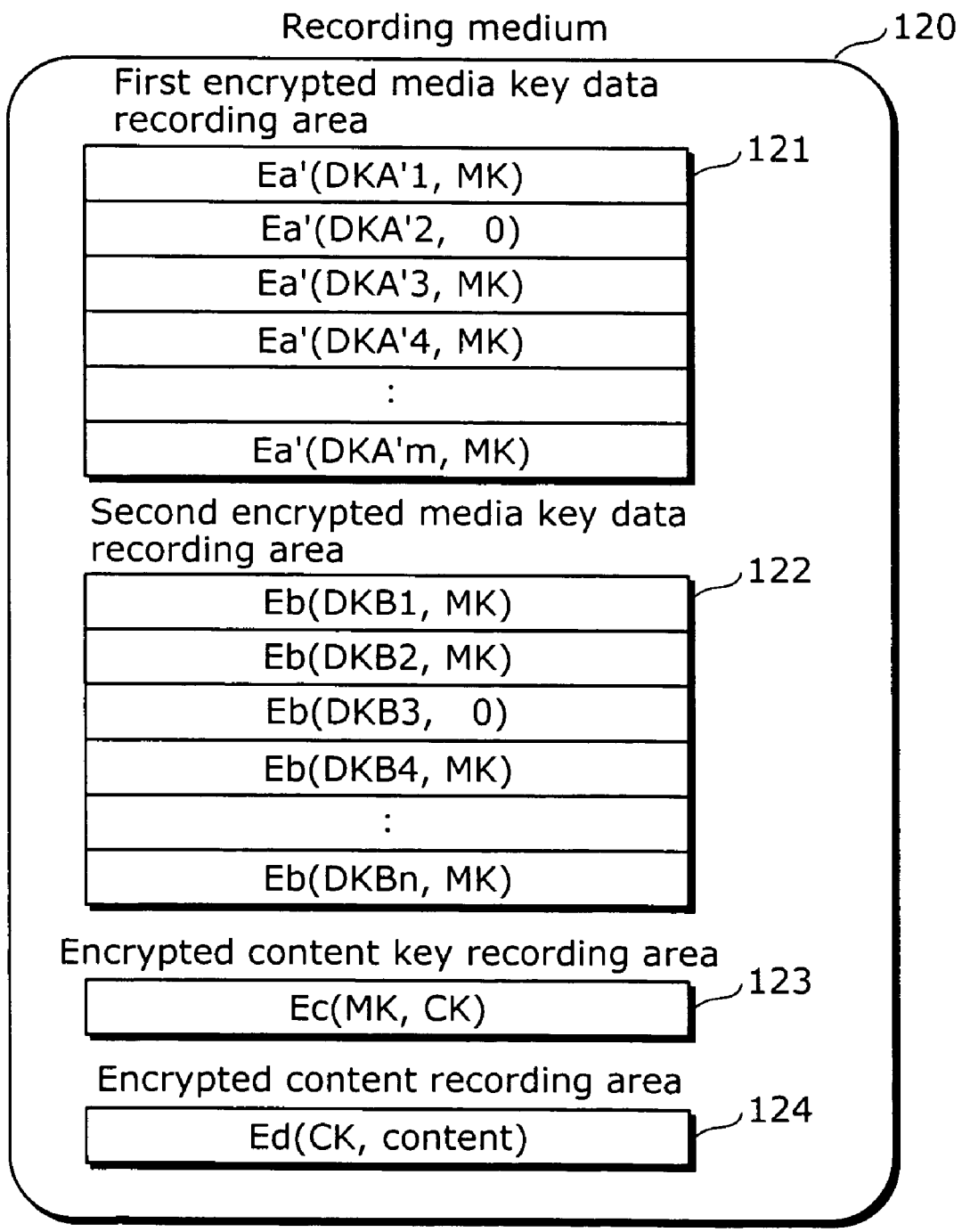
FIG. 6 is a schematic diagram showing specific example 2 of the system update in the first embodiment of the present invention.

FIG. 6 shows a specific example 2 for various data to be recorded on a new recording medium 120 which is created after it is judged that the revocation for the first category reproduction apparatuses has stopped functioning. The difference with FIG. 4 is that the device keys DKA1 to DKAm used in generating the first encrypted media key data are changed to DKA'1 to DKA'm, and the encryption algorithm is changed from Ea (X, Y) to Ea' (X, Y). Here, each device key among the new device keys (DKA'1 to DKA'm) does not match any of the pre-system update device keys (DKA1 to DKAm).

On the other hand, each first category reproduction apparatus 200, which is not revoked, is provided with a new device key which is stored in the device key storage unit 201. Furthermore, a decryption algorithm Da' (X, Y) for decrypting the first encrypted media key data in FIG. 5 is built into the media key decryption unit 202, in addition to a decryption algorithm Da (X, Y) for decrypting the first encrypted media key data in FIG. 4 which has been built-in since before. For example, a first category reproduction device m holds a newly provided device key (DKA'm), in addition to a device key (DKAm) that it has been holding since before. To decrypt the first encrypted media key which is read out from the recording medium, and obtain the media key (MK), the reproduction apparatus m uses the device key DKAm and the encryption algorithm Da (X,Y) when reproducing the recording medium in FIG. 4, and uses the device key DKA'm and the encryption algorithm Da' (X,Y) when reproducing the post-revocation system update recording medium in FIG. 5. It then uses the obtained media key (MK) to decrypt the encrypted content key and obtain the content key (CK), and then uses the obtained content key (CK) to decrypt the encrypted content and reproduce the content. In the present embodiment, Ea (X, Y) and Da (X, Y) use a DES cryptograph having a key length of 56 bits. In contrast, Ea' (X, Y) and Da' (X, Y) use a 112-bit key length cryptograph known as a two-key triple DES.

Here, as each device key among the new device keys (DKA'1 to DKA'm) does not match any of the pre-system update device keys (DKA1 to DKAm), even when a device key, apart from DKA2, is exposed through an illicit cryptanalysis prior to the system update, the media key (MK) cannot be obtained by using such device key to decrypt the first encrypted media key which is read out from the recording medium in FIG. 5, and the content cannot be reproduced.

Furthermore, as it is possible to increase the encryption strength by changing the key length of the device key and the encryption algorithm, practices such as the illicit obtainment of a device key through the cryptanalysis of the system can be hindered.

Moreover, as the device keys (DKB1 to DKBn) used in the generation of the second encrypted media key data, and the encryption algorithm of the second encrypted media key data, are not changed during the aforementioned system update, no changes need to be made for the reproduction apparatuses belonging to the second category.

Note that in both the specific examples 1 and 2 of the system update, information regarding the generations of the system update is recorded on the recording medium. Based on this information, the first category reproduction apparatuses decide on which generation of device key or algorithm to use.

According to the above-configured first embodiment of the present invention, there is no need for the first category reproduction apparatus 200 and the second category reproduction apparatus 300 to read the first or second encrypted media key data which are for revoking respective reproduction apparatuses of the different categories. Therefore, the memory capacity provided within the apparatus can be made smaller and processing time can be reduced. Furthermore, the encryption algorithm used in generating the first encrypted media key data can be made different from the encryption algorithm used in generating the second encrypted media key data. Therefore, even in the case where the revocation system of the first category reproduction apparatuses falls into a situation where it is exposed, the revocation system can be changed, without affecting the second category reproduction apparatuses, by changing (a) the key length of the device keys provided to the first category reproduction apparatuses and (b) the generation algorithm of the first encrypted media key data. This is particularly effective in the case where, as in the present embodiment, (a) the first category refers to a reproduction apparatus implemented through software for which updating and adding of decryption algorithms and keys is easy but sturdy implementation is difficult, and (b) the second category refers to a reproduction apparatus implemented through hardware which is sturdy but updating and adding of decryption algorithms and keys is difficult. Furthermore, for example, a PC which realizes content decryption through an application is provided as a reproduction apparatus belonging to the first category, and a consumer device such as a DVD player which realizes content decryption through hardware is provided as a reproduction apparatus belonging to the second category.

Moreover, although in FIG. 1 in the present embodiment, a configuration is assumed in which the media key and content key are inputted from a source outside of the recording apparatus 100, the present invention is not limited to such configuration. For example, it is also possible to have a configuration in which the recording apparatus 100 includes a storage unit for storing the media key and the content key. Furthermore, it is also possible for to have a configuration in which the recording apparatus 100 includes a generation unit which generates the media key and the content key as required.

Furthermore, although in FIG. 1 in the present embodiment, a two-stage configuration is assumed in which the content is encrypted using a content key, and then the content key is encrypted using the media key, the present invention is not limited to such configuration. For example, it is also possible to have a single-stage configuration in which a content is encrypted directly using a media key. In addition, it is also possible to have a configuration in which the stages for encryption are further increased through the addition of keys.

Furthermore, as shown in FIG. 1, the recording apparatus in the present embodiment assumes an integrated configuration for the device key storage unit and the media key encryption unit for each category, the content key encryption unit, the content encryption unit, as well as the recording of respective data onto the recording medium. However, the present invention is not limited to such, and it is possible to have a configuration in which the recording apparatus is separated. For example, it is also possible to have a configuration in which (a) the device key storage unit and the media key encryption unit for each category, as well as the content key encryption unit (the section enclosed in broken lines in FIG. 1) are built into an apparatus which is provided in a facility which operates the key management of the entire system and the key issuance for the reproduction apparatuses, as their management and operation require great confidentiality, and (b) the content encryption unit and the recording of respective data onto the recording medium is executed by an apparatus provided in a content manufacturing facility or a recording medium manufacturing facility.

Furthermore, in the present embodiment, during the generation of the first encrypted media key data in the system updating, data is also assigned to the revoked reproduction apparatuses at the time of system updating, as in Ea (DKA'2, 0) in FIG. 5 and Ea' (DKA'2, 0) in FIG. 6. However, it is also possible to is have a configuration in which data is not assigned to a revoked recording apparatus. In that case, the position of the encrypted media key to be used by the reproduction apparatuses which are not revoked is also updated, and by providing new position information when a new device key is provided, the reproduction apparatuses that are not revoked can use the appropriate data and obtain the correct media key even if there is a change in the position of the encrypted media key before and after the system update. In such a case, the volume of data that needs to be stored in the first encrypted media key data recording area after the system update can be reduced. Alternatively, when the maximum value for the volume is limited, the number of new reproduction apparatuses belonging to the first category can be increased.

Furthermore, although the present embodiment adopts a method in which revocation of a reproduction apparatus is performed using encrypted media key data such as that shown in FIG. 4, a different method can be used for the method for revocation. For example, the revocation method utilizing a tree-structure, disclosed in patent reference 1 can also be used.

Furthermore, although the present embodiment makes use of the DES having a 56-bit key length as the encryption algorithm, and the two-key triple DES having a 112-bit key length as the post-system update algorithm, the present invention is not limited to such, and can also use other encryption algorithms such as AES having a 128-bit key length, for example, which is referred to as a next-generation standard cryptograph.

Second Embodiment

The second embodiment of the present invention is characterized by the application of the present invention in a system in which a content encrypted using a content key is recorded onto a recording medium such as a rewritable or recordable DVD-RAM and DVD-R, by a recording apparatus such as a DVD recorder, and the encrypted content is reproduced by a reproduction apparatus after being decrypted using a content key.

Figure 7:
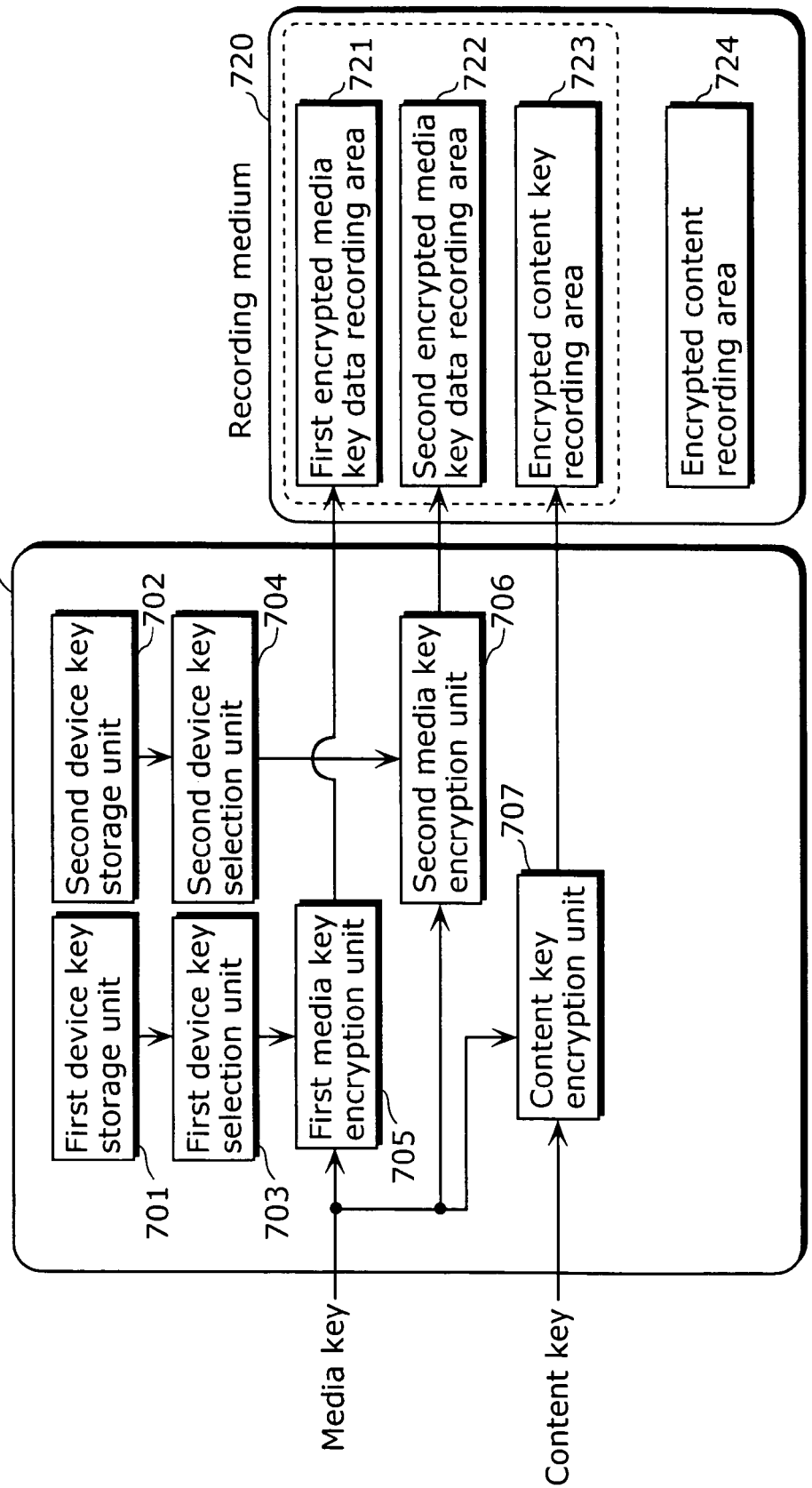
FIG. 7 is a block diagram showing the key generation apparatus and the recording medium in the second embodiment of the present invention.
Figure 8:
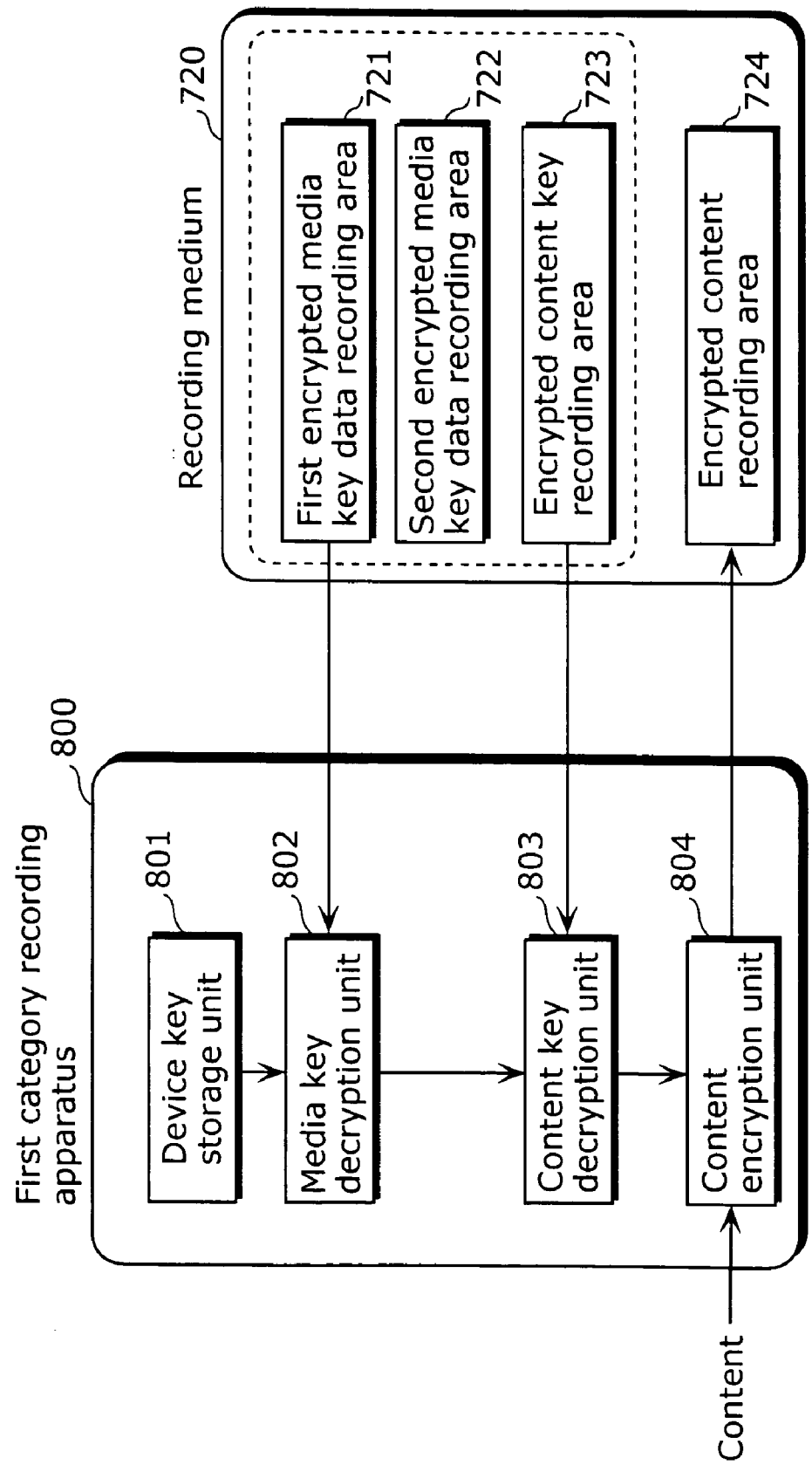
FIG. 8 is a block diagram showing the first category recording apparatus and the recording medium in the second embodiment of the present invention.
Figure 9:
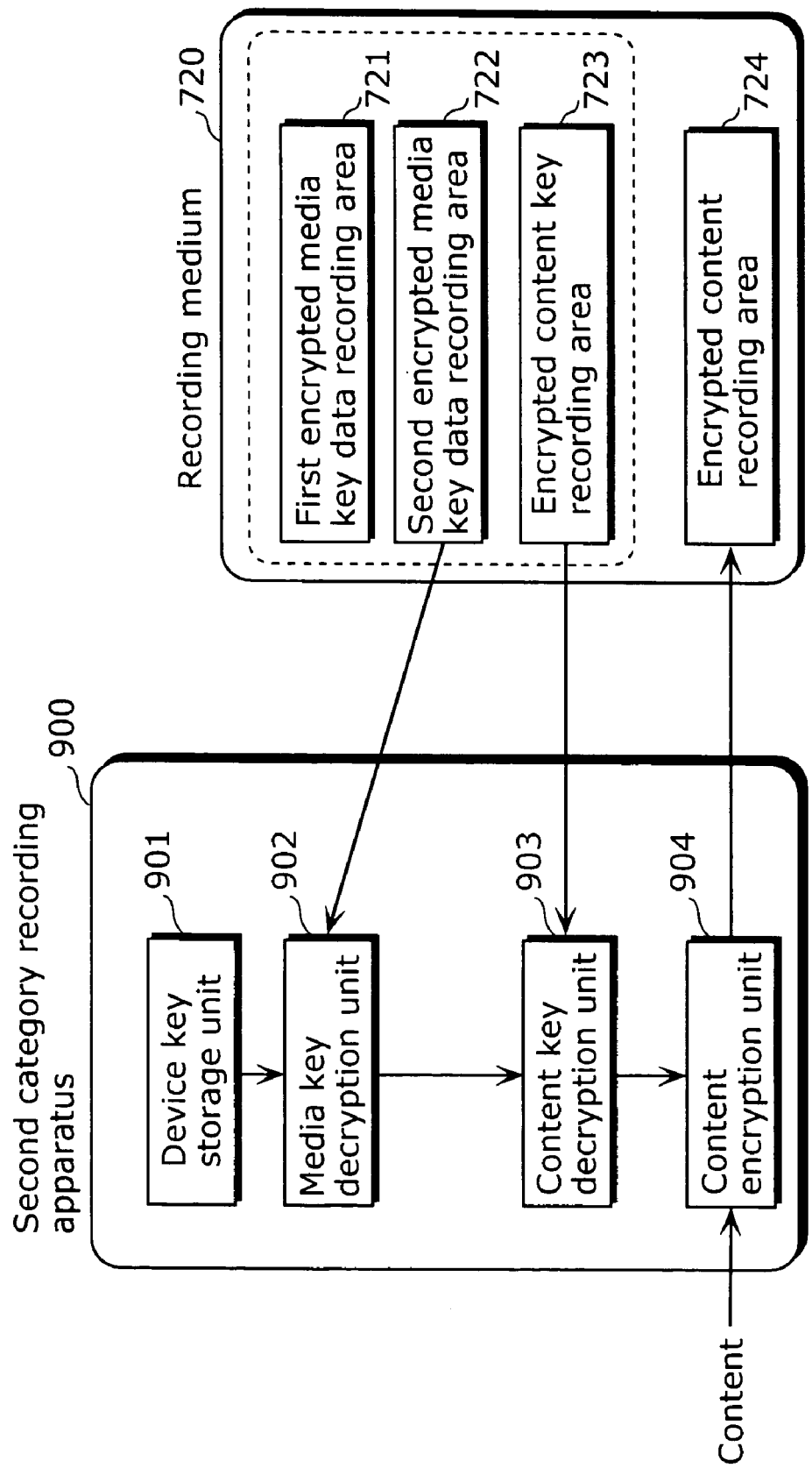
FIG. 9 is a block diagram showing the second category recording apparatus and the recording medium in the second embodiment of the present invention.
Figure 10:
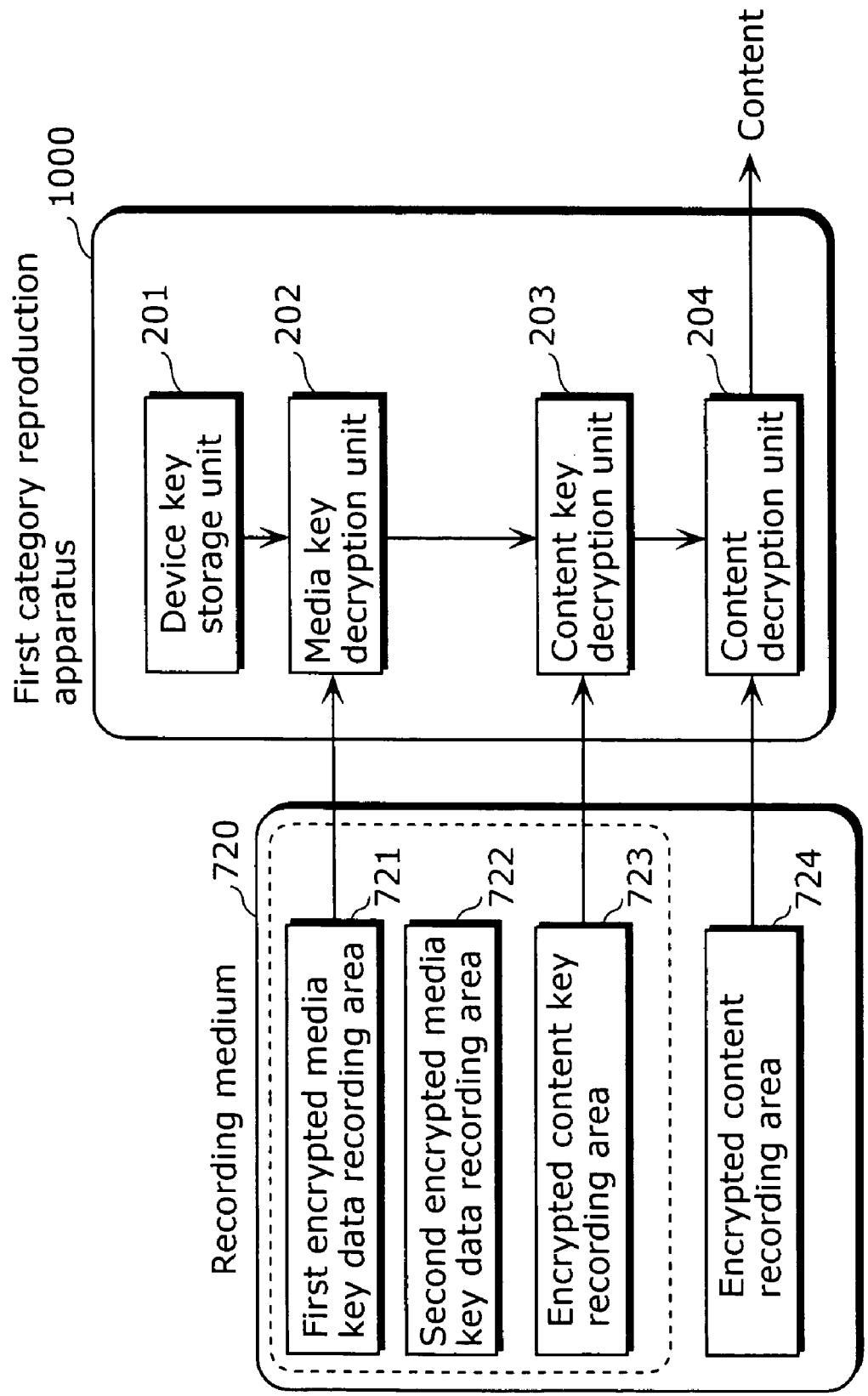
FIG. 10 is a block diagram showing the recording medium and the first category reproduction apparatus in the second embodiment of the present invention.
Figure 11:
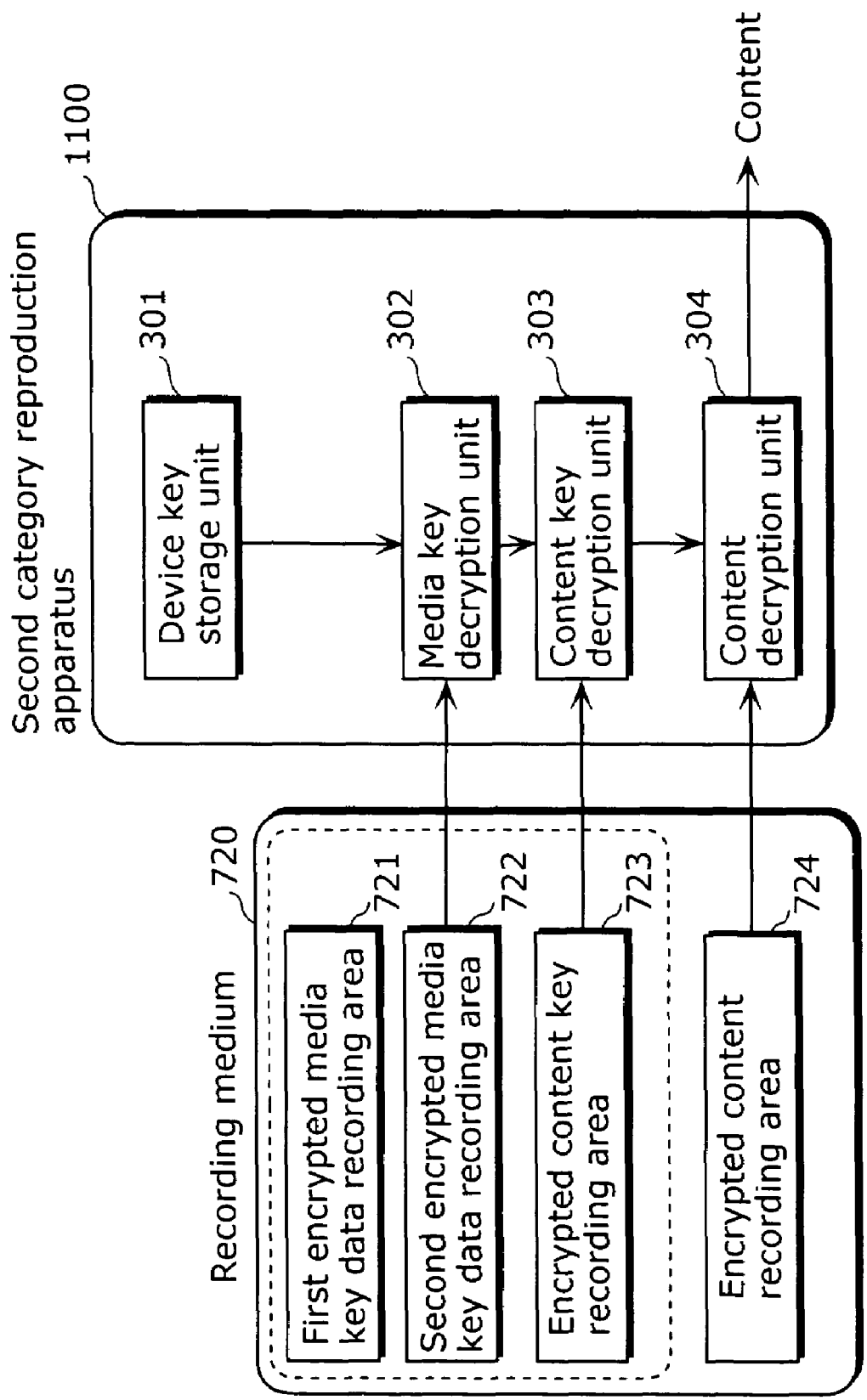
FIG. 11 is a block diagram showing the recording medium and the second category reproduction apparatus in the second embodiment of the present invention.
Figure 12:
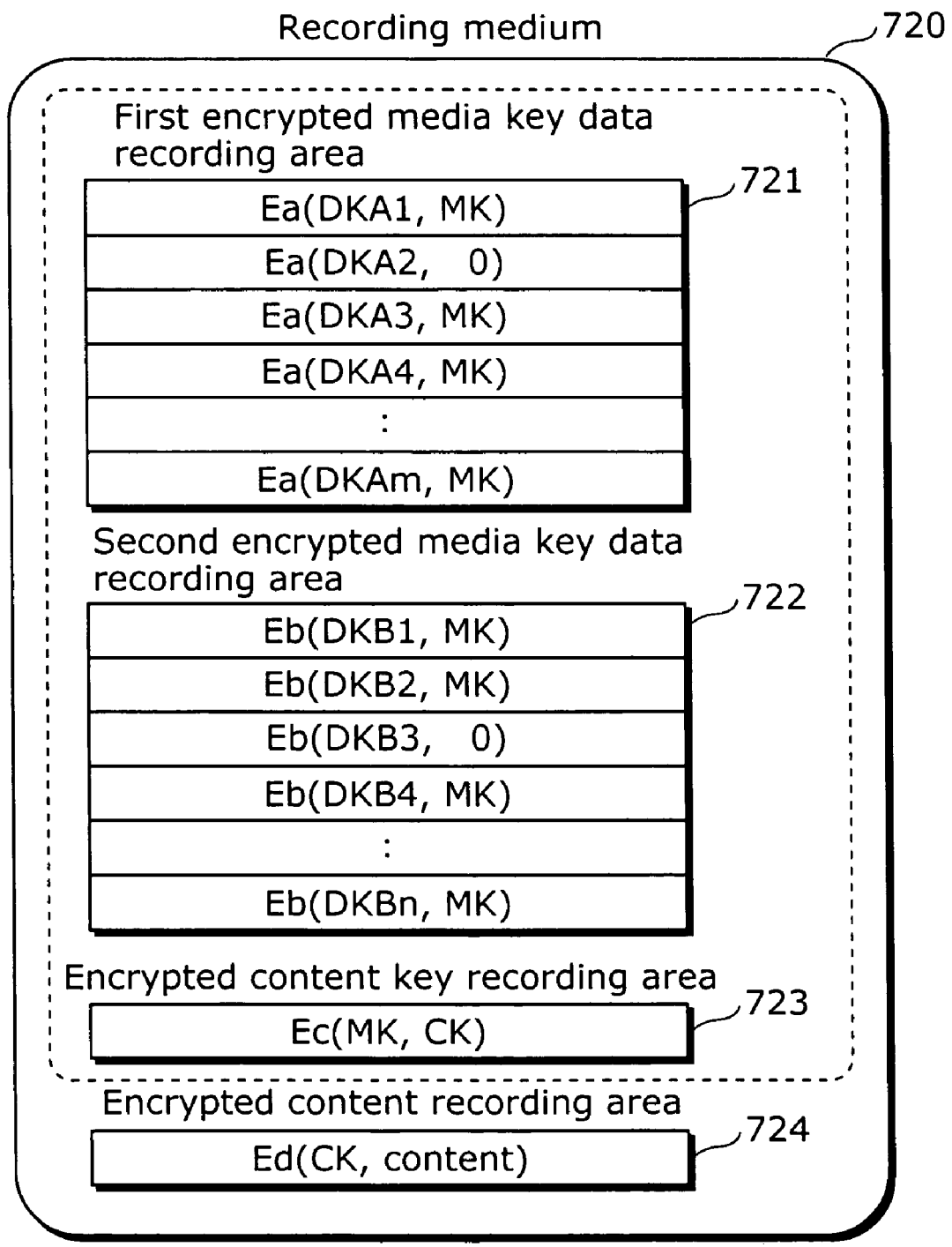
FIG. 12 is a schematic diagram showing a specific example of data to be recorded on the recording medium in the second embodiment of the present invention.

Hereinafter, the second embodiment of the present invention shall be described with reference to the diagrams. FIG. 7 shows a key generation apparatus 700 which generates and records key information, and a recording medium 720. FIG. 8 shows a first category recording apparatus 800 which encrypts a content and records the encrypted content onto the recording medium 720. FIG. 9 shows a second category recording apparatus 900 which encrypts the content and records the encrypted content onto the recording medium 720. FIG. 10 shows a first category reproduction apparatus 1000 which reads out the encrypted content from the recording medium 720 and decrypts the encrypted content. FIG. 11 shows a second category reproduction apparatus 1100 which reads out the encrypted content from the recording medium 720 and decrypts the encrypted content. Furthermore, FIG. 12 shows a specific example of various data to be recorded on the recording medium 120.

The key generation apparatus 700 respectively stores device keys held confidentially by each apparatus in the first category, into a first device key storage unit 701, and device keys held confidentially by each apparatus in the second category, into a second device key storage unit 702. As the encryption of media keys and content keys is the same as in the recording apparatus mentioned previously in the first embodiment, description shall be omitted.

The recording medium 720 includes a first encrypted media key data recording area 721, a second encrypted media key data recording area 722, an encrypted content key recording area 723, and an encrypted content recording area 724. Here, the first encrypted media key data recording area 721, the second encrypted is media key data recording area 722, and the encrypted content key recording area 723, enclosed in broken lines, are areas that cannot be recorded onto by the first category recording apparatus 800 and the second category recording apparatus 900. On the other hand, the encrypted content recording area is an area that can be recorded onto by the first category recording apparatus 800 and the second category recording apparatus 900.

The first category recording apparatus 800 includes the following: a device key storage unit 801 which stores a device key confidentially; a media key decryption unit 802 which obtains a media key by decrypting, using the device key, a first encrypted media key data which is read out from the recording medium 720; a content key decryption unit 803 which obtains the content key by decrypting, using the obtained media key, the encrypted content key which is read out from the recording medium; and a content encryption unit 804 which encrypts, using the obtained content key, a content which is inputted from the outside. In the present embodiment, a reproduction apparatus which is implemented through software, as in an application program in a personal computer, is assumed as a reproduction apparatus belonging to the first category.

The second category recording apparatus 900 includes the following: a device key storage unit 901 which stores a device key confidentially; a media key decryption unit 902 which obtains a media key by decrypting, using the device key, the second encrypted media key data which is read out from the recording medium 720; a content key decryption unit 903 which obtains the content key by decrypting, using the obtained media key, the encrypted content key which is read out from the recording medium; and a content encryption unit 904 which encrypts, using the obtained content key, a content which is inputted from the outside. In the present embodiment, a reproduction apparatus which is implemented through hardware, as in a common household recorder, is assumed as a reproduction apparatus belonging to the second category.

The first category reproduction apparatus 1000 and the second category reproduction apparatus 1100 respectively have the same structure as the first category reproduction unit 200 and the second category reproduction unit 300 in the aforementioned first embodiment of the present invention. The same numbering is given to the identical component elements and their description shall be omitted.

FIG. 12 shows a specific example of various data to be recorded onto the recording medium 720 in the case where it is assumed that m-units of first category apparatuses and n-units of second category apparatuses hold only one unique device key each, and a first category apparatus 2 and a second category apparatus 3 are revoked. In FIG. 12, it is assumed that a first category apparatus "i" (i=1 to m) holds a device key DKAi, a second category apparatus "j" (j=1 to n) holds a device key DKBj. Note that as the data recorded in the first encrypted media key data recording area 721, the second encrypted media key data recording area 722, the encrypted content key recording area 723, and the encrypted content recording area 724 are respectively the same as the data recorded in the first encrypted media key data recording area 121, the second encrypted media key data recording area 122, the encrypted content key recording area 123, and the encrypted content recording area 124 in the first embodiment of the present invention, their description shall be omitted.

According to the present embodiment, with the aforementioned configuration, the apparatuses, apart from the first category apparatus 2 and the second category apparatus 3, are able to decrypt the correct media key (MK), and the first category apparatus 2 and the second category apparatus 3 can be excluded is from the system.

Furthermore, in the present embodiment, in the case where it is judged that the revocation for the first category apparatuses has stopped functioning, the revocation system for the first category apparatuses is updated. Description of the updating method shall be omitted as the same method as that mentioned previously in the first embodiment of the present invention can be adopted.

Moreover, as the device keys (DKB1 to DKBn) used in generating the second encrypted media key are not changed during the system update, no changes need to be made for recording apparatuses and reproduction apparatuses belonging to the second category.

According to above-configured second embodiment of the present invention, there is no need for first category apparatuses (the recording apparatus 800 and the reproduction apparatus 1000) and second category apparatuses (the recording apparatus 900 and the reproduction apparatus 1100) to read the first or the second encrypted media key data which are for revoking respective reproduction apparatuses of the different categories. Therefore, the memory capacity provided within the apparatus can be made smaller and processing time can also be reduced. Furthermore, the encryption algorithm used in generating the first encrypted media key data can be made different from the encryption algorithm used in generating the second encrypted media key data. Therefore, even in the case where the revocation system of the first category apparatuses falls into a situation where it is exposed, the revocation system can be changed, without affecting the second category apparatuses, by changing (a) the key length of the device keys provided to the first category apparatuses and (b) the generation algorithm of the first encrypted media key data. This is particularly effective in the case where, as in the first embodiment, (a) the first category refers to an apparatus implemented through software for which updating and adding of decryption algorithms and keys is easy but sturdy implementation is difficult, and (b) the second category refers to an apparatus implemented through hardware which is sturdy but updating and adding of decryption algorithms and keys is difficult.

Moreover, although the present embodiment adopts a configuration in which the recording apparatus and reproduction apparatus of each category are different apparatuses, the present embodiment is not limited to this configuration. For example, it is also possible to have a configuration in which a recording apparatus and a reproduction apparatus are in the same apparatus.

Furthermore, although in FIG. 7 in the present embodiment, a configuration is assumed in which the media key and content key are inputted from a source outside of the key generation apparatus 700, the present invention is not limited to such configuration. For example, it is also possible to have a configuration in which the key generation apparatus 700 includes a storage unit for storing the media key and the content key. Furthermore, it is also possible for to have a configuration in which the key generation apparatus 700 includes a generation unit which generates the media key and the content key as required.

Furthermore, although in FIG. 8 and FIG. 9 in the present embodiment, a two-stage configuration is assumed in which the content key is obtained by decrypting the encrypted content key using the media key, and then the content is encrypted using the obtained content key, the present invention is not limited to such configuration. For example, it is also possible to have a single-stage configuration in which a content is encrypted directly using a media key. Furthermore, it is also possible to have a configuration in which a content is encrypted using a content key generated within the recording apparatus, then the content key is encrypted using a media key, and then the encrypted content and the encrypted content key are recorded onto a recording medium. In addition, it is also possible to have a configuration in which the stages for encryption are further increased through the addition of keys.

Furthermore, as shown in FIG. 7, in the present embodiment, the key generation unit assumes an integrated configuration for the device key storage unit and the media key encryption unit for each category, the content key encryption unit, as well as the recording of respective data onto the recording medium. However, the present invention is not limited to such configuration. For example, it is also possible to have a configuration in which (a) the device key storage unit and the media key encryption unit for each category, as well as the content key encryption unit are built into an apparatus which is provided in a facility which operates the key management of the entire system and the key issuance for the reproduction apparatuses, as their management and operation require great confidentiality, and (b) the recording of respective data onto the recording medium is executed by an apparatus provided in a recording medium manufacturing facility. Generally, a rewritable or recordable optical disc includes an area that can be recorded on using the recording apparatus possessed by a common user, and a playback-only area which cannot be recorded onto using the recording apparatus possessed by the common user. A disc manufacturer records data onto the playback-only area prior to shipment. In this case, the recording of data onto the playback-only area by the disc manufacturer is generally carried out by recording the data in a master referred to as a stamper, and using such stamper in a pressing operation. The present invention can be applied even in the case where the encrypted media key data is recorded onto the recording medium in such an operation for recording data onto the playback-only area by a disc manufacturer.

Third Embodiment

The third embodiment of the present invention is an application of the present invention in a system in which a content is distributed using a playback-only recording medium, and the distributed content is reproduced using reproduction apparatuses, as in the first embodiment. Furthermore, it is characterized by recording revocation data, which is read by reproduction apparatuses belonging to a first and second category, onto a recording medium using two media keys, a first and a second media key, per recording medium.

Figure 13:
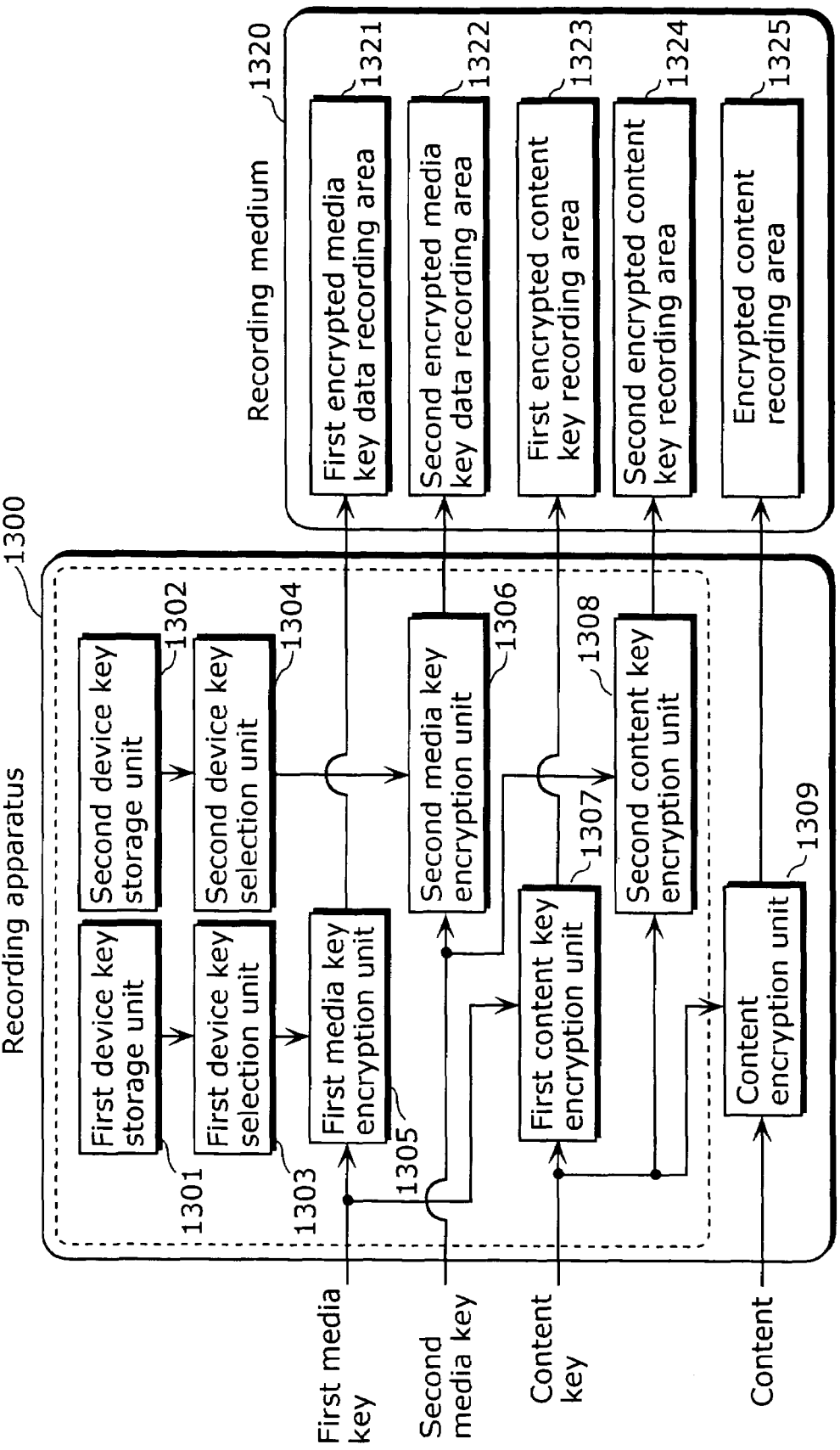
FIG. 13 is a block diagram showing the recording apparatus and the recording medium in the third embodiment of the present invention.
Figure 14:
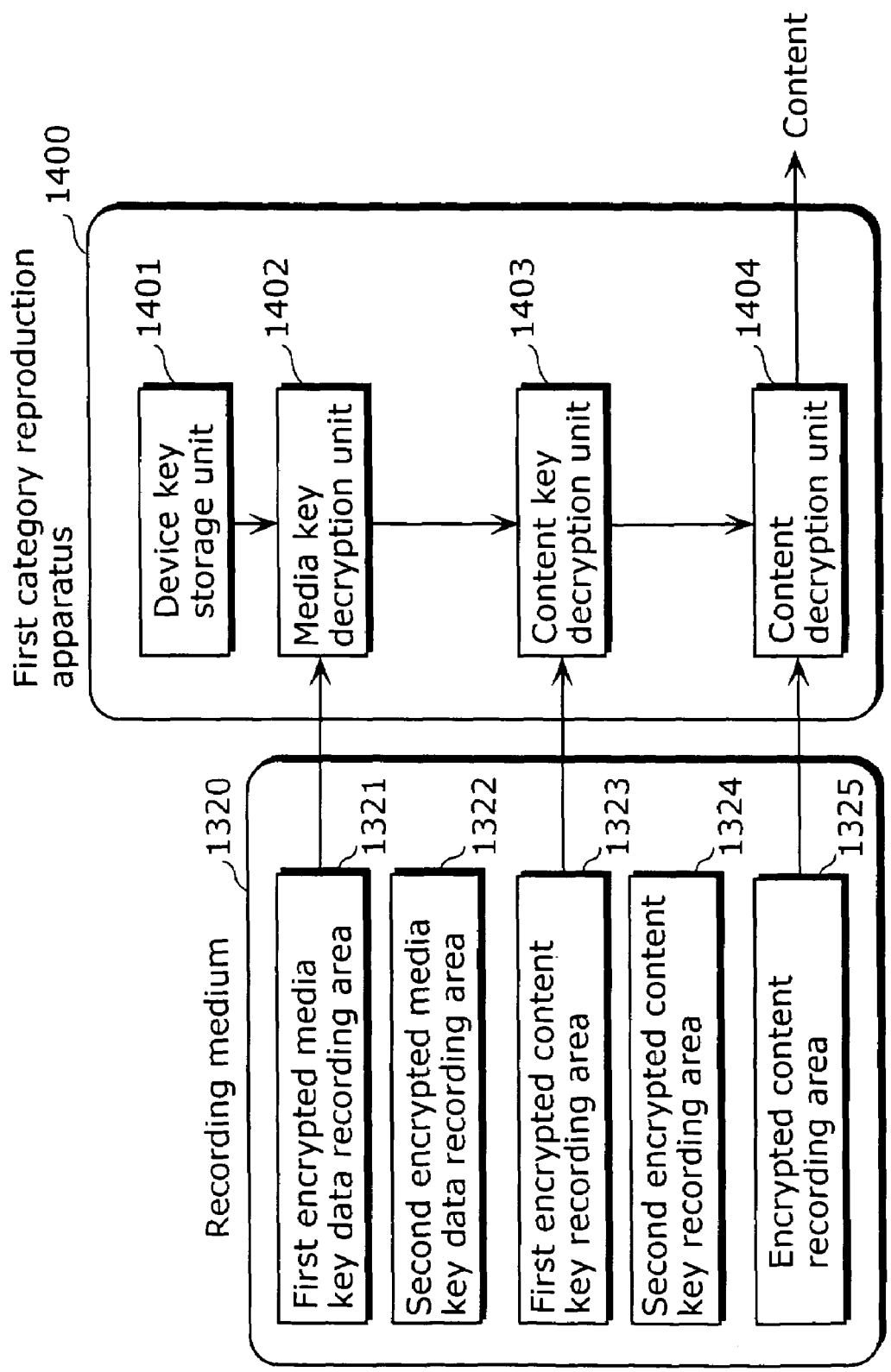
FIG. 14 is a block diagram showing the recording medium and the first category reproduction apparatus in the third embodiment of the present invention.
Figure 15:
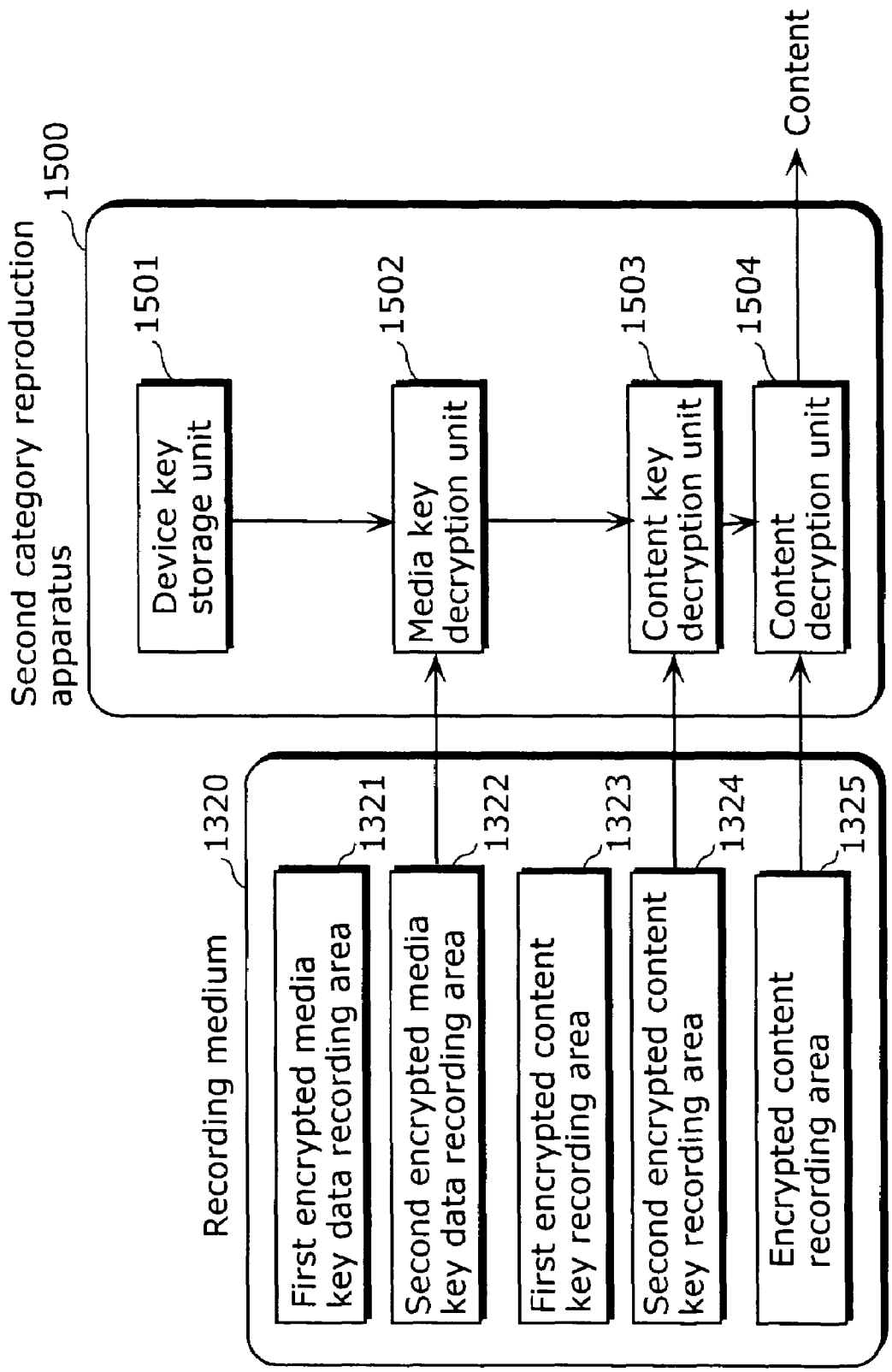
FIG. 15 is a block diagram showing the recording medium and the second category reproduction apparatus in the third embodiment of the present invention.
Figure 16:
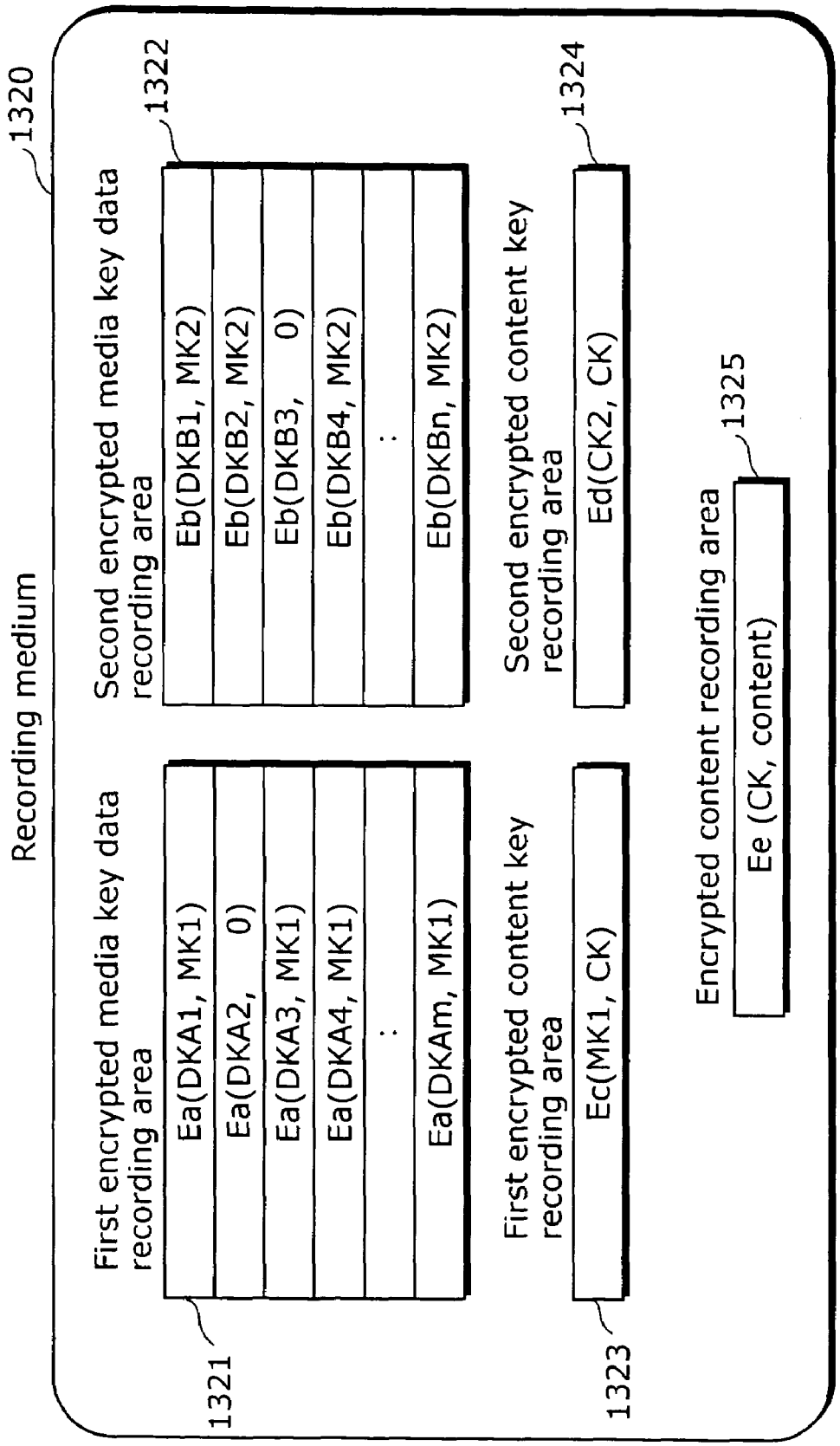
FIG. 16 is a schematic diagram showing a specific example of data to be recorded on the recording medium in the third embodiment of the present invention.

Hereinafter, the third embodiment of the present invention shall be described with reference to the diagrams. FIG. 13 shows a recording apparatus 1300 which encrypts a content and records the encrypted content, and a recording medium 1320. FIG. 14 shows a first category reproduction apparatus 1400 which reads-out and decrypts, the encrypted content from the recording medium 1320. FIG. 15 shows a second category reproduction apparatus 1500 which reads-out and decrypts, the encrypted content from the recording medium 1320. Furthermore, FIG. 16 shows a specific example of various data to be recorded on the recording medium 1320.

The recording apparatus 1300 in FIG. 13 is different from the recording apparatus in FIG. 1 in being separately provided with a first media key for the first category and a second media key for the second category, and encrypting the first and second media keys in a first media key encryption unit 1305 and a second media key encryption unit 1306, respectively, then encrypting a content key in a first content key encryption unit 1307 and a second content key encryption unit 1308 using the first and the second media keys, respectively, and then recording the output on the recording medium 1320. As the rest of the points are the same as in the recording apparatus 100 in FIG. 1, description shall be omitted.

The recording medium 1320 includes the following: a first encrypted media key data recording area 1321 for recording first encrypted media key data generated by the first media key encryption unit 1305; a second encrypted media key data recording area 1322 for recording second encrypted media key data generated by the second media key encryption unit 1306; a first encrypted content key recording area 1323 for recording the first encrypted content key generated by the first content key encryption unit 1307; a second encrypted content key recording area 1324 for recording the second encrypted content key generated by the second content key encryption unit 1308; and an encrypted content recording area 1325 for recording the encrypted content generated by the content encryption unit 1309.

The first category reproduction apparatus 1400 and the second category reproduction apparatus 1500 obtain the content key by respectively decrypting the first and the second encrypted content keys read out from the recording medium 1320. As the rest of the points are the same as in the first category reproduction apparatus 200 and the second category reproduction apparatus 300 in the first embodiment, their description shall be omitted.

FIG. 16 shows a specific example of the various data to be recorded on the recording medium 1320 in the case where it is assumed that m-units of first category reproduction apparatuses and n-units of second category reproduction apparatuses hold only one unique device key each, and a first category reproduction apparatus 2 and a second category reproduction apparatus 3 are revoked. In FIG. 16, it is assumed that a first category reproduction apparatus "i" (i=1 to m) holds a device key DKAi, a second category reproduction apparatus "j" (j=1 to n) holds a device key DKBj. Furthermore, Ea (X, Y), Eb (X, Y), Ec (X, Y) and Ed (X, Y), and Ee (X, Y) represent functions for encrypting data Y using key data X. In addition, the encryption algorithm used can be realized is by commonly known technology, and the present embodiment makes use of DES cryptography having a key length of 56 bits.

(The First Encrypted Media Key Data Recording Area 1321)

A first media key (MK1) encrypted using device keys (DKA1 to DKAm) held by the first category reproduction apparatuses is recorded in the first encrypted media key data recording area 1321. Here, the first category reproduction apparatus 2 is revoked, and data "0" which has absolutely no relation to the first media key (MK1), is encrypted and recorded in DKA2. This is the result of having the reproduction apparatus 2 inputted to the first media key encryption unit 1305 as the information on the recording apparatus to be revoked within the first category, during the generation of the first encrypted media key data, and processed so that the correct media key cannot be obtained by the reproduction apparatus 2. By generating first encrypted media key data in this manner, the first category reproduction apparatuses, apart from the reproduction apparatus 2, are able to decrypt the correct, first media key (MK1), and the first category reproduction apparatus 2 can be excluded from the system.

(The Second Encrypted Media Key Data Recording Area 1322)

A second media key (MK2) encrypted using device keys (DKB1 to DKBn) held by the second category reproduction apparatuses is recorded in the second encrypted media key data recording area 1322. Here, the second category reproduction apparatus 3 is revoked, and data "0" which has absolutely no relation to the second media key (MK2), is encrypted and recorded in DKB3. This is a result of having the reproduction apparatus 3 inputted to the second media key encryption unit 1306 as the information on the reproduction apparatus to be revoked among the second category, during the generation of the second encrypted media key data, and processed so that the correct media key cannot be obtained by the reproduction apparatus 3. By generating the second media key data in this manner, the second category reproduction apparatuses, apart from the recording apparatus 3, are able to decrypt the correct second media key (MK2), and the second category recording apparatus 3 can be excluded from the system.

(The First Encrypted Content Key Recording Area 1323)

A content key (CK) which is encrypted using the first media key (MK1) is recorded in the first encrypted content key recording area 1323.

(The Second Encrypted Content Key Recording Area 1324)

The content key (CK) which is encrypted using the second media key (MK2) is recorded in the second encrypted content key recording area 1324.

(The Encrypted Content Recording Area 1325)

A content which is encrypted using the content key (CK) is recorded in the encrypted content recording area 1325.

In the above-configured first embodiment of the present invention, in the case where, for example, a number of device keys provided to the first category recording apparatuses and the algorithms for decrypting the first encrypted media key data and the first encrypted content key are illicitly exposed over the Internet, and it is judged that the revocation for the first category reproduction apparatuses has stopped functioning, the revocation system for the first category reproduction apparatuses is updated. Specific examples are described hereinafter.

System Update Specific Example 1

Figure 17:
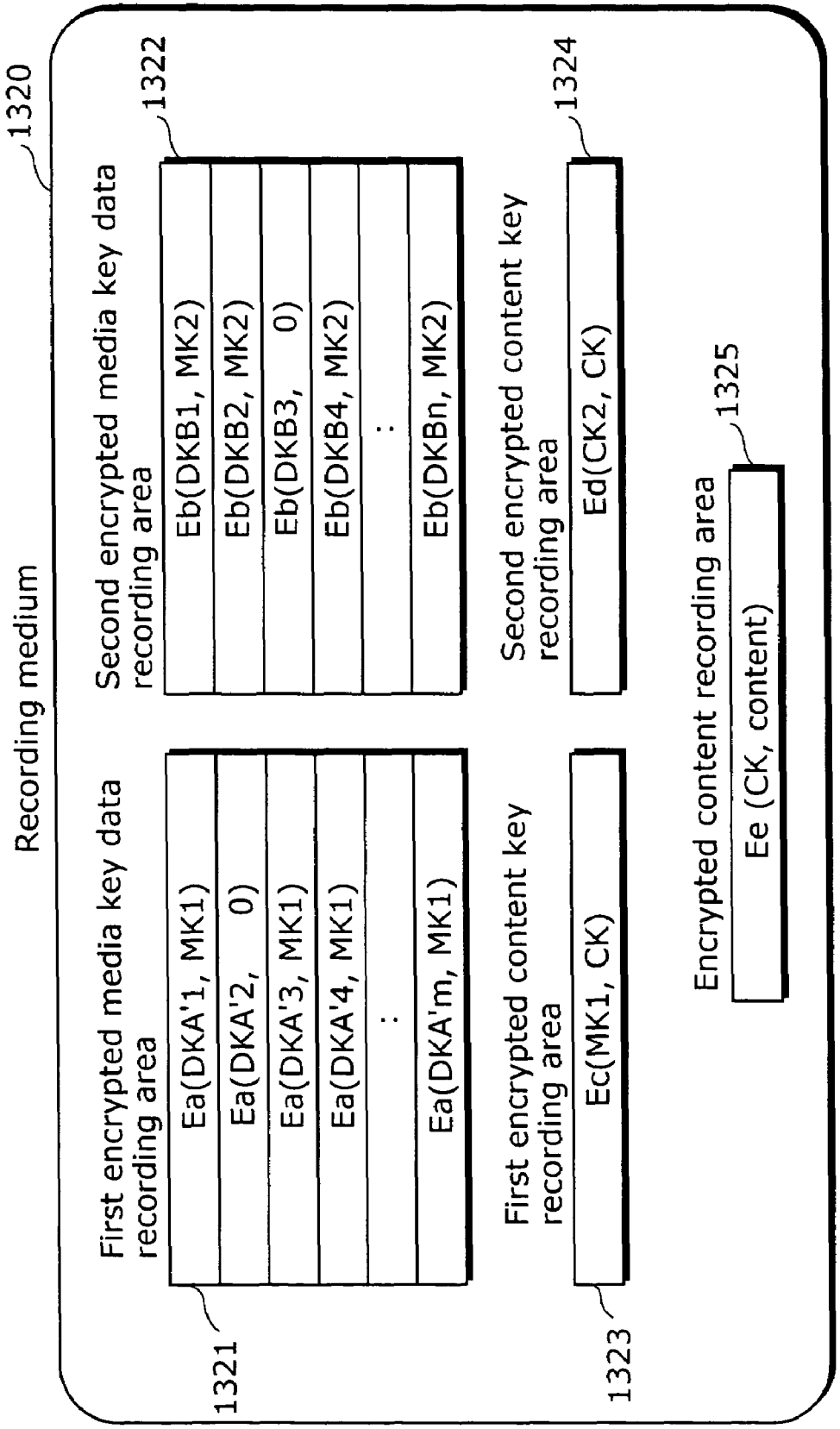
FIG. 17 is a schematic diagram showing specific example 1 of the system update in the third embodiment of the present invention.

FIG. 17 shows a specific example 1 for various data to be recorded on a new recording medium 1320 which is created after it is judged that the revocation for the first category reproduction apparatuses has stopped functioning. The difference with FIG. 16 is that the device keys DKA1 to DKAm used in generating the first encrypted media key data are changed to DKA'1 to DKA'm. As this is the same as the system update specific example 1 described in the aforementioned first embodiment, description of details shall be omitted.

Here, as each device key among the new device keys (DKA'1 to DKA'm) does not match any of the pre-system update device keys (DKA1 to DKAm), even when a device key, apart from DKA2, is exposed through an illicit cryptanalysis prior to the system update, the media key (MK1) cannot be obtained by using such device key to decrypt the first encrypted media key data which is read out from the recording medium in FIG. 17, and the content cannot be reproduced.

Moreover, as the device keys (DKB1 to DKBn) used in the generation of the second encrypted media key data are not changed during the aforementioned system update, no changes need to be made for the reproduction apparatuses belonging to the second category.

System Update Example 2

Figure 18:
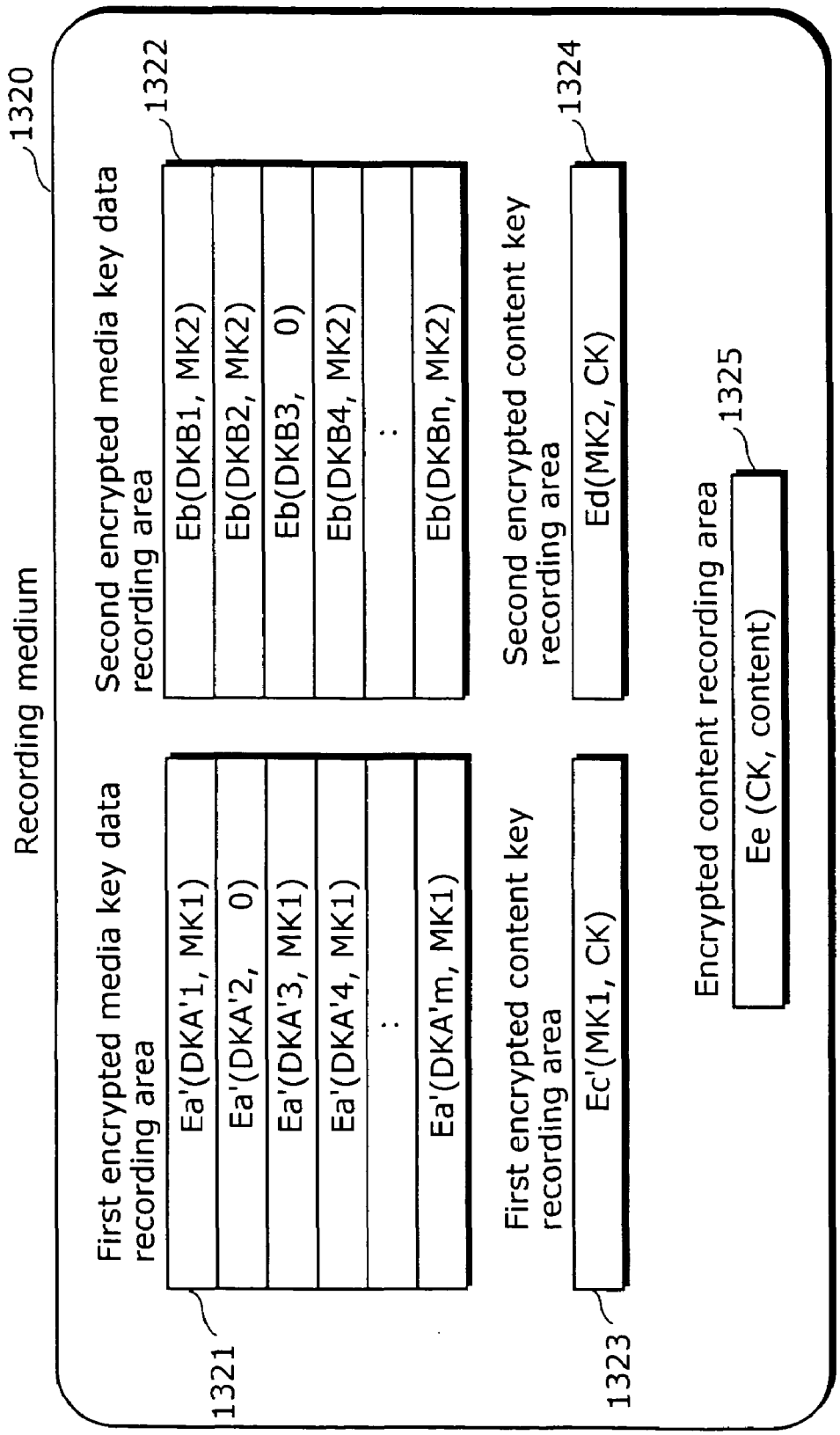
FIG. 18 is a schematic diagram showing specific example 2 of the system update in the third embodiment of the present invention.

FIG. 18 shows a specific example 2 for various data to be recorded on a new recording medium 1320 which is created after it is judged that the revocation for the first category reproduction apparatuses has stopped functioning. The difference with FIG. 16 is that the device keys DKA1 to DKAm used in generating the first encrypted media key data are changed to DKA'1 to DKA'm, the encryption algorithm for the first encrypted media key data is changed from Ea (X, Y) to Ea' (X, Y), and the encryption algorithm for the first encrypted content key is changed from Ec (X,Y) to Ec' (X,Y). Here, each device key among the new device keys (DKA'1 to DKA'm) does not match any of the pre-system update device keys (DKA1 to DKAm).

On the other hand, each first category reproduction apparatus 1400, which is not revoked, is provided with a new device key which is stored in a device key storage unit 1401. A decryption algorithm Da' (X, Y) for decrypting the first encrypted media key in FIG. 18 is built into a media key decryption unit 1402, in addition to a decryption algorithm Da (X,Y) for decrypting the first encrypted media key data in FIG. 16, which has been built-in since before. Furthermore, a decryption algorithm Dc' (X, Y) for decrypting the first encrypted content key in FIG. 18 is built into a content key decryption unit 1403, in addition to a decryption algorithm Dc (X, Y) for decrypting the first encrypted content key in FIG. 16, which has been built-in since before. For example, a first category reproduction device m holds a newly provided device key (DKA'm), in addition to a device key (DKAm) that it has been holding since before. When reproducing the recording medium in FIG. 16, the reproduction apparatus m uses the device key DKAm and the encryption algorithm Da (X,Y) to decrypt the first encrypted media key data and obtain the first media key (MK1). It then uses the obtained first media key (MK1) and the encryption algorithm Dc (X, Y) to decrypt the first encrypted content key and obtain the content key (CK), and then uses the obtained content key (CK) to decrypt the encrypted content. On the other hand, when reproducing the recording medium in FIG. 18, the reproduction apparatus m uses the device key DKA'm and the encryption algorithm Da' (X,Y) to decrypt the first encrypted media key data and obtain the first media key (MK1). It then uses the obtained first media key (MK1) and the encryption algorithm Dc' (X, Y) to decrypt the first encrypted content key and obtain the content key (CK), and then uses the obtained content key (CK) to decrypt the encrypted content. In the present embodiment, Ea (X, Y) and Da (X, Y), Ec (X, Y) and Dc (X, Y) use a DES cryptograph having a key length of 56 bits. In contrast, Ea' (X,Y) and Da' (X,Y), Ec' (X,Y), Dc' (X,Y) use a 112-bit key length cryptograph known as a two-key triple DES.

Here, as each device key among the new device keys (DKA'1 to DKA'm) does not match any of the pre-system update device keys (DKA1 to DKAm), even when a device key, apart from DKA2, is exposed through an illicit cryptanalysis prior to the system update, the media key (MK1) cannot be obtained by using such device key to decrypt the first encrypted media key data which is read out from the recording medium in FIG. 18, and the content cannot be reproduced.

Furthermore, as it is possible to increase the encryption strength by changing the key length of the device key and the encryption algorithm, practices such as the illicit obtainment of a device key through the cryptanalysis of the system can be hindered.

Moreover, as the device keys (DKB1 to DKBn) used in the generation of the second encrypted media key data, the encryption algorithm of the second encrypted media key data, and the encryption algorithm of the second content key data are not changed during the aforementioned system update, no changes need to be made for the reproduction apparatuses belonging to the second category.

According to the above-configured third embodiment of the present invention, there is no need for the first category reproduction apparatus 1400 and the second category reproduction apparatus 1500 to read the first or second encrypted media key data which are for revoking respective reproduction apparatuses of the different categories. Therefore, the memory capacity provided within the apparatus can be made smaller and processing time can also be reduced. Furthermore, the encryption algorithms used in generating the first encrypted media key data and the first encrypted content key can be made different from the encryption algorithms used in generating the second encrypted media key data and the second encrypted content data, respectively. Therefore, even in the case where the revocation system of the first category reproduction apparatuses falls into a situation where it is exposed, the revocation system can be changed, without affecting the second category reproduction apparatuses, by changing (a) the key length of the device keys provided to the first category reproduction apparatuses and (b) the generation algorithm of the first encrypted media key data.

Furthermore, by having separate media keys for the first category and the second category, and providing stages of encrypted content keys respectively using such media keys, in the present embodiment, the independence between categories can be increased. More specifically, even in the case where a device key is exposed from a reproduction apparatus belonging to the first category, the media key that can be obtained using such device key is limited to the first media key only, and thus it is possible to prevent the second media key from being exposed. This is particularly effective in the case where, as in the present embodiment, (a) the first category refers to a reproduction apparatus implemented through software for which updating and adding of decryption algorithms and keys is easy but sturdy implementation is difficult, and (b) the second category refers to a reproduction apparatus implemented through hardware which is sturdy but updating and adding of decryption algorithms and keys is difficult.

Moreover, although in FIG. 13, a configuration is assumed in which the first media key, the second media key, and the content key are inputted from a source outside of the recording apparatus 1300, the present invention is not limited to such configuration. For example, it is also possible to have a configuration in which the recording apparatus 1300 includes a storage unit for storing the first media key, the second media key, and content key. Furthermore, it is also possible for to have a configuration in which the recording apparatus 1300 includes a generation unit which generates the first media key, the second media key, and content key as required.

Furthermore, although in FIG. 13, a two-stage configuration is assumed in which the content is encrypted using the content key, and then the content key is encrypted using the first and the second media key, the present invention is not limited to such configuration. For example, it is also possible to have a configuration in which the stages for encryption are further increased through the addition of keys.

Furthermore, as shown in FIG. 13, the recording apparatus in the present embodiment assumes an integrated configuration for the device key storage unit, the media key encryption unit and the content key encryption unit for each category, the content encryption unit, as well as the recording of respective data onto the recording medium. However, the present invention is not limited to such configuration. For example, it is also possible to have a configuration in which (a) the device key storage unit, the media key encryption unit and the content key encryption unit for each category (the section enclosed in broken lines in FIG. 13) are built into an apparatus which is provided in a facility which operates the key management of the entire system and the key issuance for the reproduction apparatuses, as their management and operation require great confidentiality, and (b) the content encryption unit and the recording of respective data onto the recording medium is executed by an apparatus provided in a content manufacturing facility or a recording medium manufacturing facility.

Furthermore, in the present embodiment, during the generation of the first encrypted media key data in the system updating, data is also assigned to the revoked reproduction apparatuses at the time of system updating, as in Ea (DKA'2, 0) in FIG. 17 and Ea' (DKA'2, 0) in FIG. 18. However, it is also possible to have a configuration in which data is not assigned to a revoked recording apparatus. In that case, the position of the encrypted media key to be used by the reproduction apparatuses which are not revoked is also updated, and by providing new position information when a new device key is provided, the reproduction apparatuses that are not revoked can use the appropriate data and obtain the correct media key even if there is a change in the position of the encrypted media key before and after the system update. In such a case, the volume of data that needs to be stored in the first encrypted media key data recording area after the system update can be reduced. Alternatively, when the maximum value for the volume is limited, the number of new reproduction apparatuses belonging to the first category can be increased.

Furthermore, although the present embodiment adopts a method in which revocation of a reproduction apparatus is performed using encrypted media key data such as that shown in FIG. 16, a different method can be used for the method for revocation. For example, the revocation method utilizing a tree-structure, disclosed in patent reference 1 can also be used.

Furthermore, although the present embodiment makes use of the DES having a 56-bit key length as the encryption algorithm, and the two-key triple DES having a 112-bit key length as the post-system update algorithm, the present invention is not limited to such, and can also use other encryption algorithms such as AES having a 128-bit key length, for example, which is referred to as a next-generation standard cryptograph.

Moreover, although the present embodiment is an application of the present invention in a system in which a content is distributed using a playback-only recording medium, and the distributed content is reproduced using reproduction apparatuses, the present invention is not limited to such application. The present invention can also be applied in a system utilizing a rewritable or recordable recording medium, by assuming a configuration in which encrypted media key data and an encrypted content key for each category are generated and recorded onto a recording medium by a key generation apparatus, and the encrypted media key data and the encrypted content key are decrypted and the content encrypted by a recording apparatus, in the same manner as in the aforementioned second embodiment.

Fourth Embodiment

The fourth embodiment of the present invention is an application of the present invention in a system in which a content is distributed using a playback-only recording medium, and the distributed content is reproduced using reproduction apparatuses, as in the first embodiment. Furthermore, a recording apparatus in the fourth embodiment uses a first content key and a second content key to encrypt a content twice.

Figure 19:
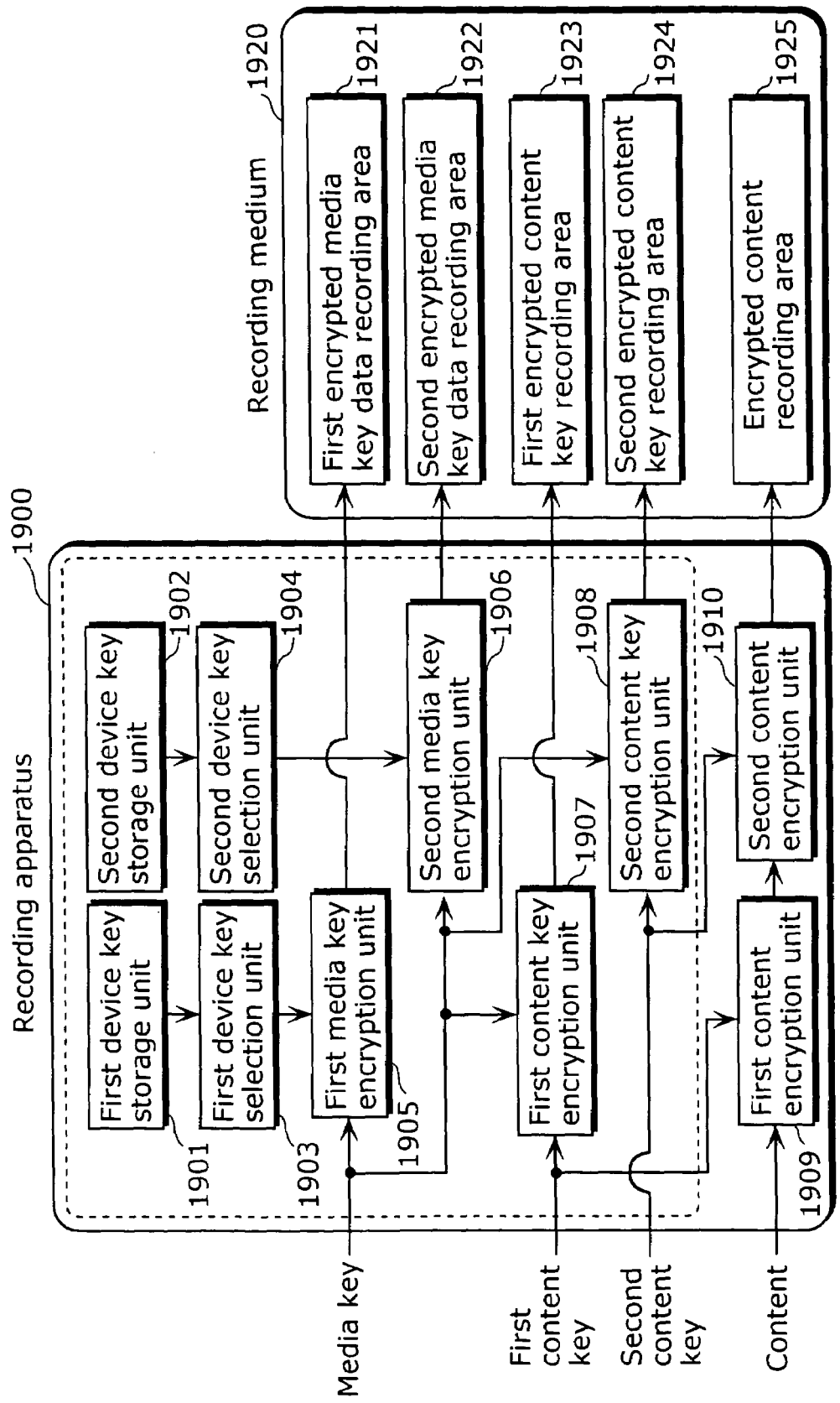
FIG. 19 is a block diagram showing the recording apparatus and the recording medium in the fourth embodiment of the present invention.
Figure 20:
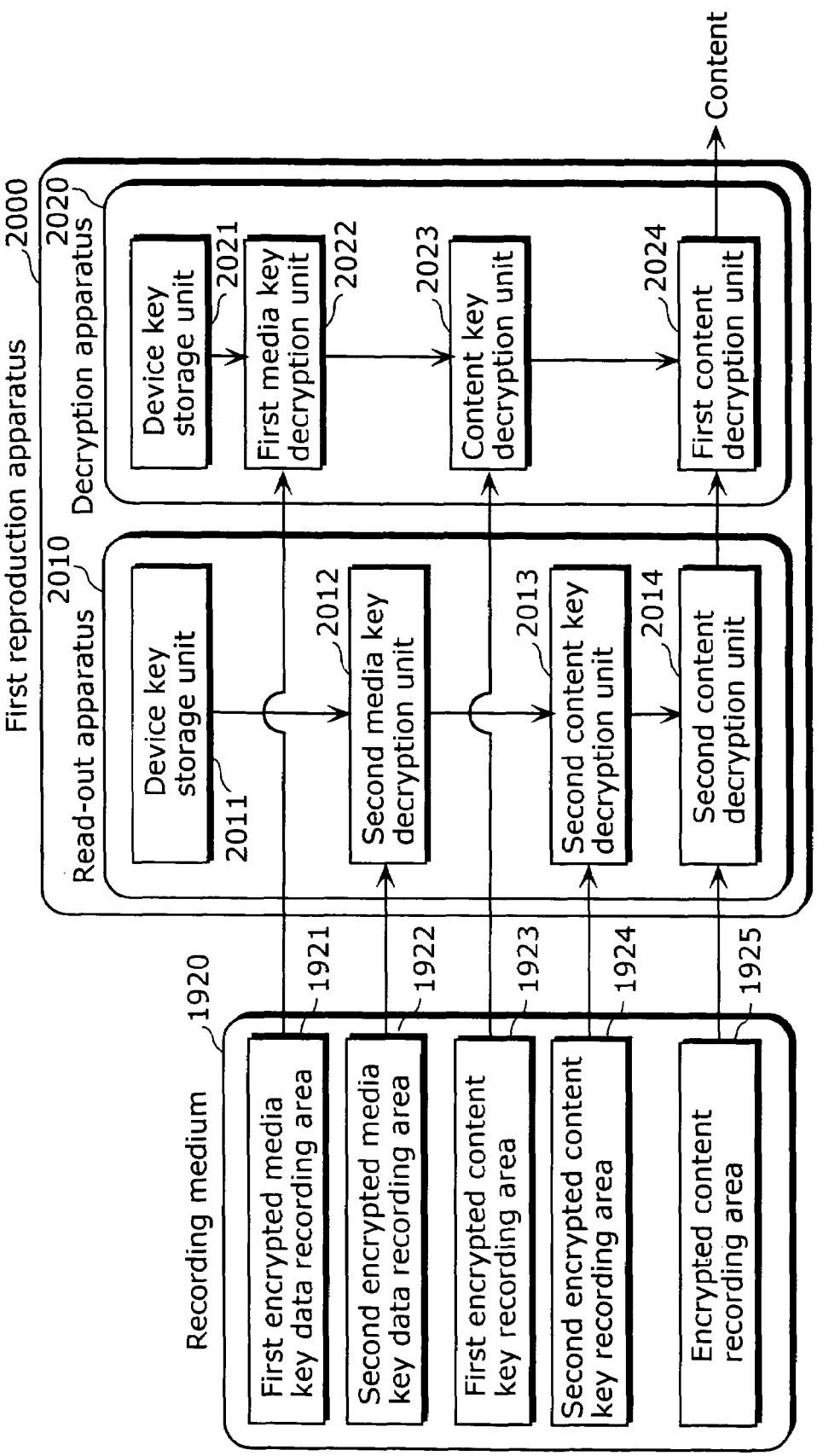
FIG. 20 is a block diagram showing the recording medium and the first category reproduction apparatus in the fourth embodiment of the present invention.
Figure 21:
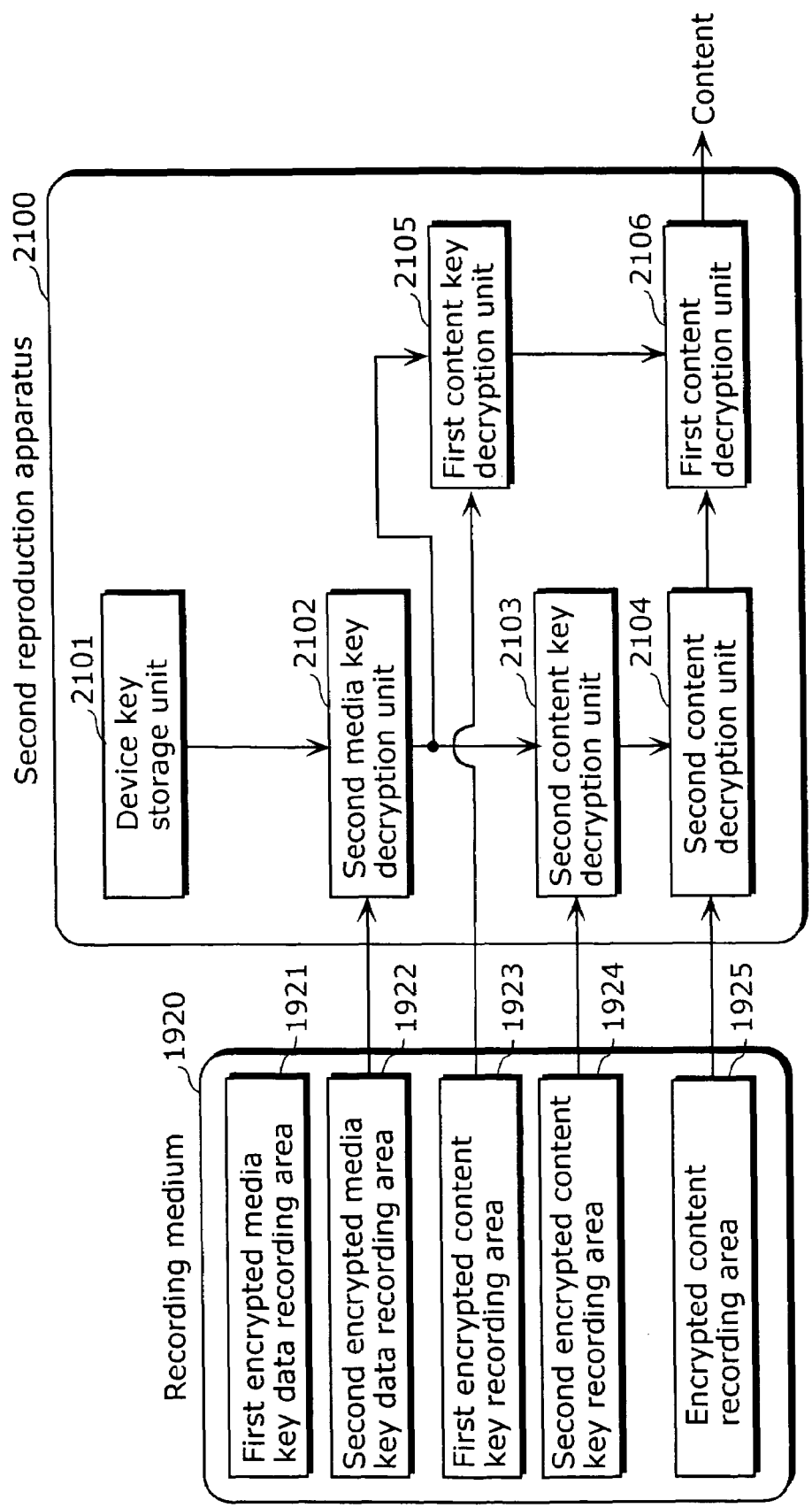
FIG. 21 is a block diagram showing the recording medium and the second category reproduction apparatus in the fourth embodiment of the present invention.
Figure 22:
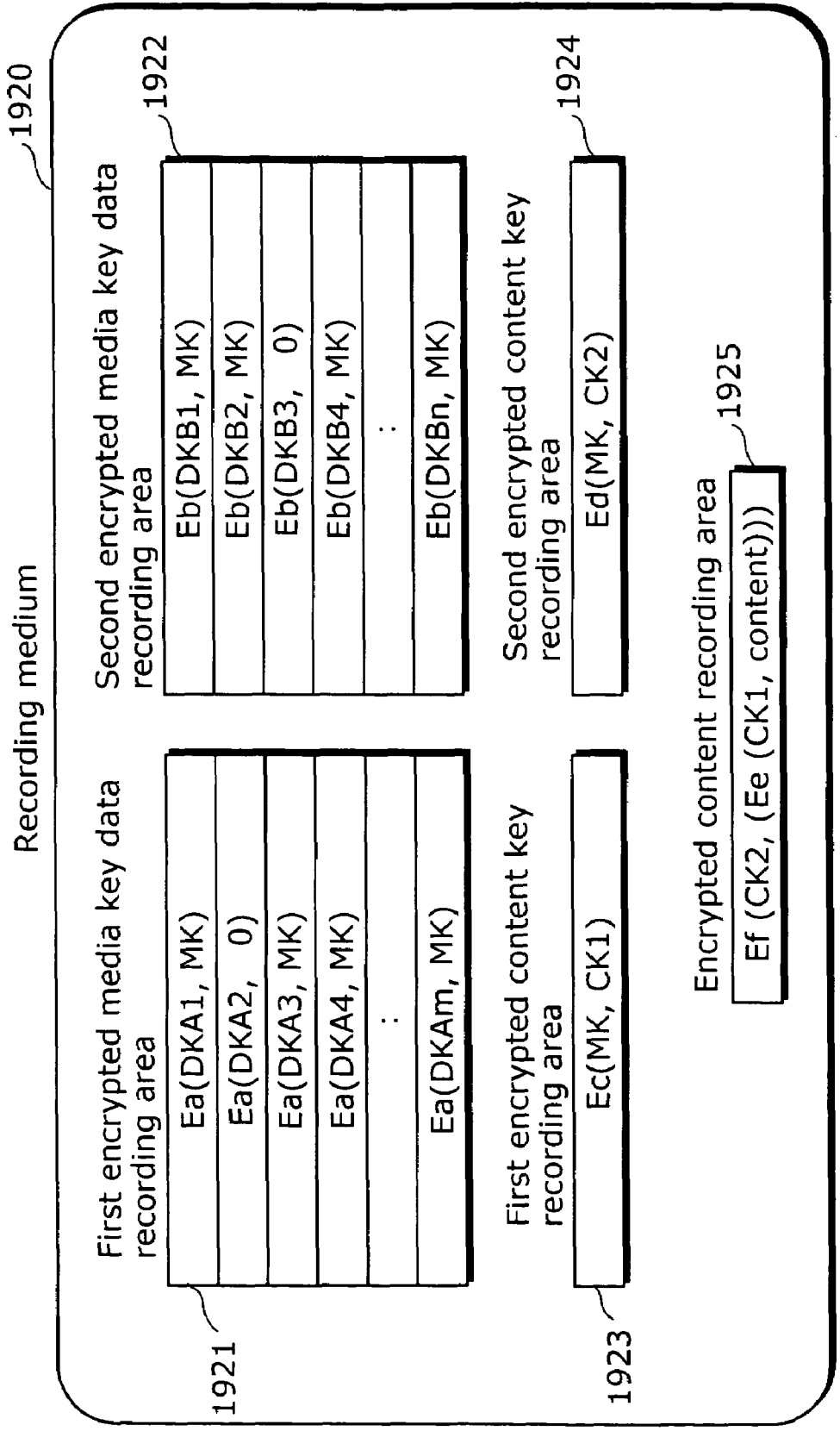
FIG. 22 is a schematic diagram showing a specific example of data to be recorded on the recording medium in the fourth embodiment of the present invention.

Hereinafter, the fourth embodiment of the present invention shall be described with reference to the diagrams. FIG. 19 shows a recording apparatus 1900 which encrypts a content and records the encrypted content, and a recording medium 1920. FIG. 20 shows a first reproduction apparatus 2000 which reads-out and decrypts, the encrypted content from the recording medium 1920. FIG. 21 shows a second reproduction apparatus 2100 which reads-out and decrypts, the encrypted content from the recording medium 1920. Furthermore, FIG. 22 shows a specific example of various data to be recorded on the recording medium 1920.

The recording apparatus 1900 in FIG. 19 is different from the recording apparatus 100 in FIG. 1 in having a first content encryption unit 1909 perform a first content encryption on the content, using a first content key, then having a second content encryption unit 1910 perform a second content encryption on the output, using a second content key, then having the first content key encryption unit 1907 and a second content key encryption unit 1908 encrypt, using a media key, the first and the second content keys, respectively, using a media key, and then recording the output on the recording medium 1920. As the rest of the points are the same as in the recording apparatus 100 in FIG. 1, description shall be omitted.

The recording medium 1920 includes the following: a first encrypted media key data recording area 1921 for recording first encrypted media key data; a second encrypted media key data recording area 1922 for recording second encrypted media key data; a first encrypted content key recording area 1923 for recording the first encrypted content key generated by the first content key encryption unit 1907; a second encrypted content key recording area 1924 for recording the second encrypted content key generated by the second content key encryption unit 1908; and an encrypted content recording area 1925 for recording the encrypted content generated by the second content encryption unit 1910.

The first reproduction apparatus 2000, such as a PC or the like, is made up of a read-out apparatus 2010 such as a drive apparatus for example; and a decryption apparatus 2020 which realizes the decryption of a content using an application for example. Moreover, the fourth embodiment is characterized by having the decryption of an encrypted content performed also in the read-out apparatus 2010 such as a drive apparatus, and the like.

The read-out apparatus 2010 includes the following: a device key storage unit 2011 which confidentially holds a device key; a second media key decryption unit 2012 which obtains the media key by decrypting, using the device key, the second encrypted media key data which is read out from the recording medium 1920; a second content key decryption unit 2013 which obtains the content key by decrypting, using the obtained media key, the second encrypted content key which is read out from the recording medium; and a second content decryption unit 2014 which performs a second content decryption process, using the obtained content key, on the encrypted content which is read out from the recording medium 1920. The performance of the second decryption process on the encrypted content by the second content decryption unit 2014 results in intermediate data which is then supplied to the decryption apparatus 2020, together with the first encrypted media key data and the first encrypted content key which are read out from the recording medium 1920. In the present embodiment, it is assumed that the read-out apparatus 2010 has the aforementioned component elements implemented through hardware, and belongs to the second category.

The decryption unit 2020 includes the following: a device key storage unit 2021 which confidentially holds the device key; a first media key decryption unit 2022 which obtains the media key by decrypting, using the device key, the first encrypted media key supplied by the read-out apparatus 2010; a first content key decryption unit 2023 which obtains the first content key by decrypting, using the obtained media key, the first encrypted content key supplied by the read-out apparatus 2010; and a first content decryption unit 2024 which obtains the content by performing a first content decryption process using the obtained first content key, on the intermediate data supplied by the read-out apparatus 2010. In the present embodiment, it is assumed that the decryption unit 2020 has the aforementioned component elements implemented through software, and belongs to the first category.

The second reproduction apparatus 2100 is a second category reproduction apparatus, and includes the following: a device key storage unit 2101 which confidentially holds a device key; a media key decryption unit 2102 which obtains the media key by decrypting, using the device key, the second encrypted media key data which is read out from the recording medium 1920; a second content key decryption unit 2103 which obtains the second content key by decrypting, using the obtained media key, the second encrypted content key which is read out from the recording medium; and a second content decryption unit 2104 which, using the obtained second content key, performs a second content decryption process on the encrypted content which is read out from the recording medium 1920; a first content key decryption unit 2105 which obtains a first content key by decrypting, using the obtained media key, the first encrypted content key data read out from the recording medium; and a first content decryption unit 2106 which obtains the content by performing a first content decryption process using the first content key, on the output of the second content decryption unit 2104. In the present embodiment, it is assumed that the second reproduction apparatus 2100 has the aforementioned component elements implemented through hardware, and belongs to the second category.

In the present embodiment, it is assumed that a decryption apparatus which is implemented through software, as in an application program in a personal computer, is a decryption apparatus belonging to the first category, and an apparatus which is implemented through hardware, as in an optical disk drive which is connected or built into a common household player as well as a personal computer, is assumed as an apparatus belonging to the second category.

FIG. 22 shows a specific example of the various data to be recorded on the recording medium 1920 in the case where it is assumed that m-units of first category decryption apparatuses and n-units of second category apparatuses hold only one unique device key each, and a first category decryption apparatus 2 and a second category apparatus 3 are revoked. In FIG. 22, it is assumed that a first category decryption apparatus "i" (i=1 to m) holds a device key DKAi, a second category apparatus "j" (j=1 to n) holds a device key DKAj. Furthermore, Ea (X, Y), Eb (X, Y), Ec (X, Y), Ed (X, Y), Ee (X, Y), and Ef (X, Y) represent functions for encrypting data Y using key data X. In addition, the encryption algorithm used can be realized by commonly known technology, and the present embodiment makes use of DES cryptography having a key length of 56 bits.

Data recorded in the first encrypted media key data recording area 1921 and the second encrypted media key data recording area 1922 are the same as the data recorded in the first encrypted media key data recording area 121 and the second encrypted media key data recording area 122, respectively, in the previously described first embodiment, and their description shall be omitted.

(The First Encrypted Content Key Recording Area 1923)

A first content key (CK1) which is encrypted using the media key (MK) is recorded in the encrypted content key recording area 1923.

(The Second Encrypted Content Key Recording Area 1924)

A second content key (CK2) which is encrypted using the media key (MK) is recorded in the encrypted content key recording area 1924.

(The Encrypted Content Recording Area 1925)

A content which is encrypted using the first content key (CK1) and the second content key (CK2) is recorded in the encrypted content recording area 124.

In the above-configured fourth embodiment of the present invention, in the case where, for example, a number of device keys provided to the first category decryption apparatuses and the algorithm for decrypting the first encrypted media key data are illicitly exposed over the Internet, and it is judged that the revocation for the first category decryption apparatuses has stopped functioning, the revocation system for the first category decryption apparatuses is updated. Specific examples are described hereinafter.

System Update Specific Example 1

Figure 23:
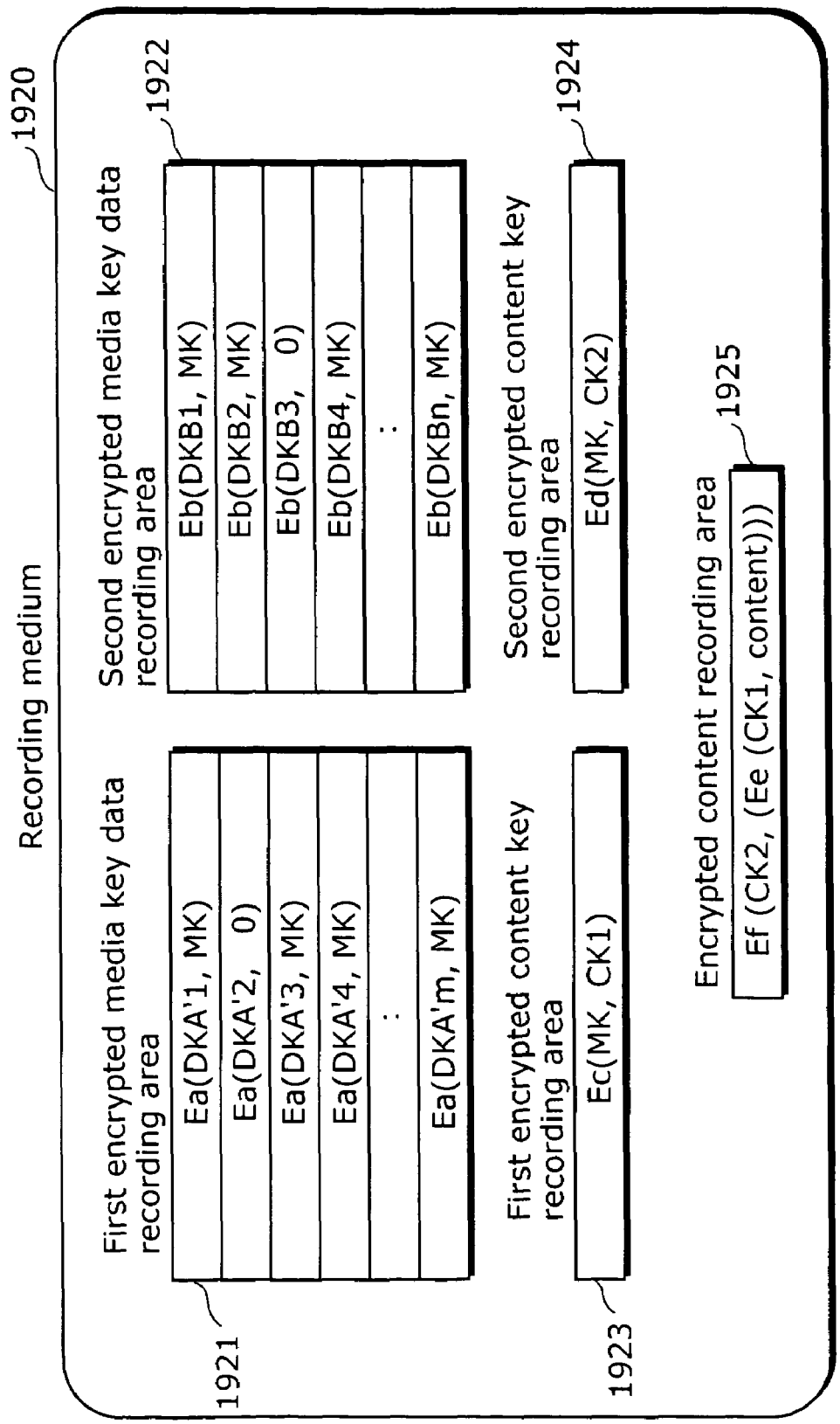
FIG. 23 is a schematic diagram showing specific example 1 of the system update in the fourth embodiment of the present invention.

FIG. 23 shows a specific example 1 for various data to be recorded on a new recording medium 1920 which is created after it is judged that the revocation for the first category decryption apparatuses has stopped functioning. The difference with FIG. 22 is that the device keys DKA1 to DKAm used in generating the first encrypted media key data are changed to DKA'1 to DKA'm. As this is the same as the system update specific example 1 described in the aforementioned first embodiment, description of details shall be omitted.

Here, as each device key among the new device keys (DKA'1 to DKA'm) does not match any of the pre-system update device keys (DKA1 to DKAm), even when a device key, apart from DKA2, is exposed through an illicit cryptanalysis prior to the system update, the media key (MK) cannot be obtained by using such device key to decrypt the first encrypted media key data which is read out from the recording medium in FIG. 23, and the content cannot be reproduced.

Moreover, as the device keys (DKB1 to DKBn) used in the generation of the second encrypted media key data are not changed during the aforementioned system update, no changes have to be made for the apparatuses belonging to the second category.

System Update Example 2

Figure 24:
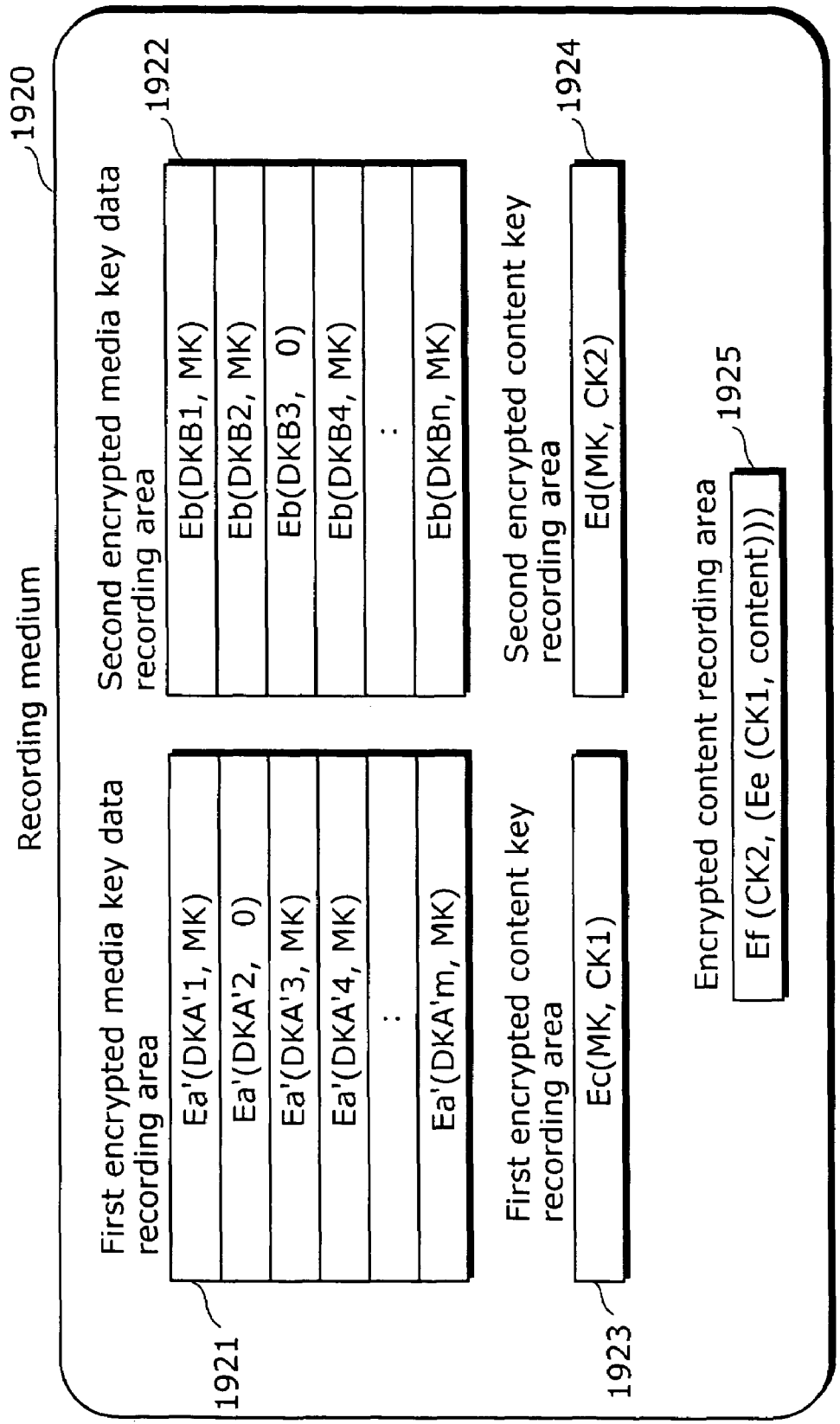
FIG. 24 is a schematic diagram showing specific example 2 of is the system update in the fourth embodiment of the present invention.

FIG. 24 shows a specific example 2 for various data to be recorded on a new recording medium 1920 which is created after it is judged that the revocation for the first category decryption apparatuses has stopped functioning. The difference with FIG. 22 is that the device keys DKA1 to DKAm used in generating the first encrypted media key data are changed to DKA'1 to DKA'm, and the encryption algorithm is changed from Ea (X,Y) to Ea' (X,Y). As this is the same as the system update specific example 2 described in the aforementioned first embodiment, description of details shall be omitted.

Here, as each device key among the new device keys (DKA'1 to DKA'm) does not match any of the pre-system update device keys (DKA1 to DKAm), even when a device key, apart from DKA2, is exposed through an illicit cryptanalysis prior to the system update, the media key (MK) cannot be obtained by using such device key to decrypt the first encrypted media key data which is read out from the recording medium in FIG. 24, and the content cannot be reproduced.

Furthermore, as it is possible to increase the encryption strength by changing the key length of the device key and the encryption algorithm, practices such as the illicit obtainment of a device key through the cryptanalysis of the system can be hindered.

Moreover, as the device keys (DKB1 to DKBn) used in the generation of the second encrypted media key data, and the encryption algorithm of the second encrypted media key data, are not changed during the aforementioned system update, no changes need to be made for the apparatuses belonging to the second category.

According to the above-configured fourth embodiment of the present invention, there is no need for the first category apparatuses (the decryption apparatus 2020) and the second category apparatuses (read-out apparatus 2010 and second reproduction apparatus 2100) to read the first or second encrypted media key data which are for revoking respective apparatuses of the different categories. Therefore, the memory capacity provided within the apparatus can be made smaller and processing time can also be reduced. Furthermore, the encryption algorithm used in generating the first encrypted media key data can be made different from the encryption algorithm used in generating the second encrypted media key data. Therefore, even in the case where the revocation system of the first category decryption apparatuses falls into a situation where it is exposed, the revocation system can be changed, without affecting the second category apparatuses, by changing (a) the key length of the device keys provided to the first category decryption apparatuses and (b) the generation algorithm of the first encrypted media key data. In addition, as the algorithm for decrypting the second encrypted content key is not installed in the first category decryption apparatus 2020, even when any of the first category decryption apparatuses is cryptanalized and the device key which it holds and the decryption algorithm is exposed, all of the information needed for the decryption of the content cannot be obtained, and thus a stronger copyright protection system can be constructed. This is particularly effective in the case where, as in the present embodiment, (a) the first category refers to a decryption apparatus implemented through software for which updating and adding of decryption algorithms and keys is easy but sturdy implementation is difficult, and (b) the second category refers to a reproduction apparatus or a read apparatus implemented through hardware which is sturdy but updating and adding of decryption algorithms and keys is difficult.

Moreover, although in FIG. 19, a configuration is assumed in which the media key, the first content key, and the second content key are inputted from a source outside of the recording apparatus 1900, the present invention is not limited to such configuration. For example, it is also possible to have a configuration in which the recording apparatus 1900 includes a storage unit for storing the media key, the first content key, and the second content key. Furthermore, it is also possible for to have a configuration in which the recording apparatus 1900 includes a generation unit which generates the media key, the first content key, and the second content key, as required.

Furthermore, although in FIG. 19 in the present embodiment, a two-stage configuration is assumed in which the content is encrypted using the first and the second content key, and then the first and the second content keys are encrypted using the media key, the present invention is not limited to such configuration. For example, it is also possible to have a configuration in which the stages for encryption are further increased through the addition of keys.

Furthermore, as shown in FIG. 19, the recording apparatus in the present embodiment assumes an integrated configuration for the device key storage unit, the media key encryption unit, the content key encryption unit and the content encryption unit for each category, as well as the recording of respective data onto the recording medium. However, the present invention is not limited to such, and it is possible to have a configuration in which the recording apparatus is separated. For example, it is also possible to have a configuration in which (a) the device key storage unit, the media key encryption unit and the content key encryption unit for each category (the section enclosed in broken lines in FIG. 19) are built into an apparatus which is provided in a facility which operates the key management of the entire system and the key issuance for the reproduction apparatuses, as their management and operation require great confidentiality, and (b) the content encryption units and the recording of respective data onto the recording medium is executed by an apparatus provided in a content manufacturing facility or a recording medium manufacturing facility.

Furthermore, in the present embodiment, during the generation of the first encrypted media key data in the system updating, data is also assigned to the revoked decryption apparatuses at the time of system updating, as in Ea (DKA'2, 0) in FIG. 23 and Ea' (DKA'2, 0) in FIG. 24. However, it is also possible to have a configuration in which data is not assigned to a revoked decryption apparatus. In that case, the position of the encrypted media key to be used by the decryption apparatuses which are not revoked is also updated, and by providing new position information when a new device key is provided, the decryption apparatuses that are not revoked can use the appropriate data and obtain the correct media key even if the position of the encrypted media key has changed before and after the system update. In such a case, the volume of data that needs to be stored in the first encrypted media key data recording area after the system update can be reduced. Alternatively, when the maximum value for the volume is limited, it becomes possible to increase the number of new decryption apparatuses belonging to the first category.

Furthermore, although the present embodiment adopts a method in which revocation of a decryption apparatus is performed using encrypted media key data such as that shown in FIG. 22, a different method can be used for the method for revocation. For example, the revocation method utilizing a tree-structure, disclosed in patent reference 1 can also be used.

Furthermore, although the present embodiment makes use of the DES having a 56-bit key length as the encryption algorithm, and the two-key triple DES having a 112-bit key length as the post-system update algorithm, the present invention is not limited to such, and can also use other encryption algorithms such as AES having a 128-bit key length, for example, which is referred to as a next-generation standard cryptograph.

Furthermore, although in FIG. 22, after the entirety of the content is encrypted using the first content key (CK1), it is further encrypted using the second content key (CK2), the present invention is not limited to such. For example, the content can be divided into several blocks, with some blocks being encrypted using the first content key (CK1) and the rest of the blocks being encrypted using the second content key (CK2).

Moreover, although the present embodiment is an application of the present invention in a system in which a content is distributed using a playback-only recording medium, and the distributed content is reproduced using reproduction apparatuses, the present invention is not limited to such application. The present invention can also be applied in a system utilizing a rewritable or recordable recording medium, by assuming a configuration in which encrypted media key data and an encrypted content key for each category are generated and recorded onto a recording medium by a key generation apparatus, and the encrypted media key data and the encrypted content key are decrypted and the content encrypted by a recording apparatus, in the same manner as in the aforementioned second embodiment.

Fifth Embodiment

In the fifth embodiment, the system in the fourth embodiment is provided with separate media keys for the first category and the second category, and provided with stages of first encrypted content keys respectively using such media keys.

Furthermore, the fifth embodiment is characterized by the addition of a new second reproduction apparatus into the configuration of the reproduction apparatus 2000 in the fourth embodiment, together with the use of a first media and a second media key, and a first content key and a second content key.

Figure 25:
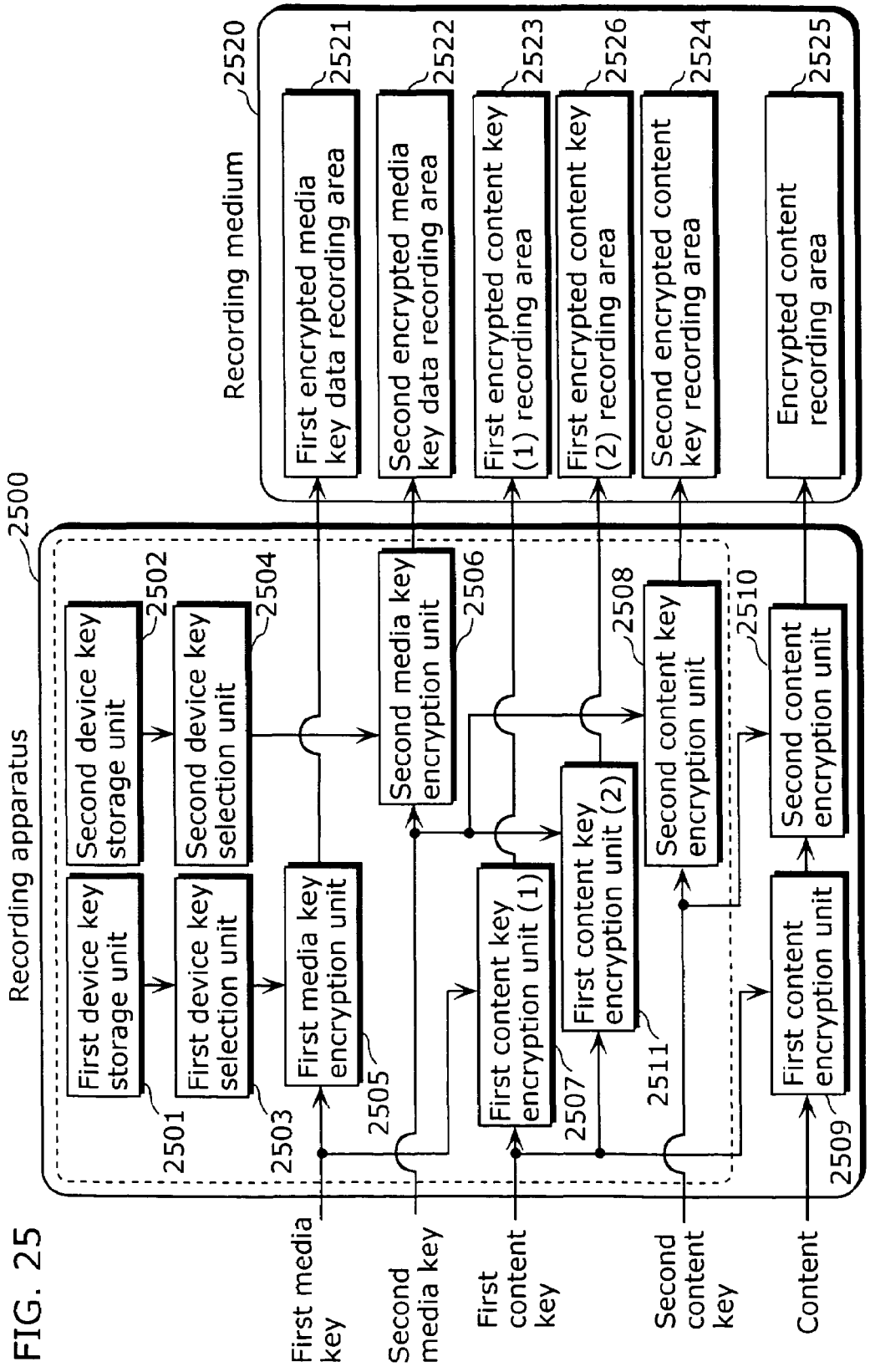
FIG. 25 is a block diagram showing the recording apparatus and the recording medium in the fifth embodiment of the present invention.
Figure 26:
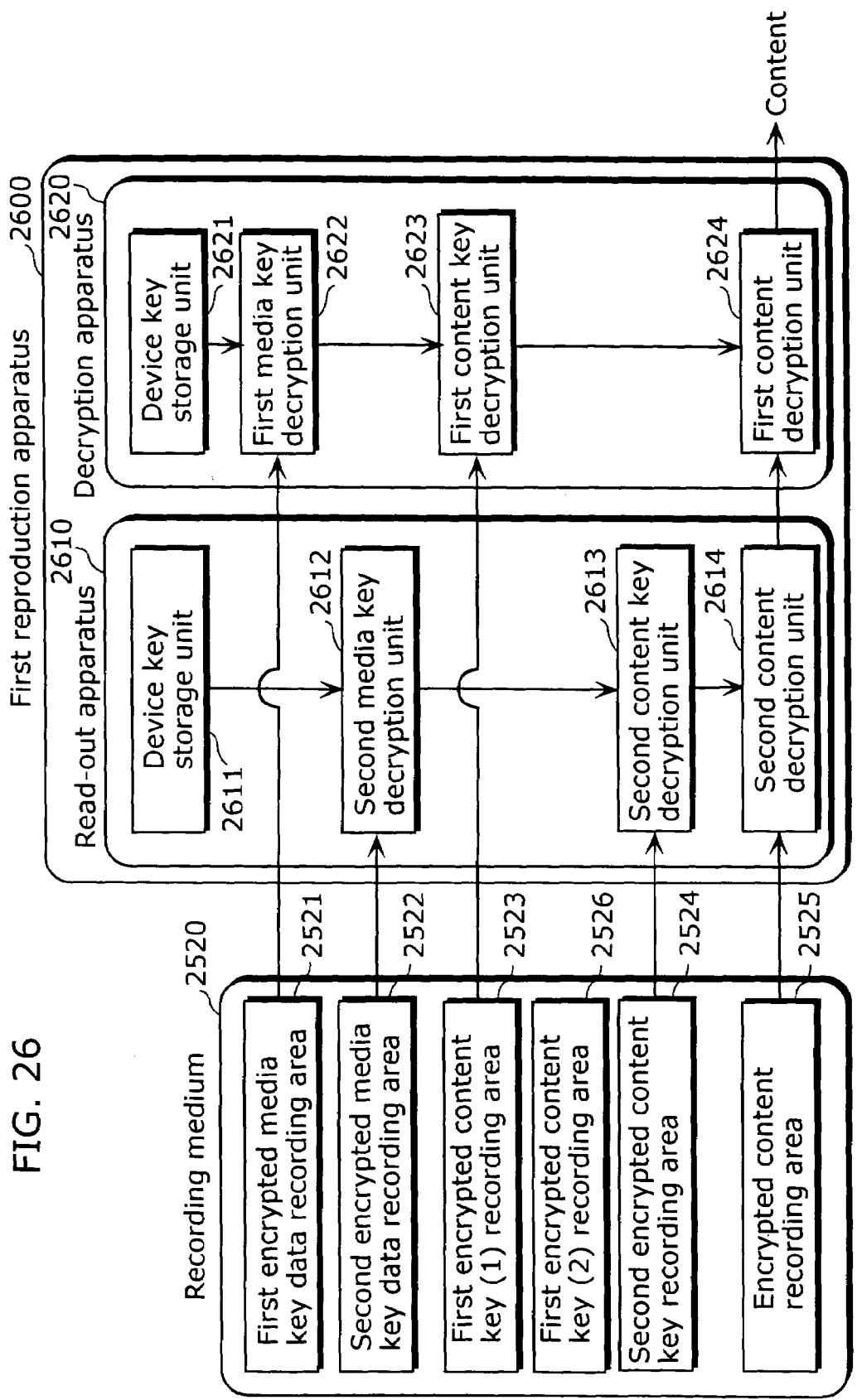
FIG. 26 is a block diagram showing the recording medium and the first category reproduction apparatus in the fifth embodiment of the present invention.
Figure 27:
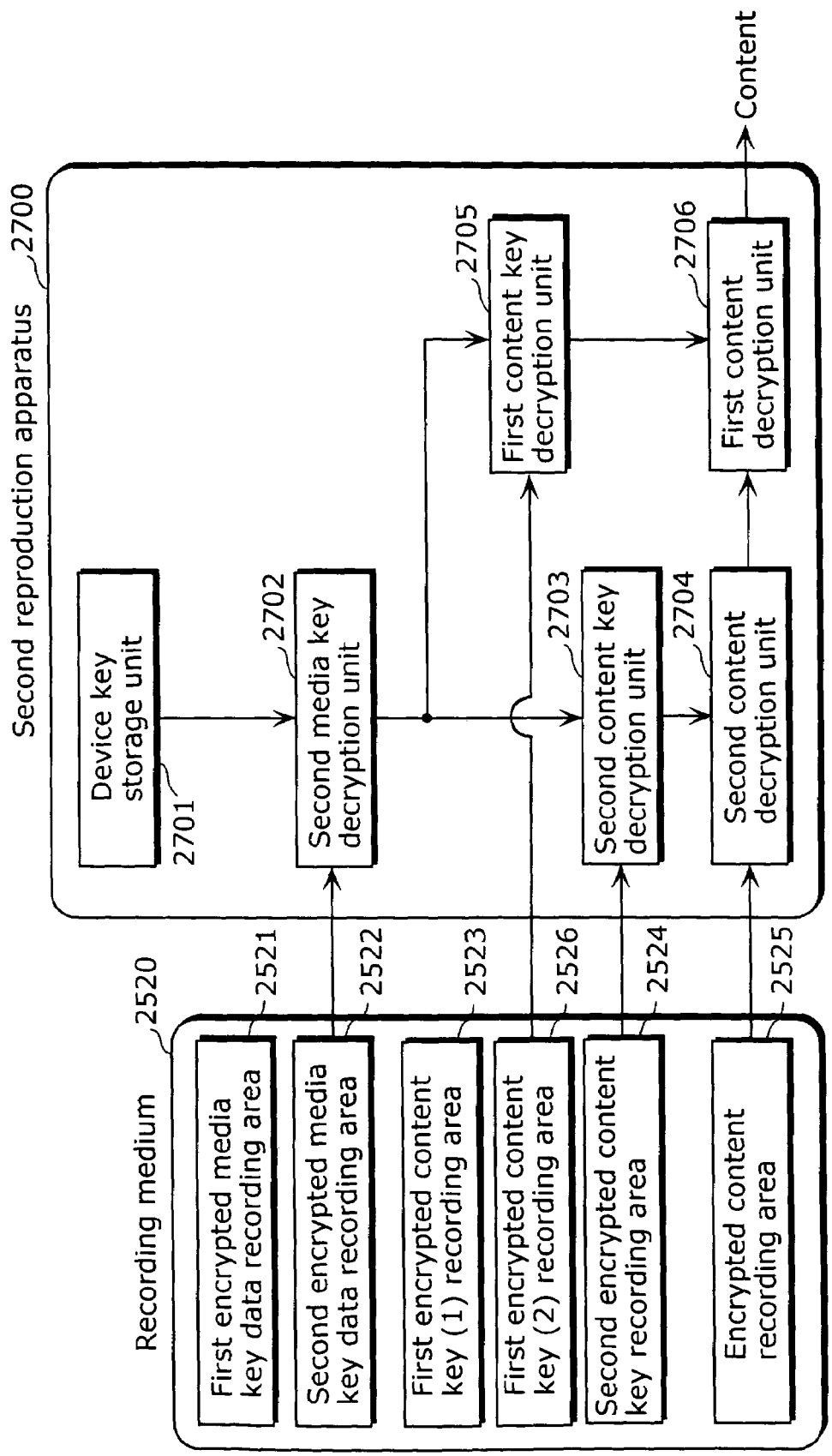
FIG. 27 is a block diagram showing the recording medium and the second category reproduction apparatus in the fifth embodiment of the present invention.
Figure 28:
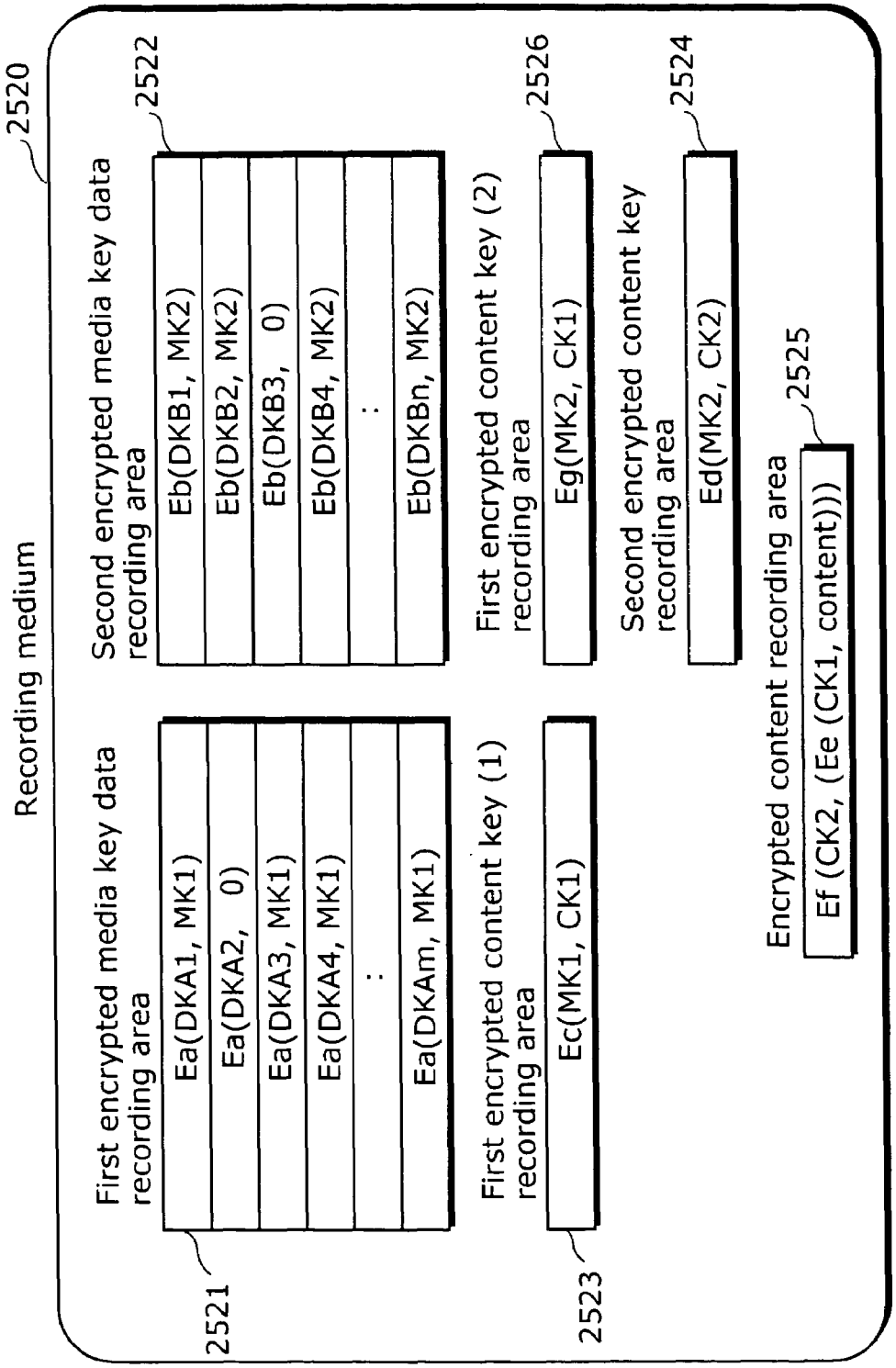
FIG. 28 is a schematic diagram showing a specific example of data to be recorded on the recording medium in the fifth embodiment of the present invention.

Hereinafter, the fifth embodiment of the present invention shall be described with reference to the diagrams. FIG. 25 shows a recording apparatus 2500 which encrypts a content and records the encrypted content, and a recording medium 2520. FIG. 26 shows a first reproduction apparatus 2600 which reads-out and decrypts the encrypted content from the recording medium 2520. FIG. 27 shows a second reproduction apparatus 2700 which reads-out and decrypts the encrypted content from the recording medium 2520. Furthermore, FIG. 28 shows a specific example of various data to be recorded on the recording medium 2520.

The recording apparatus 2500 in FIG. 25 is different from the recording apparatus 1900 in FIG. 19 in being separately provided with a first media key for the first category and a second media key for the second category, then encrypting the first and the second media key in a first media key encryption unit 2505 and a second media key encryption unit 2506, respectively, then encrypting the first content key in a first content key encryption unit (1) 2507 and a first content key encryption unit (2) 2511, using the first and the second media keys, respectively, and then recording the output on the recording medium 2520. As the rest of the points are the same as in the recording apparatus 1900 in the aforementioned fourth embodiment, their description shall be omitted.

The recording medium 2520 includes the following: a first encrypted media key data recording area 2521 for recording first encrypted media key data; a second encrypted media key data recording area 2522 for recording second encrypted media key data; a first encrypted content key (1) recording area 2523 for recording the first encrypted content key (1) generated by the first content key encryption unit (1) 2507; a first encrypted content key (2) recording area 2526 for recording the first encrypted content key is (2) generated by the first content key encryption unit (2) 2511; a second encrypted content key recording area 2524 for recording the second encrypted content key; and an encrypted content recording area 2525 for recording the encrypted content.

In the first reproduction apparatus 2600, a decryption apparatus 2620 obtains the first content key by decrypting the first encrypted content key (1) which is read out from the recording medium 2520 by a read-out apparatus 2610. As the rest of the points are the same as in the first reproduction apparatus 2000 in the aforementioned fourth embodiment, their description shall be omitted.

The second reproduction apparatus 2700 obtains the first content key by decrypting the first encrypted content key (2) which is read out from the recording medium 2520. As the rest of the points are the same as in the second reproduction apparatus 2100 in the aforementioned fourth embodiment, their description shall be omitted.

FIG. 28 shows a specific example of the various data to be recorded on the recording medium 2520. A first media key (MK1) encrypted using device keys (DKA1 to DKAm) held by the first category decryption apparatuses is recorded in the first encrypted media key data recording area 2521. A second media key (MK2) encrypted using device keys (DKB1 to DKBm) held by the second category apparatuses is recorded in the second encrypted media key data recording area 2522. Furthermore, the first content key (CK1) encrypted using the first media key (MK1) is recorded in the first encrypted content key (1) recording area 2523, and the first content key (CK1) encrypted using the second media key (MK2) is recorded in the first encrypted content key (2) recording area 2526. As the rest of the points are the same as in FIG. 22 described earlier, their description shall be omitted. Moreover, Eg (X, Y) in FIG. 28 refers to functions for encrypting data Y using key data X. The present embodiment uses DES cryptography having a key length of 56 bits.

In the above-configured fifth embodiment of the present invention, in the case where, for example, a number of device keys provided to the first category decryption apparatuses and the algorithm for decrypting the first encrypted media key are illicitly exposed over the Internet, and it is judged that the revocation for the first category decryption apparatuses has stopped functioning, the revocation system for the first category decryption apparatuses is updated. Specific examples are described hereinafter.

System Update Specific Example 1

Figure 29:
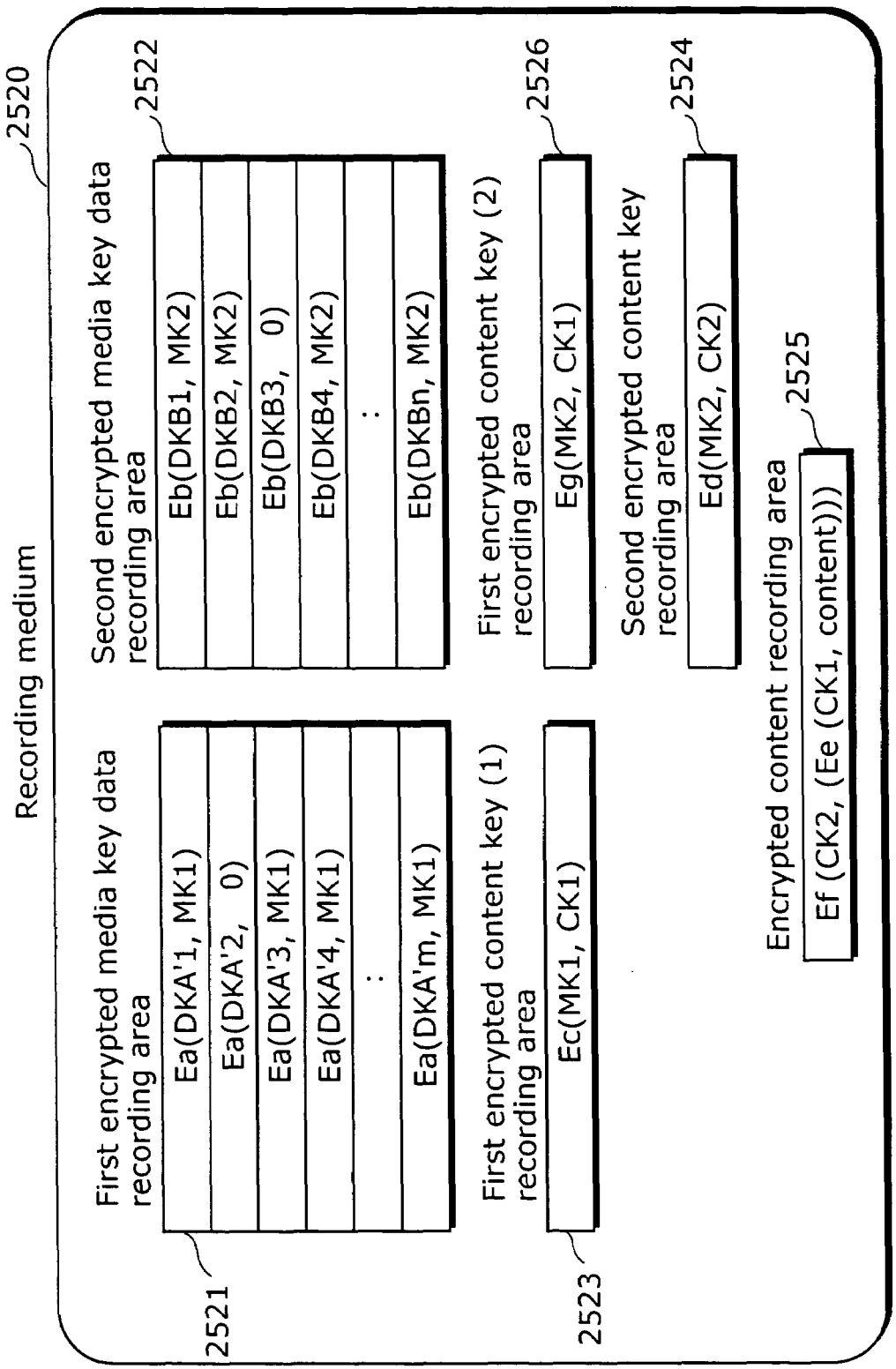
FIG. 29 is a schematic diagram showing specific example 1 of the system update in the fifth embodiment of the present invention.

FIG. 29 shows a specific example 1 for various data to be recorded on a new recording medium 2520 which is created after it is judged that the revocation for the first category decryption apparatuses has stopped functioning. The difference with FIG. 28 is that the device keys DKA1 to DKAm used in generating the first encrypted media key data are changed to DKA'1 to DKA'm. As this is the same as the system update specific example 1 described in the aforementioned first embodiment, description of details shall be omitted.

System Update Example 2

Figure 30:
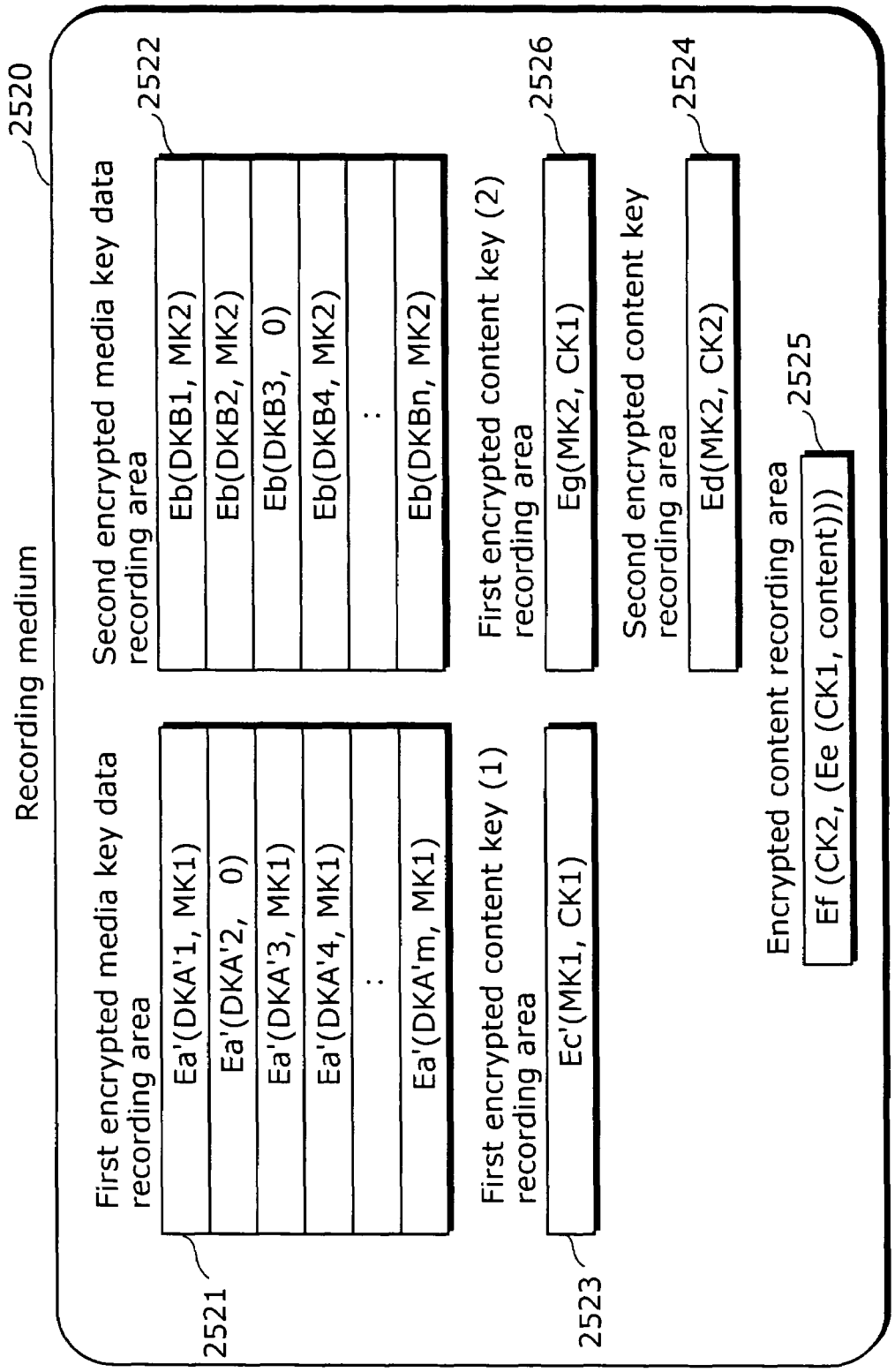
FIG. 30 is a schematic diagram showing specific example 2 of the system update in the fifth embodiment of the present invention.

FIG. 30 shows a specific example 2 for various data to be recorded on a new recording medium 2520 which is created after it is judged that the revocation for the first category decryption apparatuses has stopped functioning. The difference with FIG. 22 is that the device keys DKA1 to DKAm used in generating the first encrypted media key data are changed to DKA'1 to DKA'm, the encryption algorithm is changed from Ea (X, Y) to Ea' (X, Y), and the encryption algorithm for the first encrypted content key (1) is changed from Ec (X, Y) to Ec' (X, Y). As this is the same as in the system update specific example 2 described in the aforementioned third embodiment, description of details shall be omitted.

According to the above-configured fifth embodiment of the present invention, a strong copyright protection system can be constructed, in the same manner as in the fourth embodiment. In addition, by having separate media keys for the first category and the second category, and providing stages of the encrypted device keys which respectively use such media keys, in the present embodiment, the independence between categories can be increased. More specifically, even in the case where a device key is exposed from an apparatus belonging to the first category, the media key that can be obtained using such device key is limited to the first media key only, and thus it is possible to prevent the second media key from being exposed. This is particularly effective in the case where, as in the present embodiment, (a) the first category refers to a decryption apparatus implemented through software for which updating and adding of decryption algorithms and keys is easy but sturdy implementation is difficult, and (b) the second category refers to a reproduction apparatus or a read apparatus implemented through hardware which is sturdy but updating and adding of decryption algorithms and keys is difficult.

Moreover, although in FIG. 25 a configuration is assumed in which the first media key, the second media key, the first content key, and the second content key are inputted from a source outside of the recording apparatus 2500, the present invention is not limited to such configuration. For example, it is also possible to have a configuration in which the recording apparatus 2500 includes a storage unit for storing such keys. Furthermore, it is also possible for to have a configuration in which the recording apparatus 2500 includes a generation unit which generates such keys as required.

Furthermore, although in FIG. 25, a configuration is assumed in which the content is encrypted using the first and the second content keys, and then the first and the second content keys are encrypted using the media keys, the present invention is not limited to such configuration. For example, it is also possible to have a configuration in which the stages for encryption are further increased through the addition of keys.

Furthermore, as shown in FIG. 25, the recording apparatus in the present embodiment assumes an integrated configuration for the device key storage unit, the media key encryption unit, the content key encryption unit and the content encryption unit for each category, as well as the recording of respective data onto the recording medium. However, the present invention is not limited to such, and it is possible to have a configuration in which the recording apparatus is separated. For example, it is also possible to have a configuration in which (a) the device key storage unit, the media key encryption unit and the content key encryption unit for each category (the section enclosed in broken lines in FIG. 25) are built into an apparatus which is provided in a facility which operates the key management of the entire system and the key issuance for the reproduction apparatuses, as their management and operation require great confidentiality, and (b) the content encryption units and the recording of respective data onto the recording medium is executed by an apparatus provided in a content manufacturing facility or a recording medium manufacturing facility.

Furthermore, in the present embodiment, during the generation of the first encrypted media key data in the system updating, data is also assigned to the revoked decryption apparatuses at the time of system updating, as in Ea (DKA'2, 0) in FIG. 29 and Ea' (DKA'2, 0) in FIG. 30. However, it is also possible to have a configuration in which data is not assigned to a revoked decryption apparatus. In that case, the position of the encrypted media key to be used by the decryption apparatuses which are not revoked is also updated, and by providing new position information when a new device key is provided, the decryption apparatuses that are not revoked can use the appropriate data and obtain the correct media key even if there is a change in the position of the encrypted media key before and after the system update. In such a case, the volume of data that needs to be stored in the first encrypted media key data recording area after the system update can be reduced. Alternatively, when the maximum value for the volume is limited, it becomes possible to increase the number of new decryption apparatuses belonging to the first category.

Furthermore, although the present embodiment adopts a method in which revocation of a decryption apparatus is performed using encrypted media key data such as that shown in FIG. 28, a different method can be used for the method for revocation. For example, the revocation method utilizing a tree-structure, disclosed in patent reference 1 can also be used.

Furthermore, although the present embodiment makes use of the DES having a 56-bit key length as the encryption algorithm, and the two-key triple DES having a 112-bit key length as the post-system update algorithm, the present invention is not limited to such, and can also use other encryption algorithms such as AES having a 128-bit key length, for example, which is referred to as a next-generation standard cryptograph.

Furthermore, although in FIG. 28, after the entirety of the content is encrypted using the first content key (CK1), it is further encrypted using the second content key (CK2), the present invention is not limited to such. For example, the content can be divided into several blocks, with some blocks being encrypted using the first content key (CK1) and the rest of the blocks being encrypted using the second content key (CK2).

Moreover; although the present embodiment is an application of the present invention in a system in which a content is distributed using a playback-only recording medium, and the distributed content is reproduced using reproduction apparatuses, the present invention is not limited to such application. The present invention can also be applied in a system utilizing a rewritable or recordable recording medium, by assuming a configuration in which encrypted media key data and an encrypted content key for each category are generated and recorded onto a recording medium by a key generation apparatus, and the encrypted media key data and the encrypted content key are decrypted and the content encrypted by a recording apparatus, in the same manner as in the aforementioned second embodiment.

Sixth Embodiment

The sixth embodiment of the present invention is an application of the present invention in a system in which a content is distributed using a playback-only recording medium, and the distributed content is reproduced using reproduction apparatuses, as in the first embodiment.

Figure 31:
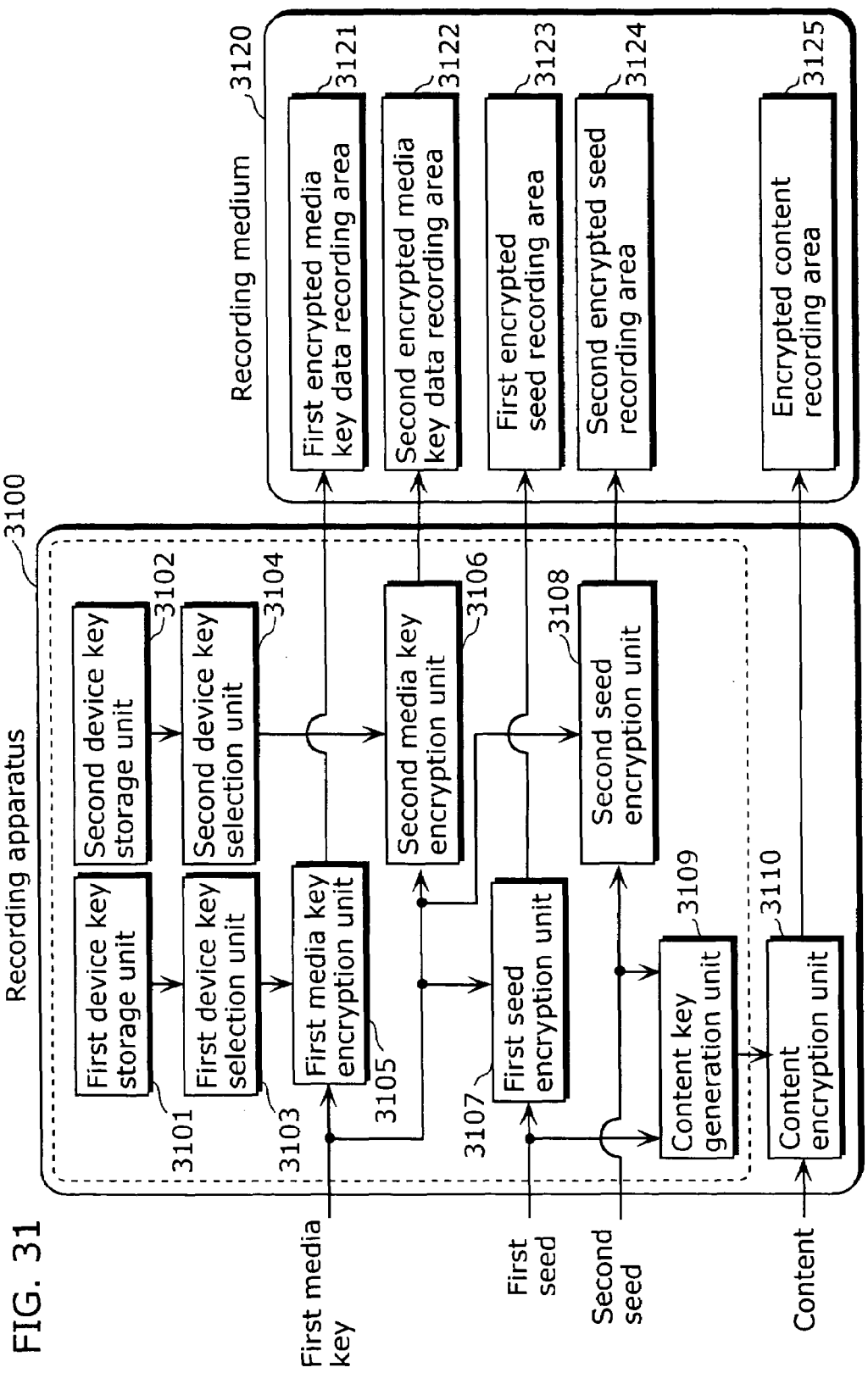
FIG. 31 is a block diagram showing the recording apparatus and the recording medium in the sixth embodiment of the present invention.
Figure 32:
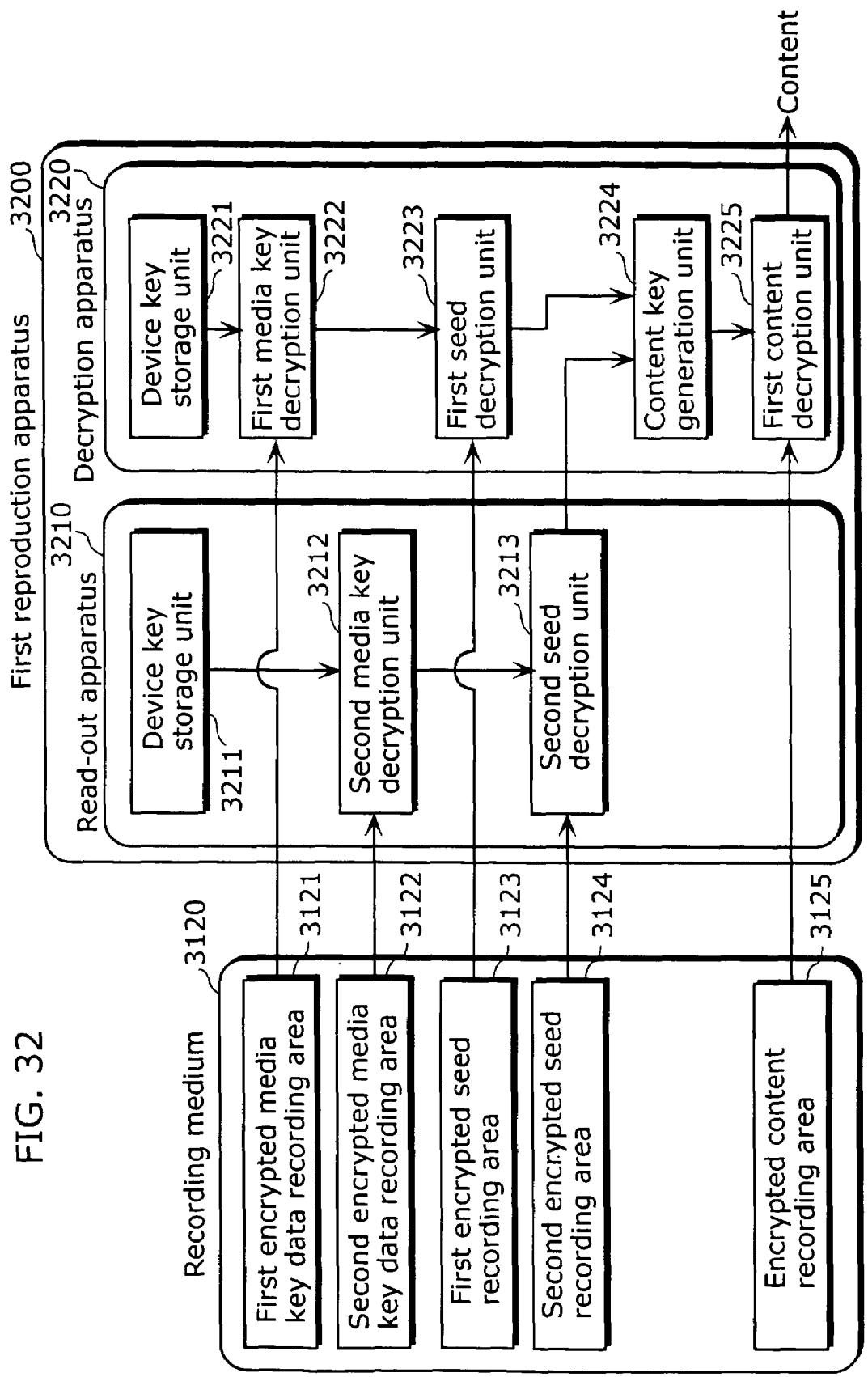
FIG. 32 is a block diagram showing the recording medium and the first category reproduction apparatus in the sixth embodiment of the present invention.
Figure 33:
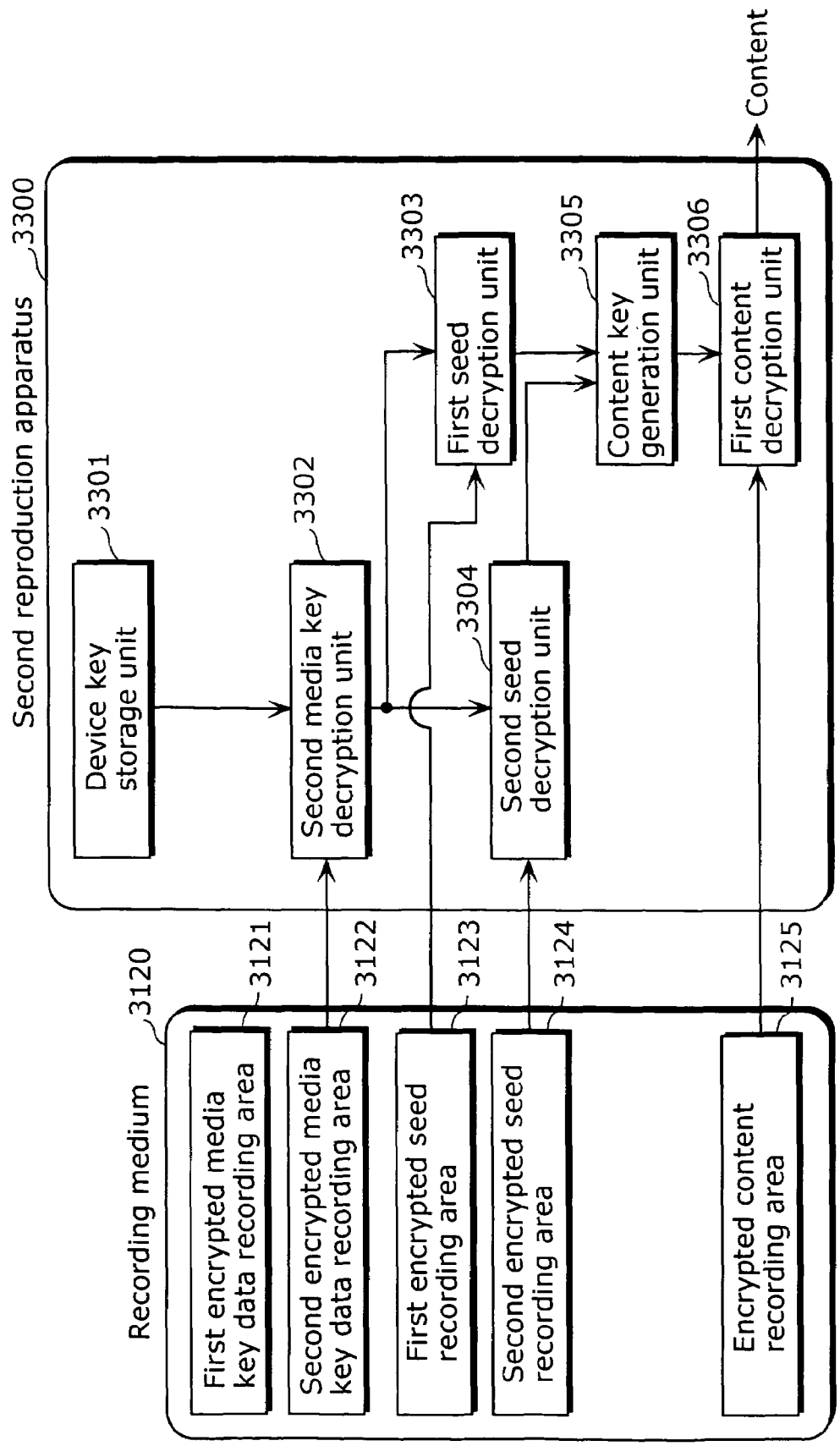
FIG. 33 is a block diagram showing the recording medium and the second category reproduction apparatus in the sixth embodiment of the present invention.
Figure 34:
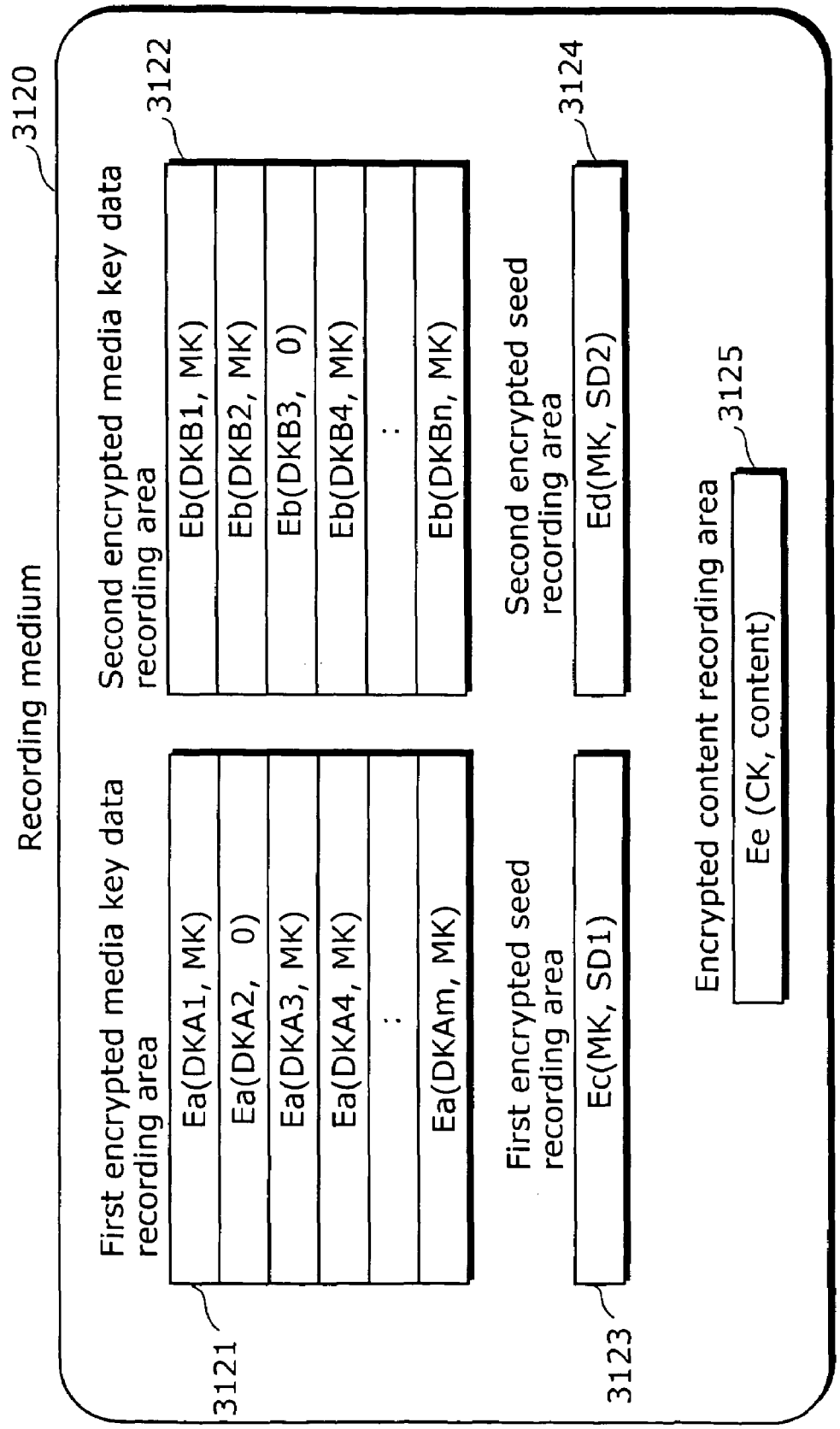
FIG. 34 is a schematic diagram showing a specific example of data to be recorded on the recording medium in the sixth embodiment of the present invention.

Hereinafter, the sixth embodiment of the present invention shall be described with reference to the diagrams. FIG. 31 shows a recording apparatus 3100 which encrypts a content and records the encrypted content, and a recording medium 3120. FIG. 32 shows a first reproduction apparatus 3200 which reads-out and decrypts, the encrypted content from the recording medium 120. FIG. 33 shows a second reproduction apparatus 3300 which reads-out and decrypts, the encrypted content from the recording medium 3120. Furthermore, FIG. 34 shows a specific example of various data to be recorded on the recording medium 3120.

The recording apparatus 3100 in FIG. 31 is different from the recording apparatus 100 in FIG. 1 in generating the content key in a content key generation unit 3109 using a first and a second seed which are inputted from an outside source, and then encrypting, using a media key, the first and the second seeds in a first seed encryption unit 3107 and a second seed encryption unit 3108, respectively, and then recording the output on the recording medium 3120. As the rest of the points are the same as in the recording apparatus 100 in FIG. 1, their description shall be omitted.

The recording medium 3120 includes the following: a first encrypted media key data recording area 3121 for recording first encrypted media key data; a second encrypted media key data recording area 3122 for recording second encrypted media key data; a first encrypted seed recording area 3123 for recording a first encrypted seed generated by the first seed encryption unit 3107; a second encrypted seed recording area 3124 for recording a second encrypted seed generated by the second seed encryption unit 3108; and an encrypted content recording area 3125 for recording an encrypted content.

The first reproduction apparatus 3200 is made up of a read-out apparatus 3210 and a decryption apparatus 3220.

The read-out apparatus 3210 includes the following: a device key storage unit 3211 which confidentially holds a device key; a second media key decryption unit 3212 which obtains the media key by decrypting, using the device key, the second encrypted media key data which is read out from the recording medium 3120; a second seed decryption unit 3213 which obtains the second seed by decrypting, using the obtained media key, the second encrypted seed which is read out from the recording medium. It then supplies the obtained second seed to the decryption apparatus 3220 together with the first encrypted media key data, the first encrypted seed, and the encrypted contents which are read out from the recording medium 3220. In the present embodiment, it is assumed that the read-out apparatus 3210 has the aforementioned component elements implemented through hardware, and belongs to the second category.

The decryption unit 3220 includes the following: a device key storage unit 3221 which confidentially holds the device key; a first media key decryption unit 3222 which obtains the media key by decrypting, using the device key, the first encrypted media key supplied by the read-out apparatus 3210; a first seed decryption unit 3223 which obtains the first seed by decrypting, using the obtained media key, the first encrypted seed supplied by the read-out apparatus 3210; a content key generation unit 3224 which generates the content key using the obtained first seed and the second seed supplied by the read-out apparatus 3210; and a content decryption unit 3225 which decrypts, using the generated content key, the encrypted content supplied by the read-out apparatus 3210. In the sixth embodiment, it is assumed that the decryption unit 3220 has the aforementioned component elements implemented through software, and belongs to the first category. Moreover, it is possible to have a such a method where, assuming that the first and the second seeds respectively have 64 bits, a bit concatenation of their respective high 28 bits is carried out in the content key generation units 3109 and 3224 to obtain a 56-bit content key.

The second reproduction apparatus 3300 is a second category reproduction apparatus, and includes the following: a device key storage unit 3301 which confidentially holds the device key; a media key decryption unit 3302 which obtains the media key by decrypting, using the device key, the second encrypted media key data which is read out from the recording medium 3120; a first seed decryption unit 3303 which obtains the first seed by decrypting, using the obtained media key, the first encrypted seed which is read out from the recording medium; a second seed decryption unit 3304 which obtains the second seed by decrypting, using the obtained media key, the second encrypted seed which is read out from the recording medium 3120; a content key generation unit 3305 which generates the content key from the first seed and the second seed; and a content decryption unit 3306 which decrypts, using the generated content key, the encrypted content which is read out from the recording medium 3120. In the sixth embodiment, the second reproduction apparatus 3300 has the aforementioned component elements implemented through hardware, and belongs to the second category.

In the present embodiment, it is assumed that a decryption apparatus which is implemented through software, as in an application program in a personal computer, is a decryption apparatus belonging to the first category, and an apparatus which is implemented through hardware, as in an optical disk drive which is connected or built into a common household player as well as a personal computer, is assumed as an apparatus belonging to the second category.

FIG. 34 shows a specific example of the various data to be recorded on the recording medium 3120 in the case where it is assumed that m-units of first category decryption apparatuses and n-units of second category apparatuses hold only one unique device key each, and a first category decryption apparatus 2 and a second category apparatus 3 are revoked. In FIG. 34, it is assumed that a first category decryption apparatus "i" (i=1 to m) holds a device key DKAi, a second category apparatus "j" (j=1 to n) holds a device key DKAj. Furthermore, Ea (X, Y), Eb (X, Y), Ec (X, Y) and Ed (X, Y), and Ee (X, Y) represent functions for encrypting data Y using key data X. In addition, the encryption algorithm used can be realized by commonly known technology, and the present embodiment makes use of DES cryptography having a key length of 56 bits.

As the data recorded in the first encrypted media key data recording area 3121 and the second media key data recording area 3122 are the same as the data recorded in the first encrypted media key data recording area 121 and the second media key data recording area 122, respectively, in the aforementioned first embodiment, their description shall be omitted.

(The First Encrypted Seed Recording Area 3123)

A first seed (SD1) which is encrypted using the media key (MK) is recorded in the first encrypted seed recording area 3123.

(The Second Encrypted Seed Recording Area 3124)

A second seed (SD2) which is encrypted using the media key (MK) is recorded in the first encrypted seed recording area 3124.

(The Encrypted Content Recording Area 3125)

A content which is encrypted using the content key (CK) is recorded in the encrypted content recording area 3125.

In the above-configured embodiment of the present invention, in the case where, for example, a number of device keys provided to the first category decryption apparatuses and the algorithm for decrypting the first encrypted media key data are illicitly exposed over the Internet, and it is judged that the revocation for the first category decryption apparatuses has stopped functioning, the revocation system for the first category decryption apparatuses is updated. Specific examples are described hereinafter.

System Update Specific Example 1

Figure 35:
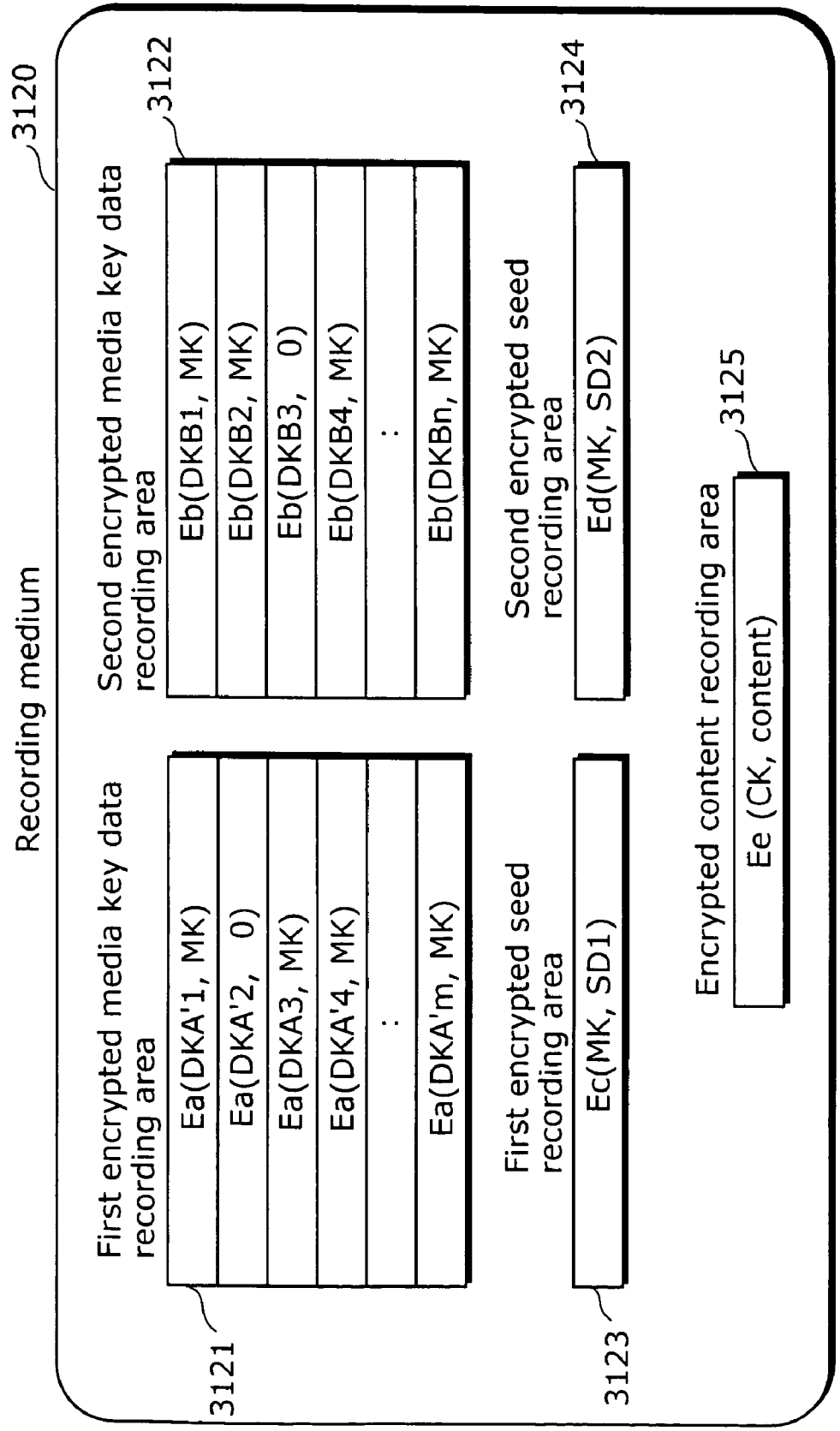
FIG. 35 is a schematic diagram showing specific example 1 of the system update in the sixth embodiment of the present invention.

FIG. 35 shows a specific example 1 for various data to be recorded on a new recording medium 3120 which is created after it is judged that the revocation for the first category decryption apparatuses has stopped functioning. The difference with FIG. 34 is that the device keys DKA1 to DKAm used in generating the first encrypted media key data are changed to DKA'1 to DKA'm. As this is the same as the system update specific example 1 described in the aforementioned first embodiment, description of details shall be omitted.

Here, as each device key among the new device keys (DKA'1 to DKA'm) does not match any of the pre-system update device keys (DKA1 to DKAm), even when a device key, apart from DKA2, is exposed through an illicit cryptanalysis prior to the system update, the media key (MK) cannot be obtained by using such device key to decrypt the first encrypted media key which is read out from the recording medium in FIG. 35, and the content cannot be reproduced.

Moreover, as the device keys (DKB1 to DKBn) used in the generation of the second encrypted media key data are not changed during the aforementioned system update, no changes have to be made for the apparatuses belonging to the second category.

System Update Example 2

Figure 36:
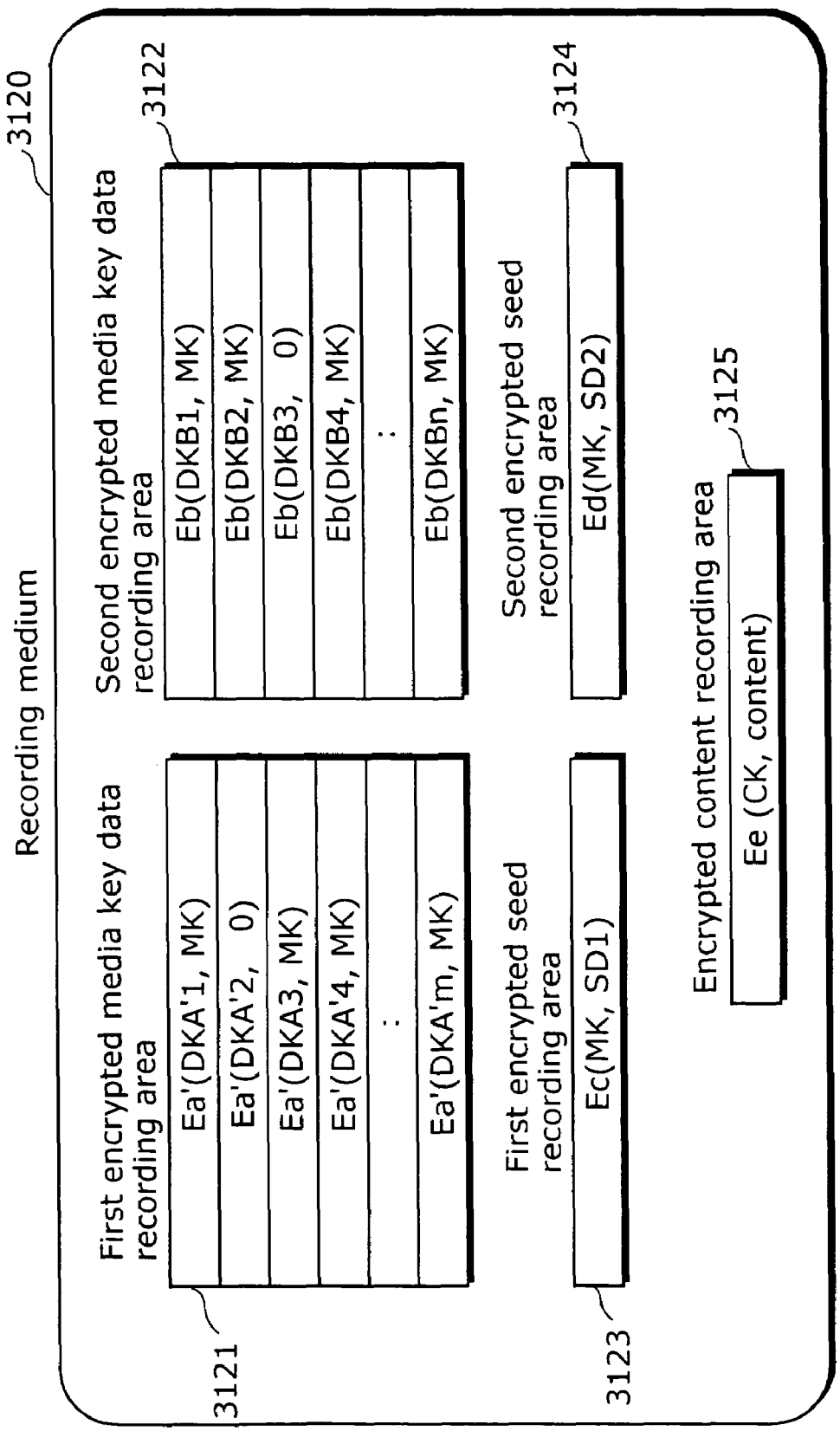
FIG. 36 is a schematic diagram showing specific example 2 of the system update in the sixth embodiment of the present invention.

FIG. 36 shows a specific example 2 for various data to be recorded on a new recording medium 3120 which is created after it is judged that the revocation for the first category decryption apparatuses has stopped functioning. The difference with FIG. 34 is that the device keys DKA1 to DKAm used in generating the first encrypted media key data are changed to DKA'1 to DKA'm, and the encryption algorithm is changed from Ea (X,Y) to Ea' (X,Y). As this is the same as the system update specific example 2 described in the aforementioned first embodiment, description of details shall be omitted.

Here, as each device key among the new device keys (DKA'1 to DKA'm) does not match any of the pre-system update device keys (DKA1 to DKAm), even when a device key, apart from DKA2, is exposed through an illicit cryptanalysis prior to the system update, the media key (MK) cannot be obtained by using such device key to decrypt the first encrypted media key which is read out from the recording medium in FIG. 36, and the content cannot be reproduced.

Furthermore, as it is possible to increase the encryption strength by changing the key length of the device key and the encryption algorithm, practices such as the illicit obtainment of a device key through the cryptanalysis of the system can be hindered.

Moreover, as the device keys (DKB1 to DKBn) used in the generation of the second encrypted media key data, and the encryption algorithm of the second encrypted media key data, are not changed during the aforementioned system update, no changes need to be made for the apparatuses belonging to the second category.

According to the above-configured fifth embodiment of the present invention, there is no need for the first category apparatuses (the decryption apparatus 3220) and the second category apparatuses (the read-out apparatus 3210 and the second reproduction apparatus 3300) to read the first or second encrypted media key data which are for revoking respective apparatuses of the different categories. Therefore, the memory capacity provided within the apparatus can be made smaller and processing time can be reduced. Furthermore, the encryption algorithm used in generating the first encrypted media key data can be made different from the encryption algorithm used in generating the second encrypted media key data. Therefore, even in the case where the revocation system of the first category decryption apparatuses falls into a situation where it is exposed, the revocation system can be changed, without affecting the second category apparatuses, by changing (a) the key length of the device keys provided to the first category decryption apparatuses and (b) the generation algorithm of the first encrypted media key data. In addition, as the algorithm for decrypting the second encrypted seed is not installed in the first category decryption apparatus 3220, even when any of the first category decryption apparatuses is cryptanalyzed and the device key and the decryption algorithm being held is exposed, the second seed, which is different for each content, cannot be decrypted. It is therefore possible to prevent illicit acts carried out with respect to the first category, from affecting the entirety of the system, and a stronger copyright protection system can be constructed. This is particularly effective in the case where, as in the present embodiment, (a) the first category refers to a decryption apparatus implemented through software for which updating and adding of decryption algorithms and keys is easy but sturdy implementation is difficult, and (b) the second category refers to a reproduction apparatus or a read apparatus implemented through hardware which is sturdy but updating and adding of decryption algorithms and keys is difficult.

Moreover, although in FIG. 31, a configuration is assumed in which the media key, the first seed, and the second seed are inputted from a source outside of the recording apparatus 3100, the present invention is not limited to such configuration. For example, it is also possible to have a configuration in which the recording apparatus 3100 includes a storage unit for storing the media key, the first seed, and the second seed. Furthermore, it is also possible for to have a configuration in which the recording apparatus 3100 includes a generation unit which generates the media key, the first seed, and the second seed as required.

Furthermore, although in FIG. 31, a configuration is assumed in which the content key is generated from the first seed and the second seed, then the content is encrypted using the content key, and then the first seed and the second seed are encrypted using the media key, the present invention is not limited to such configuration. For example, it is also possible to have a configuration in which the stages for encryption are further increased through the addition of keys.

Furthermore, as shown in FIG. 31, the recording apparatus in the present embodiment assumes an integrated configuration for the device key storage unit, the media key encryption unit, the seed encryption unit, the content key generation unit and the content encryption unit for each category, as well as the recording of respective data onto the recording medium. However, the present invention is not limited to such, and it is possible to have a configuration in which the recording apparatus is separated. For example, it is also possible to have a configuration in which (a) the device key storage unit, the media key encryption unit, the seed encryption unit and the content key generation unit for each category (the section enclosed in broken lines in FIG. 31) are built into an apparatus which is provided in a facility which operates the key management of the entire system and the key issuance for the reproduction apparatuses, as their management and operation require great confidentiality, and (b) the content encryption unit and the recording of respective data onto the recording medium is executed by an apparatus provided in a content manufacturing facility or a recording medium manufacturing facility.

Furthermore, in the present embodiment, during the generation of the first encrypted media key data in the system updating, data is also assigned to the revoked decryption apparatuses at the time of system updating, as in Ea (DKA'2, 0) in FIG. 35 and Ea' (DKA'2, 0) in FIG. 36. However, it is also possible to have a configuration in which data is not assigned to a revoked recording apparatus. In that case, the position of the encrypted media key to be used by the decryption apparatuses which are not revoked is also updated, and by providing new position information when a new device key is provided, the decryption apparatuses that are not revoked can use the appropriate data and obtain the correct media key even if there is a change in the position of the encrypted media key before and after the system update. In such a case, the volume of data that needs to be stored in the first encrypted media key data recording area after the system update can be reduced. Alternatively, when the maximum value for the volume is limited, the number of new decryption apparatuses belonging to the first category can be increased.

Furthermore, although the present embodiment adopts a method in which revocation of a decryption apparatus is performed using encrypted media key data such as that shown in FIG. 34, a different method can be used for the method for revocation. For example, the revocation method utilizing a tree-structure, disclosed in patent reference 1 can also be used.

Furthermore, although the present embodiment makes use of the DES having a 56-bit key length as the encryption algorithm, and the two-key triple DES having a 112-bit key length as the post-system update algorithm, the present invention is not limited to such, and can also use other encryption algorithms such as AES having a 128-bit key length, for example, which is referred to as a next-generation standard cryptograph.

Moreover, although the present embodiment is an application of the present invention in a system in which a content is distributed using a playback-only recording medium, and the distributed content is reproduced using reproduction apparatuses, the present invention is not limited to such application. The present invention can also be applied in a system utilizing a rewritable or recordable recording medium, by assuming a configuration in which encrypted media key data and an encrypted seed for each category are generated and recorded onto a recording medium by a key generation apparatus, and the encrypted media key data and the encrypted seeds are decrypted, and then a content key is generated and the content encrypted by a recording apparatus, in the same manner as in the aforementioned second embodiment.

Seventh Embodiment

In the seventh embodiment of the present invention, the system in the sixth embodiment is provided with separate media keys for the first category and the second category, and provided with stages of the first encrypted seed respectively use such media keys.

Figure 37:
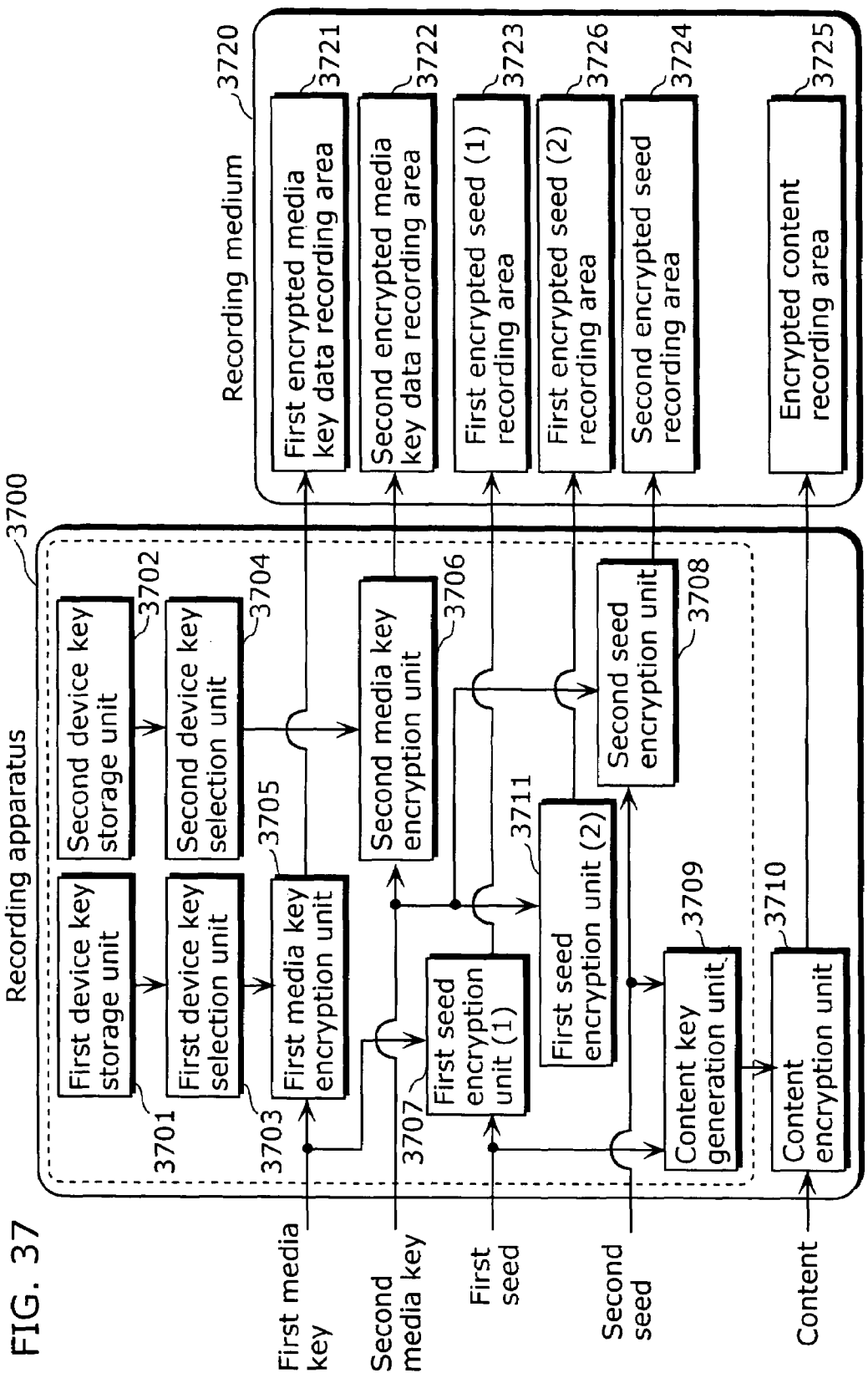
FIG. 37 is a block diagram showing the recording apparatus and the recording medium in the seventh embodiment of the present invention.
Figure 38:
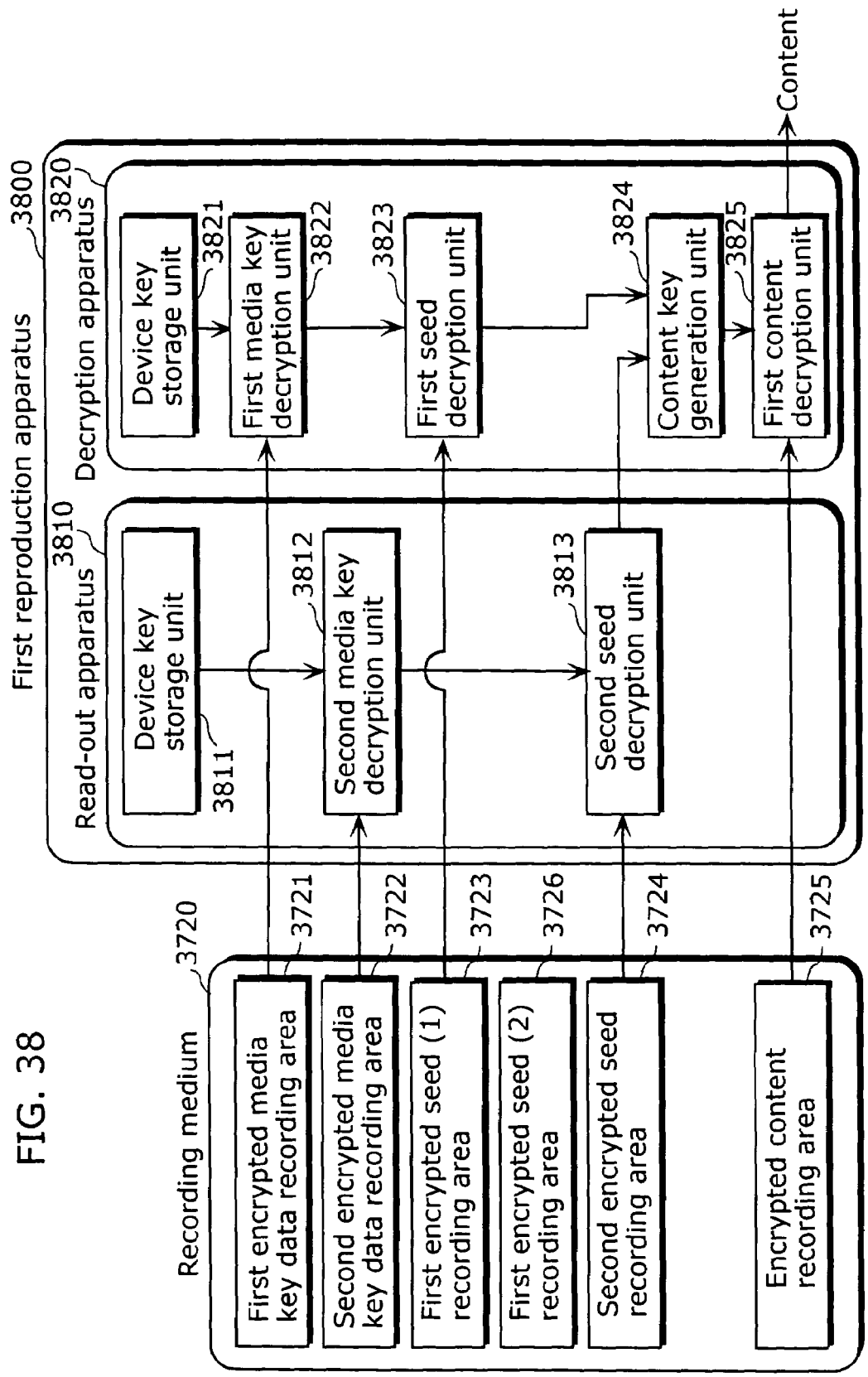
FIG. 38 is a block diagram showing the recording medium and the first category reproduction apparatus in the seventh embodiment of the present invention.
Figure 39:
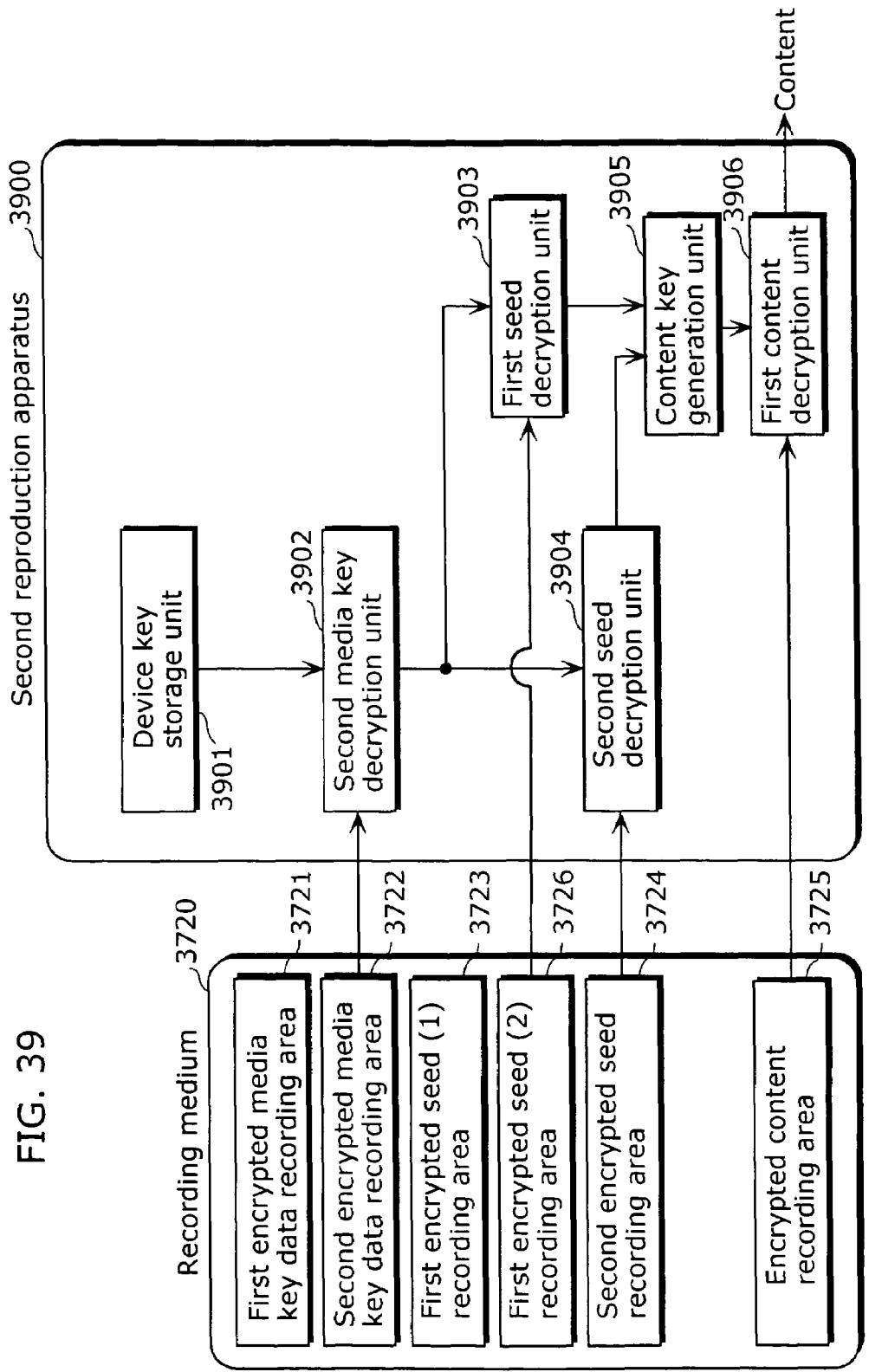
FIG. 39 is a block diagram showing the recording medium and the second category reproduction apparatus in the seventh embodiment of the present invention.
Figure 40:
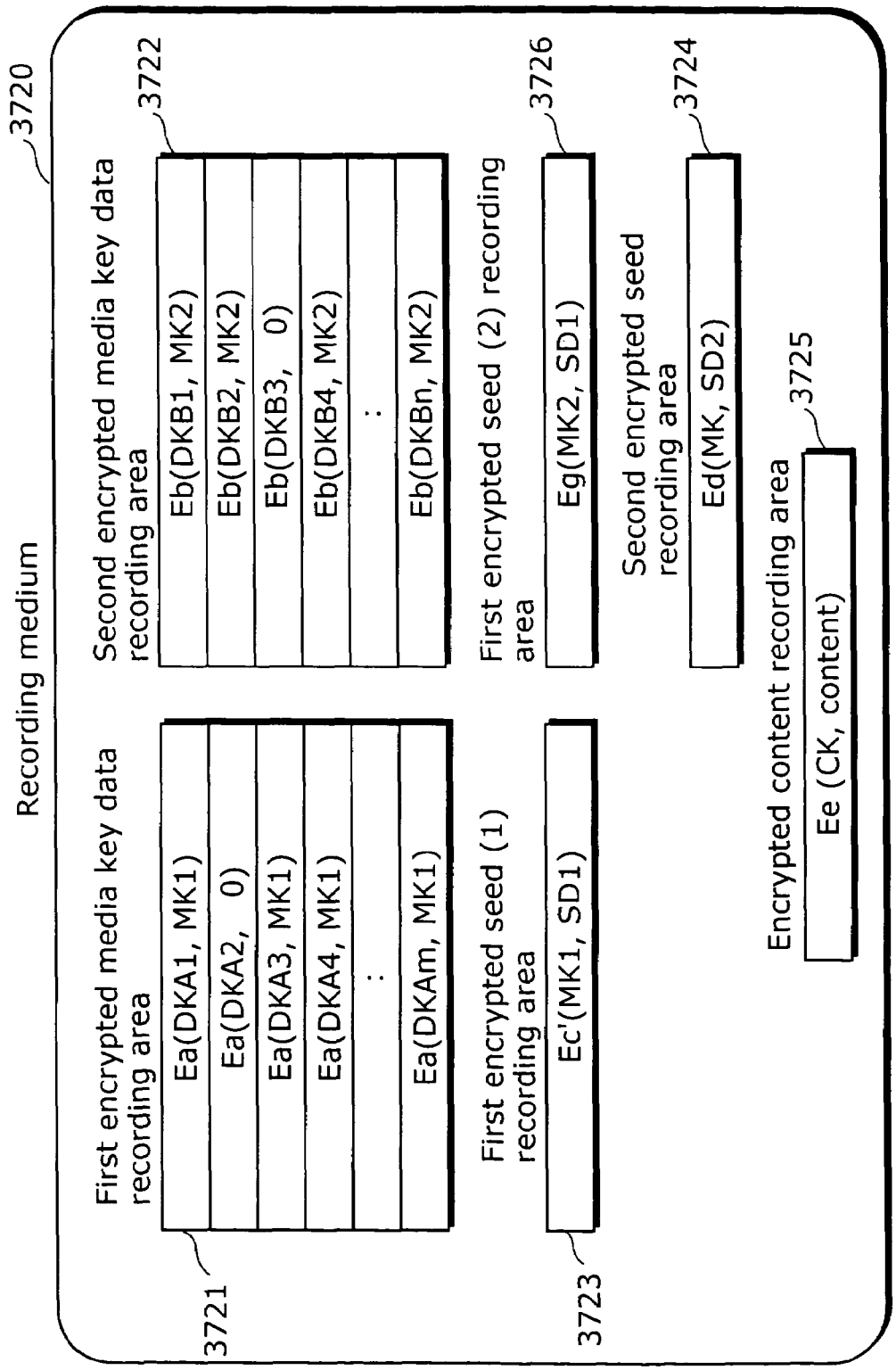
FIG. 40 is a schematic diagram showing a specific example of data to be recorded on the recording medium in the seventh embodiment of the present invention.

Hereinafter, the seventh embodiment of the present invention shall be described with reference to the diagrams. FIG. 37 shows a recording apparatus 3700 which encrypts a content and records the encrypted content, and a recording medium 3720. FIG. 38 shows a first reproduction apparatus 3800 which reads-out and decrypts the encrypted content from the recording medium 3720. FIG. 39 shows a second reproduction apparatus 3900 which reads-out and decrypts the encrypted content from the recording medium 3720. Furthermore, FIG. 40 shows a specific example of various data to be recorded on the recording medium 3720.

The recording apparatus 3700 in FIG. 37 is different from the recording apparatus 3100 in FIG. 31 in being separately provided with a first media key for the first category and a second media key for the second category, then encrypting the first and the second media key in a first media key encryption unit 3705 and a second media key encryption unit 3706, respectively, encrypting a first seed in a first seed encryption unit (1) 3707 and a second seed encryption unit (2) 3711, using the first and the second media keys, respectively, and then recording the output on the recording medium 3720. As the rest of the points are the same as in the recording apparatus 3100 in the aforementioned sixth embodiment, their description shall be omitted.

The recording medium 3720 includes the following: a first encrypted media key data recording area 3721 for recording first encrypted media key data; a second encrypted media key data recording area 3722 for recording second encrypted media key data; a first encrypted seed (1) recording area 3723 for recording the first encrypted seed (1) generated by the first seed encryption unit (1) 3707; a first encrypted seed (2) recording area 3726 for recording the first encrypted seed (2) generated by the first seed encryption unit (2) 3711; a second encrypted seed data recording area 3724 for recording the second encrypted seed; and an encrypted content recording area 3725 for recording the encrypted content. Moreover, the second encrypted seed data is decrypted by a read-out apparatus 3810 of the first reproduction apparatus 3800 and by the second reproduction apparatus 3900, using the second media key.

In the first reproduction apparatus 3800, a decryption apparatus 3820 obtains the first seed by decrypting the first encrypted seed (1) which is read out from the recording medium 3720 by the read-out apparatus 3810. As the rest of the points are the same as in the first reproduction apparatus 3200 in the aforementioned sixth embodiment, their description shall be omitted.

The second reproduction apparatus 3900 obtains the first seed by decrypting the first encrypted seed (2) which is read out from the recording medium 3720. As the rest of the points are the same as in the second reproduction apparatus 3300 in the aforementioned sixth embodiment, their description shall be omitted.

FIG. 40 shows a specific example of the various data to be recorded on the recording medium 3720. A first media key (MK1) encrypted using device keys (DKA1 to DKAm) held by the first category decryption apparatuses is recorded in the first encrypted media key data recording area 3721. A second media key (MK2) encrypted using device keys (DKB1 to DKBm) held by the second category apparatuses is recorded in the second encrypted media key data recording area 3722. Furthermore, a first seed (SD1) which is encrypted using the first media key (MK1) is recorded in the first encrypted seed data (1) recording area 3723, and a first seed (SD1) encrypted using the second media key (MK2) is recorded in the first encrypted seed data (2) recording area 3726. As the rest of the points are the same as in FIG. 34 described earlier, their description shall be omitted. Moreover, Ef (X, Y) in FIG. 40 refers to functions for encrypting data Y using key data X. The present embodiment uses DES cryptography having a key length of 56 bits.

In the above-configured seventh embodiment of the present invention, in the case where, for example, a number of device keys provided to the first category decryption apparatuses and the algorithm for decrypting the first encrypted media key data are illicitly exposed over the Internet, and it is judged that the revocation for the first category decryption apparatuses has stopped functioning, the revocation system for the first category decryption apparatuses is updated. Specific examples are described hereinafter.

System Update Specific Example 1

Figure 41:
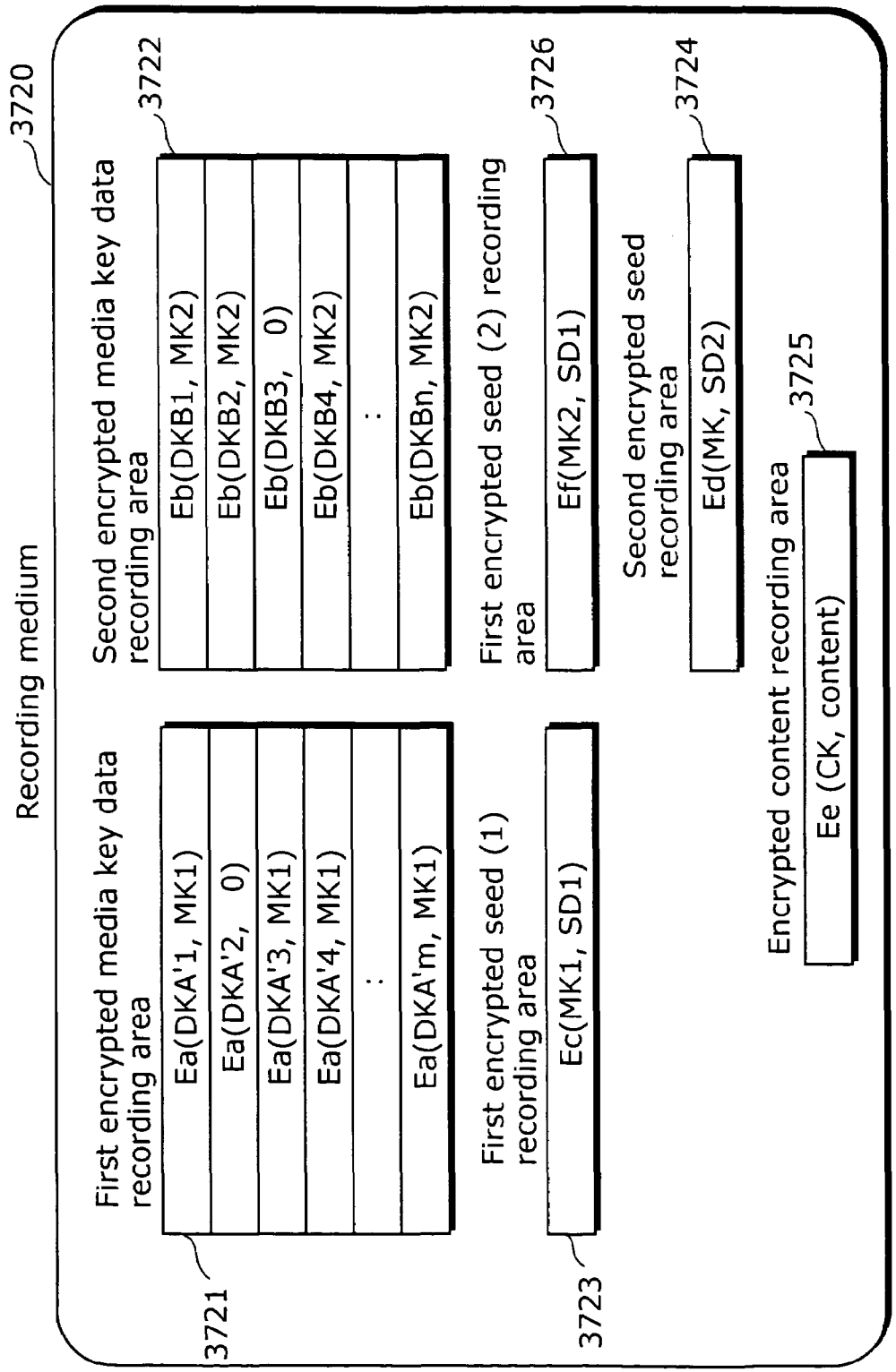
FIG. 41 is a schematic diagram showing specific example 1 of the system update in the seventh embodiment of the present invention.

FIG. 41 shows a specific example 1 for various data to be recorded on a new recording medium 3720 which is created after it is judged that the revocation for the first category decryption apparatuses has stopped functioning. The difference with FIG. 40 is that the device keys DKA1 to DKAm used in generating the first encrypted media key data are changed to DKA'1 to DKA'm. As this is the same as the system update specific example 1 described in the aforementioned first embodiment, description of details shall be omitted.

System Update Example 2

Figure 42:
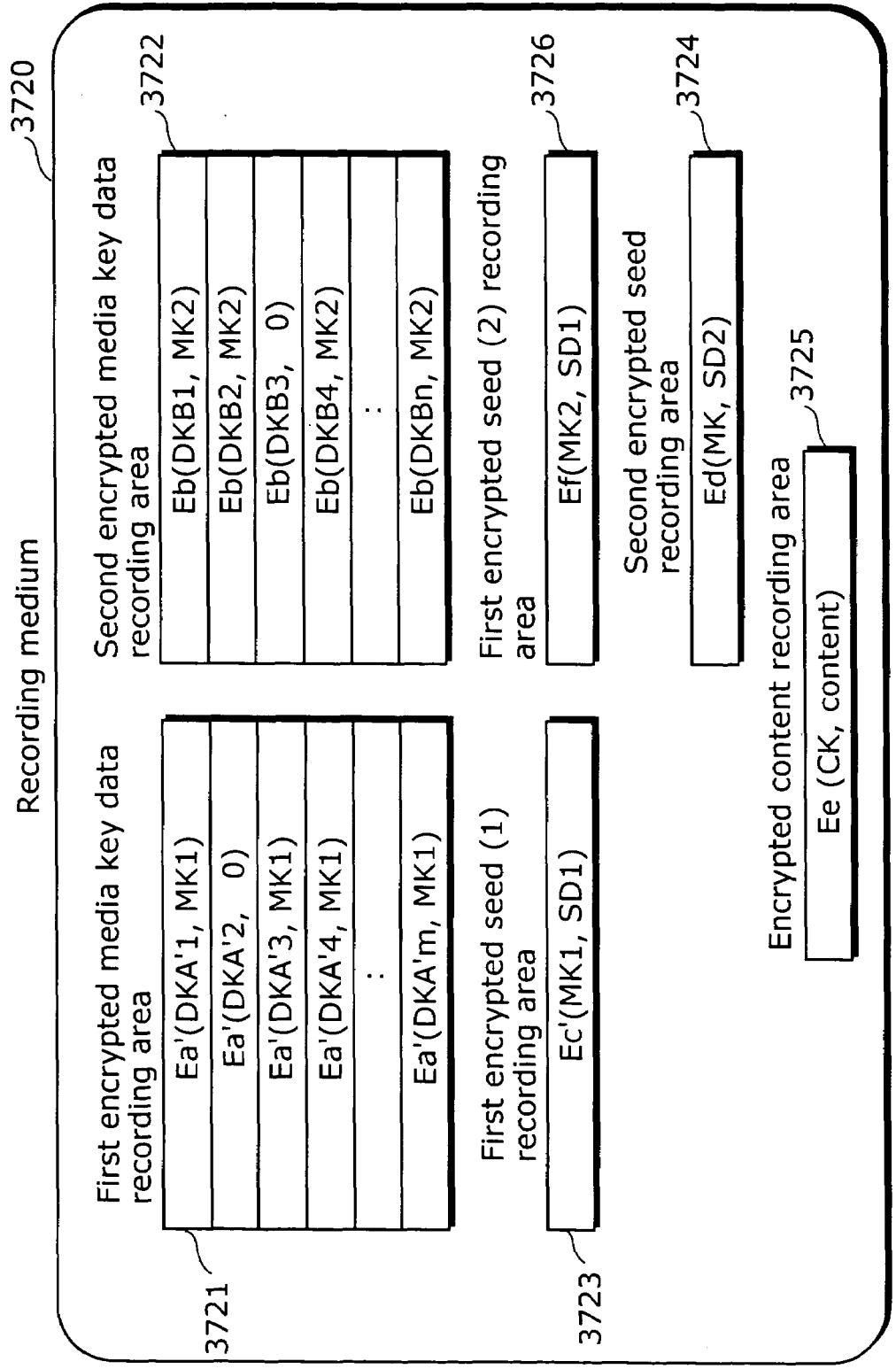
FIG. 42 is a schematic diagram showing specific example 2 of the system update in the seventh embodiment of the present invention.

FIG. 42 shows a specific example 2 for various data to be recorded on a new recording medium 3720 which is created after it is judged that the revocation for the first category decryption apparatuses has stopped functioning. The difference with FIG. 40 is that the device keys DKA1 to DKAm used in generating the first encrypted media key data are changed to DKA'1 to DKA'm, the encryption algorithm is changed from Ea (X, Y) to Ea' (X, Y), and the encryption algorithm for the first encrypted seed (1) is changed from Ec (X, Y) to Ec' (X, Y). As this is the same as the system update specific example 2 described in the aforementioned third embodiment, description of details shall be omitted.

According to the above-configured fifth embodiment of the present invention, a strong copyright protection system can be constructed, in the same manner as in the sixth embodiment. In addition, by having separate media keys for the first category and the second category, and providing stages of the encrypted seeds which respectively use such media keys, in the present embodiment, the independence between categories can be increased. More specifically, even in the case where a device key is exposed from an apparatus belonging to the first category, the media key that can be obtained using such device key is limited to the first media key only, and thus it is possible to prevent the second media key from being exposed. This is particularly effective in the case where, as in the present embodiment, (a) the first category refers to a decryption apparatus implemented through software for which updating and adding of decryption algorithms and keys is easy but sturdy implementation is difficult, and (b) the second category refers to a reproduction apparatus or a read apparatus implemented through hardware which is sturdy but updating and adding of decryption algorithms and keys is difficult.

Moreover, although in FIG. 37, a configuration is assumed in which the first media key, the second media key, the first seed, and the second seed are inputted from a source outside of the recording apparatus 3700, the present invention is not limited to such configuration. For example, it is also possible to have a configuration in which the recording apparatus 3700 includes a storage unit for storing them. Furthermore, it is also possible for to have a configuration in which the recording apparatus 3700 includes a generation unit which generates them as required.

Furthermore, although in FIG. 37, a configuration is assumed in which the content key is generated from the first seed and the second seed, and then the content is encrypted using the content key, and then the first and the second seeds are encrypted using the media keys, the present invention is not limited to such configuration. For example, it is also possible to have a configuration in which the stages for encryption are further increased through the addition of keys.

Furthermore, as shown in FIG. 37, the recording apparatus in the present embodiment assumes an integrated configuration for the device key storage unit, the media key encryption unit and the seed encryption unit for each category, as well as the content key generation unit, the content encryption unit and the recording of respective data onto the recording medium. However, the present invention is not limited to such, and it is possible to have a configuration in which the recording apparatus is separated. For example, it is also possible to have a configuration in which (a) the device key storage unit, the media key encryption unit and the seed encryption units for each category, as well as the content key generation unit (the section enclosed in broken lines in FIG. 37) are built into an apparatus which is provided in a facility which operates the key management of the entire system and the key issuance for the reproduction apparatuses, as their management and operation require great confidentiality, and (b) the content encryption unit and the recording of respective data onto the recording medium is executed by an apparatus provided in a content manufacturing facility or a recording medium manufacturing facility.

Furthermore, in the present embodiment, during the generation of the first encrypted media key data in the system updating, data is also assigned to the revoked decryption apparatuses at the time of system updating, as in Ea (DKA'2, 0) in FIG. 41 and Ea' (DKA'2, 0) in FIG. 42. However, it is also possible to have a configuration in which data is not assigned to a revoked decryption apparatus. In that case, the position of the encrypted media key to be used by the decryption apparatuses which are not revoked is also updated, and by providing new position information when a new device key is provided, the decryption apparatuses that are not revoked can use the appropriate data and obtain the correct media key even if there is a change in the position of the encrypted media key before and after the system update. In such a case, the volume of data that needs to be stored in the first encrypted media key data recording area after the system update can be reduced. Alternatively, when the maximum value for the volume is limited, it becomes possible to increase the number of new decryption apparatuses belonging to the first category.

Furthermore, although the present embodiment adopts a method in which revocation of a decryption apparatus is performed using encrypted media key data such as that shown in FIG. 40, a different method can be used for the method for revocation. For example, the revocation method utilizing a tree-structure, disclosed in patent reference 1 can also be used.

Furthermore, although the present embodiment makes use of the DES having a 56-bit key length as the encryption algorithm, and the two-key triple DES having a 112-bit key length as the post-system update algorithm, the present invention is not limited to such, and can also use other encryption algorithms such as AES having a 128-bit key length, for example, which is referred to as a next-generation standard cryptograph.

Moreover, although the present embodiment is an application of the present invention in a system in which a content is distributed using a playback-only recording medium, and the distributed content is reproduced using reproduction apparatuses, the present invention is not limited to such application. The present invention can also be applied in a system utilizing a rewritable or recordable recording medium, by assuming a configuration in which encrypted media key data and an encrypted seed for each category are generated and recorded on a recording medium by a key generation apparatus, and the encrypted media key data and the encrypted seeds are decrypted, and then a content key is generated and the content is encrypted by a recording apparatus, in the same manner as in the aforementioned second embodiment.

According to the present invention, there is no need for a first category apparatus and a second category apparatus to read the first or second encrypted media key data which are for revoking respective apparatuses of the different categories. Therefore, the memory capacity provided within the apparatus can be made smaller and processing time can be reduced.

Furthermore, the encryption algorithm used in generating the first encrypted media key data can be made different from the encryption algorithm used in generating the second encrypted media key data. Therefore, even in the case where the revocation system of the first category reproduction apparatuses falls into a situation where it is exposed, the revocation system can be changed, without affecting the second category reproduction apparatuses, by changing (a) the key length of the device keys provided to a first category reproduction apparatuses and (b) the generation algorithm of the first encrypted media key data.

The copyright protection system according to the present invention has the effect of (a) being able to reduce the size of the memory provided within an apparatus, and (b) being able, even in the case where apparatuses of a certain category are illicitly cryptanalyzed and algorithms and a number of keys are exposed, to maintain the revocation function for the entirety of the system, without having to make any changes to the apparatuses of other categories, by changing the encryption/decryption algorithm and the length of the keys for such category. The copyright protection system according to the present invention is useful in the case where, in a system in which a content which is a digitalized literary work is recorded onto or reproduced from a large-capacity recording medium such as an optical disc, there exist (a) a recording apparatus or reproduction apparatus implemented through software, for which updating and adding of decryption algorithms and keys is easy but sturdy implementation is difficult, and (b) a recording apparatus or reproduction apparatus implemented through hardware which is sturdy but updating and adding of decryption algorithms and keys is difficult.

The invention claimed is:

1. A copyright protection system comprising:

a recording apparatus configured to encrypt a content and to record the encrypted content;

a recording medium on which the encrypted content is recorded; and a plurality of reproduction apparatuses, each of which is configured to read out and decrypt the encrypted content recorded on said recording medium, wherein each of said plurality of reproduction apparatuses is one of either a first plurality of reproduction apparatuses which belong to a first category and hold plural device keys in association with information regarding generations of the plural device keys or a second plurality of reproduction apparatuses which belong to a second category and hold only one device key, the plural device keys including a device key held since before and a device key provided in response to when revocation stops functioning, said recording apparatus is configured (a) to generate, for said plurality of reproduction apparatuses and based on a media key and a device key held by each of said plurality of reproduction apparatuses, a plurality of revocation data intended for revoking a device key held by a specific reproduction apparatus of a respective category, (b) to generate the encrypted content which is the content encrypted based on the media key, and (c) to record the plurality of revocation data, information regarding t a generation of the device key for generating each of the plurality of revocation data, and the encrypted content onto said recording medium, the first plurality of reproduction apparatuses are each configured (a) to read out, from said recording medium, the plurality of revocation data corresponding to said first plurality of reproduction apparatuses, the information regarding the generations of the device key, and the encrypted content, and (b) to decrypt the encrypted content based on the plurality of revocation data read out and the information regarding the generation of the device key, the second plurality of reproduction apparatuses are each configured (a) to read out, from said recording medium, the plurality of revocation data corresponding to said second plurality of reproduction apparatuses and the encrypted content, and (b) to decrypt the encrypted content based on the plurality of revocation data read out, each one of the plurality of revocation data is encrypted media key data which is the media key encrypted using a device key held by said plurality of reproduction apparatuses of a corresponding category, the first plurality of reproduction apparatuses are each configured (a) to read out, from said recording medium, the corresponding encrypted media key data, the information regarding the generation of the device key, and the encrypted content, (b) to select a device key associated with the information regarding the generation of the device key, from among the held plural device keys (c) to obtain the media key by decrypting the encrypted media key data using the selected device key, and (d) to decrypt the encrypted content based on the obtained media key, and the second plurality of reproduction apparatuses are each configured (a) to read out, from said recording medium, the corresponding encrypted media key data and the encrypted content, (b) to obtain the media key by decrypting the encrypted media key data using the held device key, and (c) to decrypt the encrypted content based on the obtained media key.

2. The copyright protection system according to claim 1,
wherein said recording apparatus is configured to generate an encryption key based on the media key, and to encrypt the content based on the encryption key, and
said plurality of reproduction apparatuses of the respective categories are each configured to generate a decryption key based on the obtained media key, and to decrypt the encrypted content based on the generated decryption key.

3. The copyright protection system according to claim 1,
wherein said recording apparatus is configured to encrypt the content using a content key, to generate encrypted content key data by encrypting the content key using the media key, and to record the generated encrypted content key data onto said recording medium, and
said plurality of reproduction apparatuses of the respective categories are each configured to read out the encrypted content key data from said recording medium, to obtain the content key by decrypting the encrypted content key data using the media key, and to decrypt the encrypted content using the obtained content key.

4. The copyright protection system according to claim 1,
wherein each one of the plurality of revocation data is encrypted media key data which is a media key for a corresponding category, encrypted using the device key data held by said plurality of reproduction apparatuses of a corresponding category,
said recording apparatus is configured to encrypt the content using a content key, to generate a plurality of encrypted content key data by encrypting the content key using the media key corresponding to the category of said plurality of reproduction apparatuses, and to record, onto said recording medium, at least encrypted media key data, the information regarding a generation of the device key for encrypting the media key, the plurality of encrypted content key data, and the encrypted content,
the first plurality of reproduction apparatuses are each configured (a) to read out, from said recording medium, the information regarding the generation of the device key, the encrypted media key data for the corresponding category, the encrypted content key data for the corresponding category, and the encrypted content, (b) to select a device key associated with the information regarding the generation of the device key, from among the held plural device keys, (c) to obtain a media key for the corresponding category by decrypting the encrypted media key data using the selected device key, (d) to obtain the content key by decrypting the encrypted content key data for the corresponding category using the obtained media key for the corresponding category, and (e) to decrypt the encrypted content using the obtained content key, and
the second plurality of reproduction apparatuses are each configured (a) to read out, from said recording medium, the encrypted media key data for the corresponding category, the encrypted content key data for the corresponding category, and the encrypted content, (b) to obtain the media key for the corresponding category by decrypting the encrypted media key data using the held device key, (c) to obtain the content key by decrypting the encrypted content key data for the corresponding category using the obtained media key for the corresponding category, and (d) to decrypt the encrypted content using the obtained content key.

5. The copyright protection system according to claim 1,
wherein each one of the plurality of revocation data is encrypted media key data which is a media key for a corresponding category, encrypted using the device key held by said plurality of reproduction apparatuses of a corresponding category,
each of the first plurality of reproduction apparatuses includes:
a read-out apparatus of the second category configured to read out and perform a part of a decryption process on the encrypted content recorded on said recording medium; and
a decryption apparatus of the first category, connected to said read-out apparatus of the second category, configured to perform a part of the decryption process on the encrypted content,
said recording apparatus is configured (a) to generate, based on a media key and on a device key held by each of said decryption apparatuses of the first category, a plurality of first encrypted media key data intended for revoking a device key held by a specific decryption apparatus of the first category, (b) to generate, based on a media key and on a device key held by each of apparatuses of the second category, a plurality of second encrypted media key data intended for revoking a device key held by a specific apparatus of the second category, (c) to generate an encrypted content which is the content encrypted based on the media key, and (d) to record at least the plurality of first encrypted media key data, information regarding a generation of the device key for generating each of the plurality of first encrypted media key data, the plurality of second encrypted media key data, and the encrypted content onto said recording medium,
the second plurality of reproduction apparatuses are each configured to read out the plurality of second encrypted media key data and the encrypted content from said recording medium, to obtain the media key by decrypting the plurality of second encrypted media key data using the held device key, and to decrypt the encrypted content based on the obtained media key, and
in each of the first plurality of reproduction apparatuses:
said read-out apparatus of the second category is configured (a) to read out, from said recording medium, the plurality of first encrypted media key data, the information regarding the generation of the device key, the plurality of second encrypted media key data, and the encrypted content, and (b) to supply intermediate data, the information regarding the generation of the device key, and the plurality of first encrypted media key data to said decryption apparatus of the first category, the intermediate data being the encrypted content on which a part of the decryption process has been performed based on the plurality of second encrypted media key data; and
said decryption apparatus of the first category is configured to hold plural device keys in association with information regarding generations of the plural device keys, to select a device key associated with the information regarding the generation of the device key supplied by said read-out apparatus of the second category, to obtain the media key by decrypting the plurality of first encrypted media key data using the selected device key, and to obtain the content by performing the decryption process on the intermediate data based on the obtained media key, the plural device keys including a device key held since before and a device key provided in response to when revocation stops functioning.

6. A recording apparatus which encrypts a content and records the encrypted content, the content being reproduced by first reproduction apparatuses which belong to a first category and hold plural device keys in association with information regarding generations of the plural device keys and by second reproduction apparatuses which belong to a second category and hold only one device key, the plural device keys including a device key held since before and a device key provided in response to when revocation stops functioning, wherein said recording apparatus (a) generates, for a plurality of reproduction apparatuses and based on a media key and a device key held by each of the plurality of reproduction apparatuses, a plurality of revocation data intended for revoking a device key held by a specific reproduction apparatus belonging to respective categories, (b) generates an encrypted content which is the content encrypted based on the media key, and (c) records the plurality of revocation data, the information regarding the generation of the device key for generating each of the plurality of revocation data, and the encrypted content onto a recording medium, the plurality of revocation data includes first revocation data generated based on a device key selected from among the plural device keys held by said first reproduction apparatuses and second revocation data generated based on the device key held by said second reproduction apparatuses.

7. The recording apparatus according to claim 6,
wherein each one of the plurality of revocation data is encrypted media key data which is the media key encrypted using the device key held by the plurality of reproduction apparatuses of a corresponding category.

8. The recording apparatus according to claim 7,
wherein said recording apparatus generates an encryption key based on the media key, and encrypts the content based on the encryption key.

9. The recording apparatus according to claim 7,
wherein said recording apparatus encrypts the content using a content key, generates encrypted content key data which is the content key encrypted using the media key, and records the generated encrypted key onto the recording medium.

10. The recording apparatus according to claim 6,
wherein each one of the plurality of revocation data is encrypted media key data which is a media key for a corresponding category, encrypted using the device key held by the plurality of reproduction apparatuses of the corresponding category, and
said recording apparatus is configured (a) to encrypt the content using a content key, (b) to generate a plurality of encrypted content key data by encrypting the content key using the media keys corresponding to the category of the reproduction apparatus, and (c) to record, onto the recording medium, at least the encrypted media key data, the information regarding the generation of the device key for encrypting the media key, the plurality of encrypted content key data, and the encrypted content.

11. The recording apparatus according to claim 6,
wherein said recording apparatus (a) generates, based on a media key and on a device key held by each of decryption apparatuses of the first category, a plurality of first revocation data intended for revoking a device key held by a specific decryption apparatus of the first category, (b) generates, based on a media key and on a device key held by apparatuses of the second category, a plurality of second revocation data intended for revoking a device key held by a specific apparatus of the second category, and (c) generates an encrypted content which is the content encrypted based on the media key, and (d) records at least a plurality of first revocation data, information regarding the generation of the device key for generating each of the plurality of first revocation data, a plurality of the second revocation data, and the encrypted content onto the recording medium.

12. A recording medium on which a content reproduced by a plurality of reproduction apparatuses is recorded, the plurality of reproduction apparatuses including first reproduction apparatuses belonging to a first category and holding plural device keys in association with information regarding generations of the plural device keys, and second reproduction apparatuses belonging to a second category and holding only one device key, the plural device keys including a device key held since before and a device key provided in response to when revocation stops functioning, wherein on said recording medium, at least (i) a plurality of revocation data generated based on a media key a the device key held by each of the plurality of reproduction apparatuses and intended for revoking the device key held by the specific reproduction apparatus of the respective categories, (ii) information regarding a generation of the device key for generating each of the plurality of revocation data, and (iii) an encrypted content generated by encrypting the content based on the media key are recorded, and the plurality of revocation data includes first revocation data includes first revocation data generated based on a device key selected from among the plural device keys held by said first reproduction apparatuses and second revocation data generated based on the device key held by said second reproduction apparatuses.

13. The recording medium according to claim 12,
wherein each one of the plurality of revocation data is encrypted media key data which is the media key encrypted using the device key held by the plurality of reproduction apparatuses of a corresponding category.

14. The recording medium according to claim 13,
wherein the encrypted content is generated by encrypting the content, based on an encryption key generated based on the media key.

15. The recording medium according to claim 13,
wherein the encrypted content is generated by encrypting the content using a content key, and
on said recording medium, encrypted content key data is recorded, the encrypted content key data being generated by encrypting the content key using the media key.

16. The recording medium according to claim 12,
wherein each one of the plurality of revocation data is encrypted media key data which is a media key for a corresponding category, encrypted using the device key held by the plurality of reproduction apparatuses of the corresponding category,
the encrypted content is generated by encrypting the content using a content key, and
on said recording medium, a plurality of encrypted content key data generated by encrypting the content key using the media keys corresponding to the category of the plurality of reproduction apparatuses are recorded.

17. The recording medium according to claim 12,
wherein on said recording medium, at least (i) a plurality of first revocation data generated based on the media key and on a device key held by each of decryption apparatuses of the first category and intended for revoking a device key held by a specific decryption apparatus of the first category, (ii) information regarding a generation of the device key for generating the plurality of first revocation data, (iii) a plurality of second revocation data generated based on a media key and on a device key held by each of apparatuses of the second category and intended for revoking a device key held by a specific apparatus of the second category, and (iv) the encrypted content which is the content on which an encryption process has been performed based on the media key are recorded.

18. A computer-readable recording medium on which a program causing a computer to reproduce an encrypted content is recorded, wherein on said recording medium, at least revocation data generated based on a media key and a device key held by the computer and intended for revoking the device key held by the computer, an encrypted content generated by encrypting a content based on the media key, and information regarding a generation of the device key for generating the revocation data are recorded, the revocation data is encrypted media key data which is the media key encrypted using the device key held by the computer, and the program recorded on said recording medium causes the computer which holds plural device keys in association with information regarding generations of the plural device keys (a) to read out, from the recording medium, the corresponding encrypted media key data, the information regarding the generation of the device key, and the encrypted content, (b) to select a device key associated with the information regarding the generation of the device key, from among the held plural device keys, (c) to obtain the media key by decrypting the encrypted media key data using the selected device key, and (d) to decrypt the encrypted content based on the obtained media key, the plural device keys including a device key held since before and a device key provided in response to when revocation stops functioning.

19. The recording medium according to claim 18, wherein the encrypted content is generated by encrypting the content, based on an encryption key generated based on the media key, and the program recorded on said recording medium causes the computer to generate a decryption key based on the obtained media key, and to decrypt the encrypted content based on the generated decryption key.

20. The recording medium according to claim 18, wherein the encrypted content is generated by encrypting the content using a content key, on the recording medium, encrypted content key data generated by encrypting the content key using the media key is recorded, and the program recorded on said recorded medium causes the computer (a) to read out the encrypted content key data from the recording medium, (b) to obtain the content key by decrypting the encrypted content key data using the media key, and (c) to decrypt the encrypted content using the obtained content key.

21. The recording medium according to claim 18, wherein the revocation data is encrypted media key data which is a media key for a corresponding category, encrypted using the device key held by the computer, the encrypted content is generated by encrypting the content using a content key, on the recording medium, a plurality of encrypted content key data generated by encrypting the content key using the media keys corresponding to the category of the computer is recorded, and the program recorded on said recording medium causes the computer (a) to read out, from the recording medium, the encrypted media key data for the corresponding category, the encrypted content key data for the corresponding category, the encrypted content, and the information regarding the generation of the device key, (b) to select a device key associated with the information regarding the generation of the device key, from among the held plural device keys, (c) to obtain the media key for the corresponding category by decrypting the encrypted media key data using the selected device key, (d) to obtain the content key by decrypting the encrypted content key data using the obtained media key for the corresponding category, and (e) to decrypt the encrypted content using the obtained content key.

22. The recording medium according to claim 18, wherein on the recording medium, at least (i) a plurality of first revocation data generated based on the media key and on a device key held by each of decryption apparatuses of a first category and intended for revoking a device key held by a specific decryption apparatus of the first category, (ii) information regarding a generation of the device key for generating the plurality of first revocation data, (iii) a plurality of second revocation data generated based on a media key and on a device key held by each of apparatuses of a second category and intended for revoking a device key held by a specific apparatus of the second category, and (iv) the encrypted content which is the content on which an encryption process has been performed based on the media key are recorded, and the program recorded on said recording medium causes the computer which belongs to the second category to read out, from the recording medium, the plurality of second revocation data and the encrypted content, and to decrypt the encrypted content based on the plurality of second revocation data.

23. The recording medium according to claim 22, wherein the program recorded on said recording medium causes:

a read-out apparatus belonging to the second category to read out, from the recording medium, the plurality of first revocation data, the plurality of second revocation data, the information regarding the generation of the device key, and the encrypted content, to generate intermediate data which is the encrypted content on which a part of a decryption process has been performed based on the plurality of second revocation data, and to output the generated intermediate data, the information regarding the generation of the device key, and the plurality of first revocation data; and a decryption apparatus belonging to the first category to obtain the content by performing a decryption process on the intermediate data, based on the plurality of first revocation data and the information regarding the generation of the device key outputted by the read-out apparatus belonging to the second category.

24. A copyright protection system comprising:

a key generation apparatus configured to generate and record a plurality of revocation data necessary for encrypting and decrypting a content, a plurality recording apparatuses, each of which is configured to encrypt a content and to record the encrypted content;

a recording medium on which the encrypted content and the plurality of revocation data are recorded; and a plurality of reproduction apparatuses, each of which is configured to read out and decrypt the encrypted content recorded on said recording medium, wherein each of said plurality of reproduction apparatuses is one of either first reproduction apparatuses which belong to a first category and hold plural device keys in association with information regarding generations of the plural device keys or second reproduction apparatuses which belong to a second category and hold only one device key, the plural device keys including a device key held since before and a device key provided in response to when revocation stops functioning, each of said plurality of reproduction apparatuses belongs to either the first category or the second category, said key generation apparatus is configured (a) to generate, for said plurality of reproduction apparatuses and based on a media key and a device key held by each of said plurality recording apparatuses or plurality of reproduction apparatuses, the plurality of revocation data intended for revoking a device key held by a specific recording apparatus or a specific reproduction apparatus of the respective categories, and (b) to record the generated a plurality of revocation data and the information regarding a generation of the device key for generating the plurality of revocation data onto said recording medium, said plurality recording apparatuses are each configured (a) to read out, from said recording medium, the plurality of revocation data for the category to which said recording apparatus belongs, (b) to generate the encrypted content by encrypting the content based on the plurality of revocation data read out, and (c) to record the generated encrypted content on said recording medium, each one of the plurality of revocation data is encrypted media key data which is the media key encrypted using a device using a device key held by the reproduction apparatus of a corresponding category the first reproduction apparatuses are each configured (a) to read out, from said recording medium, the corresponding encrypted media key data, the information regarding the generation of the device key, and the encrypted content, and (b) to select a device key associated with the information regarding the generation of the device key, from among the held plural device keys, (c) to obtain the media key by decrypting the encrypted media key data using the selected device key, and (d) to decrypt the encrypted content based on the obtained media key, and the second reproduction apparatuses are each configured (a) to read out, from said recording medium, the plurality of revocation data corresponding to said second reproduction apparatus and the encrypted content, and (b) to decrypt the encrypted content based on the plurality of revocation data read out.

25. A recording method for use in a recording apparatus which encrypts a content reproduced by plurality of reproduction apparatuses and records the encrypted content, the plurality of reproduction apparatuses including first reproduction apparatuses belonging to a first category and holding plural device keys in association with information regarding generations of the plural device keys, and second reproduction apparatuses belonging to a second category and holding only one device key, the plural device keys including a device key held since before and a device key provided in response to when revocation stops functioning, said method comprising:

a step of generating, for the plurality of reproduction apparatuses and based on a media key and a device key held by each of the plurality of reproduction apparatuses, a plurality of revocation data intended for revoking a device key held by a specific reproduction apparatus of the respective categories;

an encrypted content generation step of generating the encrypted content by encrypting the content, based on the media key; and a recording step of recording the plurality of revocation data, the information regarding a generation of the device key for generating each of the plurality of revocation data, and the encrypted content onto the recording medium.

26. A reproduction method for use in a reproduction apparatus which belongs to one of plural categories, holds plural device keys in association with information regarding generations of the plural device key, and reproduces an encrypted content recorded on a recording medium, the plural device keys including a device key held since before and a device key provided in response to when revocation stops functioning, wherein on the recording medium, at least a plurality of revocation data generated based on a media key and a device key held by the reproduction apparatus and intended for revoking the device key held by the reproduction apparatus, the encrypted content generated by encrypting a content based on the media key, and information regarding a generation of the device key are recorded, each one of the plurality of revocation data is encrypted media key data which is the media key encrypted using a device key held by the reproduction apparatus of a corresponding category, said reproduction method comprises:

a read-out step of reading out, from the recording medium the corresponding encrypted media key data, the generation of the device key, and the encrypted content; and a decryption step of selecting a device key associated with the information regarding the generation of the device key, from among the held plural device keys, obtaining the media key by decrypting the encrypted media key data using the selected device key, and decrypting the encrypted content based on the obtained media key.

* * * * *